US011312650B2

(12) United States Patent
Clawson et al.

(10) Patent No.: US 11,312,650 B2
(45) Date of Patent: Apr. 26, 2022

(54) SYSTEM AND METHOD FOR MANUFACTURING OPTICAL FIBER

(71) Applicant: MADE IN SPACE, INC., Moffett Field, CA (US)

(72) Inventors: Jan Clawson, Mountain View, CA (US); Robert White, Sunnyvale, CA (US); Nate Pickslay, Mountain View, CA (US); Michael Snyder, Jacksonville, FL (US); Geoffrey York Powers, Richmond, TX (US); Noah Paul-Gin, San Francisco, CA (US)

(73) Assignee: REDWIRE SPACE, INC., Jacksonville, FL (US)

( * ) Notice: Subject to any disclaimer, the term of this patent is extended or adjusted under 35 U.S.C. 154(b) by 70 days.

(21) Appl. No.: 16/045,733

(22) Filed: Jul. 25, 2018

(65) Prior Publication Data
US 2019/0031553 A1    Jan. 31, 2019

Related U.S. Application Data

(60) Provisional application No. 62/536,765, filed on Jul. 25, 2017.

(51) Int. Cl.
C03B 37/02 (2006.01)
B01D 29/60 (2006.01)
(Continued)

(52) U.S. Cl.
CPC .......... *C03B 37/0216* (2013.01); *B01D 29/56* (2013.01); *B01D 29/60* (2013.01);
(Continued)

(58) Field of Classification Search
CPC .............. C03B 37/032; C03B 2205/55; C03B 37/02772
See application file for complete search history.

(56) References Cited

U.S. PATENT DOCUMENTS 3,323,437 A   6/1967  Knab
4,099,837 A * 7/1978  Vazirani .................. B05D 7/20
                                              385/123
(Continued)

FOREIGN PATENT DOCUMENTS

CN   205683746   11/2016
CN   205760520   12/2016
(Continued)

OTHER PUBLICATIONS

Churbanov et al. Molten Glass Flow Stability during Fiber Drawing through a Nozzle. Inorganic Materials, 2010, vol. 46, No. 3, pp. 304-309. (Year: 2010).*
(Continued)

*Primary Examiner* — Erin Snelting
(74) *Attorney, Agent, or Firm* — Terry M. Sanks, Esq.; Beusse Sanks, PLLC

(57) ABSTRACT

A system for precoating a preform for drawing optical fiber including a diameter sensor to determine a diameter of pulled optical fiber, a cooling system to cool the optical fiber once it is pulled from a furnace, a coating system to apply a coating to the optical fiber once it has cooled and an ultra-violet lamp to cure the coating.

17 Claims, 56 Drawing Sheets

(51) Int. Cl.

| | | |
|---|---|---|
| *C03B 37/027* | (2006.01) | |
| *C03B 37/07* | (2006.01) | |
| *C03B 37/025* | (2006.01) | |
| *C03B 37/029* | (2006.01) | |
| *C03B 37/03* | (2006.01) | |
| *C03C 25/10* | (2018.01) | |
| *C03C 13/04* | (2006.01) | |
| *C03C 25/105* | (2018.01) | |
| *B01D 29/56* | (2006.01) | |
| *C03C 25/106* | (2018.01) | |
| *C03C 25/6226* | (2018.01) | |
| *C03B 37/012* | (2006.01) | |
| *G02B 6/02* | (2006.01) | |

(52) U.S. Cl.
CPC ...... *C03B 37/01211* (2013.01); *C03B 37/029* (2013.01); *C03B 37/0253* (2013.01); *C03B 37/02736* (2013.01); *C03B 37/032* (2013.01); *C03B 37/07* (2013.01); *C03C 13/04* (2013.01); *C03C 13/042* (2013.01); *C03C 25/105* (2013.01); *C03C 25/106* (2013.01); *C03C 25/6226* (2013.01); *G02B 6/02* (2013.01); *C03B 2201/82* (2013.01); *C03B 2205/08* (2013.01); *C03B 2205/30* (2013.01); *C03B 2205/40* (2013.01); *C03B 2205/50* (2013.01); *C03B 2205/60* (2013.01); *C03B 2205/72* (2013.01); *C03B 2205/80* (2013.01); *C03B 2205/82* (2013.01)

(56) References Cited

U.S. PATENT DOCUMENTS

| | | | | |
|---|---|---|---|---|
| 4,154,592 | A * | 5/1979 | Bailey | C03B 37/027 65/32.5 |
| 4,179,233 | A | 12/1979 | Bromell et al. | |
| 4,654,065 | A | 3/1987 | Naumann et al. | |
| 5,079,433 | A | 1/1992 | Smith | |
| 5,233,200 | A | 8/1993 | DiMarcello et al. | |
| 5,383,946 | A * | 1/1995 | Naka | C03B 37/02718 65/443 |
| 5,665,146 | A * | 9/1997 | Mizobe | B01D 53/22 96/10 |
| 5,847,021 | A * | 12/1998 | Tortorello | C08G 18/6229 522/90 |
| 5,890,376 | A | 4/1999 | Chludzinski | |
| 6,371,394 | B1 * | 4/2002 | Roba | B65H 54/026 242/178 |
| 6,519,974 | B1 | 2/2003 | Oh et al. | |
| 6,789,401 | B1 | 9/2004 | Dabby et al. | |
| 10,442,721 | B1 | 10/2019 | Tucker et al. | |
| 10,550,028 | B2 * | 2/2020 | Starodubov | C03C 25/12 |
| 2002/0069674 | A1 * | 6/2002 | Guy | B65H 67/06 65/377 |
| 2003/0051511 | A1 * | 3/2003 | Suzuki | C03B 37/03 65/402 |
| 2003/0126890 | A1 * | 7/2003 | Orita | C03B 37/027 65/432 |
| 2003/0136157 | A1 | 7/2003 | Lee et al. | |
| 2003/0140685 | A1 | 7/2003 | Kagleder | |
| 2004/0017558 | A1 | 1/2004 | Lee et al. | |
| 2005/0120749 | A1 | 6/2005 | Adar et al. | |
| 2006/0147166 | A1 * | 7/2006 | Roba | B65H 49/02 385/123 |
| 2008/0022725 | A1 * | 1/2008 | Sarchi | C03B 37/02745 65/435 |
| 2009/0158779 | A1 * | 6/2009 | Faler | C03B 37/02718 65/441 |
| 2013/0118208 | A1 | 5/2013 | Okada | |
| 2015/0104138 | A1 | 4/2015 | Johnson et al. | |
| 2015/0266767 | A1 | 9/2015 | Glover et al. | |
| 2017/0233282 | A1 * | 8/2017 | Volfson | C03B 37/029 385/128 |
| 2018/0251393 | A1 * | 9/2018 | Otosaka | C03C 13/04 |
| 2019/0152835 | A1 * | 5/2019 | Volfson | C03C 3/325 |

FOREIGN PATENT DOCUMENTS

| | | |
|---|---|---|
| EP | 3417324 | 4/2021 |
| GB | 2117754 | 10/1983 |
| JP | 06227838 | 8/1994 |
| WO | 2017142963 | 8/2017 |

OTHER PUBLICATIONS

Larrondo et al. Electrostatic Fiber Spinning from Polymer Melts. I. Experimental Observations on Fiber Formation and Properties. Journal of Polymer Science: Polymer Physics Edition, vol. 19, 909-920 (1981). (Year: 1981).*

International Search Report, dated Jul. 30, 2021.

* cited by examiner

SYSTEM AND METHOD FOR MANUFACTURING OPTICAL FIBER

CROSS-REFERENCE TO RELATED APPLICATIONS

This application claims the benefit of U.S. Provisional Application No. 62/536,765 filed Jul. 25, 2017, the entirety of which is incorporated by reference.

BACKGROUND

Embodiments relate to manufacture of fiber optic cable and, more particularly to, a system and a method for manufacturing exotic optical fiber in microgravity.

Traditionally, fiber optic draw towers are multiple meters tall, with a total fiber path over 3 meters. This allows for fiber to completely cool before being coated, and makes control much easier. Further, the entire system is open, with human hands used at multiple stages for miscellaneous tasks. Most earth-based systems work by having the preform 'dropped' after softening in the furnace.

Exotic optical fiber, such as the Fluoride-based fiber ZBLAN, theoretically provides 10-100 times better attenuation and significantly broader transmission spectrum, compared to traditional silica fiber. The term "ZBLAN" is an abbreviation based its composition, $ZrF_4$—$BaF_2$—$LaF_3$—$AlF_3$—$NaF$. ZBLAN. ZBLAN may be used to enable high performance fiber lasers, more capable medical equipment such as laser scalpels and endoscopes, supercontinuum light sources, more sensitive sensors for the aerospace and defense industries, and significantly higher bandwidth long-haul telecommunications connections. ZBLAN optical fiber is currently produced on Earth and is sold in short lengths for utilization in fiber lasers, such as for medical, drilling, and image generation, supercontinuum light sources, highly-nonlinear fibers, sensors, and other aerospace and defense applications. Currently approximately 100 kilograms of ZBLAN optical fiber is produced yearly. Since such low quantities is produced, the full potential of this material has not yet been realized.

Despite the theoretical performance of ZBLAN, due to extrinsic scattering and absorption, typical losses for terrestrially produced ZBLAN fibers is worse than silica fiber. Furthermore, due to these losses, terrestrially-produced ZBLAN is useless for telecommunications applications.

Absorption losses are caused by impurities in the glass. Scattering losses are caused by microcrystals forming in fiber as it is pulled. There have been theoretical demonstrations showing that crystallization is not present when fibers are formed in microgravity. Microgravity suppresses ZBLAN crystallization, reducing scattering loses and leading to significant performance improvements. In other words, the unique characteristics of microgravity enable a fundamentally superior material to be created. Crucially, due to the short duration of microgravity on test flights, insufficient lengths of material were produced to quantitatively characterize these performance improvements. A kilometer of ZBLAN fiber weighs approximately 2 kilograms. One kilometer of ZBLAN fiber can be produced from preforms, or solid glass rods, providing significant margin for operational costs, amortizing the costs of ZBLAN production machinery and upmassing and downmassing the hardware and material itself from a microgravity environment.

The standard procedure for pulling fiber from preforms is to begin heating the preform in the middle so that the weight of the preform causes it to neck in the molten portion. The necking leaves a still solid portion of preform that is then pulled from the rest and a fiber forms between them. The drop is then cut from the fiber and that fiber is then pulled. This method is reliant on the force of gravity and would not work in a microgravity environment.

Once pulled, optical fibers pulled are extremely vulnerable to damage from outside elements. To assist with this vulnerability, fibers are coated post-pulling in polymer coatings to ensure the fibers longevity and functionality. This process uses a pool of melted polymer in which the fiber is run through as it is being pulled, creating a streamlined process. For certain materials, such as silica, this process is ideal. However, with highly sensitive materials, such as ZBLAN, this process becomes difficult.

This difficulty arises due to ZBLAN's high sensitivity to moisture, external contaminants, and relatively low pulling temperature when compared to silica based fibers. ZBLAN fiber requires an ultraclean environment void of moisture and contaminants to be accurately produced. This makes post processing and streamlined coating processes difficult as the entire operation must conform to these meticulous environmental conditions.

Currently, traditional terrestrial systems are heavily modified to operate within a zero gravity or microgravity environment. Instead of modifying existing traditional terrestrial systems, a system and manufacturing process specific to a microgravity environment is desired. Therefore, users and manufacturers of ZBLAN fiber would benefit from a system and method which provides for a draw operation that is performed as autonomous as possible where the environment is controlled and a miniaturized draw tower, when compared to prior art, is utilized.

SUMMARY

Embodiments relate to a system and a method for manufacturing exotic optical fiber in microgravity. The system comprises an autonomous feed system for transforming a preform into an optical fiber that is located within an enclosure in which environmental conditions are controlled. The autonomous feed system comprises a preform holder, endoscopic forceps, a finance, a plurality of pinch wheels which are autonomously controlled to produce the optical fiber.

The method comprises removing moisture from the environment. The method further comprises heating the preform until it is in a viscous state. The method also comprises applying tension to an end of the preform to cause a section of the preform to decrease in diameter forming a neck. The method further comprising extracting a small fiber from the neck and attaching an end of the small fiber to a spool. The method further comprises applying a polymer layer to the small fiber as further pulled from the neck.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
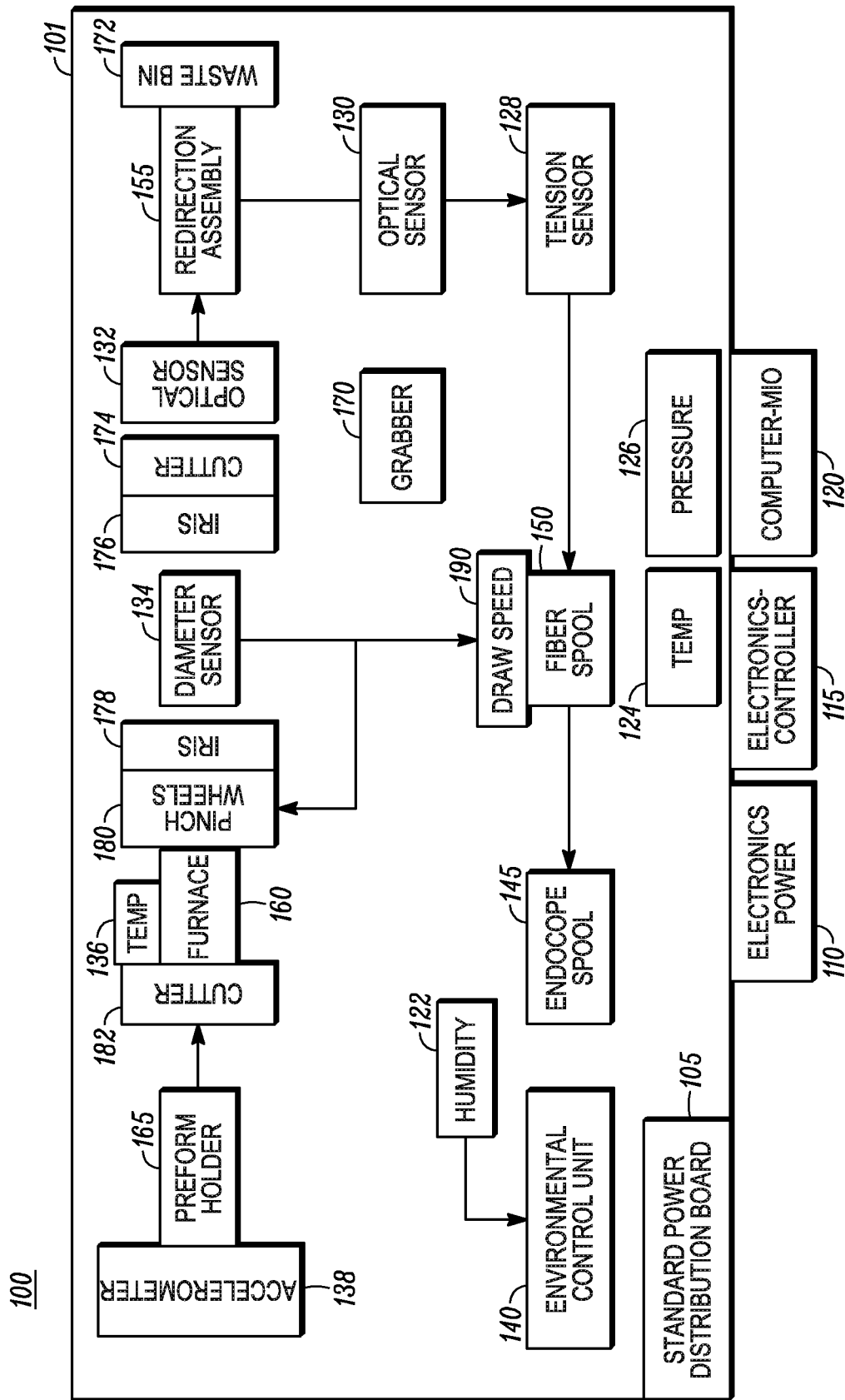
FIG. 1 illustrates a functional diagram of a system for manufacturing optical fiber.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 illustrates a functional diagram of a system for manufacturing optical fiber. A functional block diagram of system 100 for manufacturing optical fiber is illustrated. A series of primary mechanisms 140-165 centrally controlled by electronic mechanisms 105-120 may be provided. The primary mechanisms may include, but are not limited to an environmental control unit 140, an endoscope spool 145, a fiber spool 150, a redirection assembly 155, a furnace 160, and a preform holder 165. The control may be based on data received from at least one sensor, though as disclosed herein, a plurality of sensors may be provided. As shown, a plurality of sensors 122-138 may be used. Such sensors may include, but are not limited to an humidity sensor 122 that is associated with the environment control unit 140, a temperature sensor 124, a pressure sensor 126, a tension sensor 128 associated with the fiber spool 150 and redirection assembly 155, an optical sensor 130 also associated with the fiber spool 150 and redirection assembly 155, an optical sensor 132 that is associated with the redirection assembly 155, a diameter sensor 134, a temperature sensor 136 and an accelerometer 138.

In an embodiment, the system 100 may be primarily contained within a housing 101, wherein the manufacturing of the optical fiber may occur within the housing 101.

Some electronic mechanisms, such as a power source 110, controller 115, and computer MIO 120, may be located externally. These electronic mechanisms may also be located internally, but locating them externally may limit overheating.

The housing 101 may be hermetically sealed, wherein the internal environment may be controlled by the internal environmental control unit 140, which may receive sensor data about ambient conditions, such as, but not limited to, from the humidity sensor 122. The environmental control unit 140 may provide for a stable and clean environment within the housing. In an embodiment, the environment may be monitored for ambient conditions, such as, but not limited to, through use of the temperature sensor 124 and the pressure sensor 126. Pressure and temperature data may be collected for reference. In an embodiment, predefined levels of the pressure and temperature may trigger emergency actions. As a non-limiting example, extremely high ambient temperatures may stop the furnace 160. As a non-limiting example, a loss of pressure may stop the system 100 in which any components that move during operation may return to a locked or stationary position. The fiber spool 150 may comprise a clamping mechanism 151 that may secure the fiber to the fiber spool 150. In another embodiment, power to any component may be disconnected. Starting and stopping the system 100 may be performed autonomously based on sensed data that is provided to a computing functionality of a processing system that may be used to implement an embodiment disclosed herein, as further illustrated in FIG. 56, to operate the system 100.

A preform holder 165 may hold a plurality of preforms that may be inserted into a furnace 160, where the preform may be heated and fiber may be drawn from the heated preform. Preform loading and alignment may be controlled in part by utilizing data from an accelerometer 138.

A temperature sensor 136 may monitor the temperature within the furnace 160. In an embodiment, multiple temperature sensors 136, such as may be provided as a sensor array, may allow for more precise control of the temperature within the furnace 160. A temperature profile within the furnace 160 may allow for a more effective draw of fiber from the preform. A temperature probe 166 may be inserted into the furnace 160 between preforms, wherein the preform holder 165 may comprise a reusable temperature probe 166. The temperature probe 166 may comprise physical properties similar to or the same as a preform, wherein the temperature probe 166 may test the internal furnace conditions.

In an embodiment, an initial cutter 182 may precede the furnace 160, wherein the initial cutter 182 may detach pulled fiber from the remaining preform. A second cutter 174 may be located later in the process that may detach irregular or low quality fiber from the collectible fiber. In an embodiment, the second cutter 174 may be located proximate to a waste bin 172, which may collect the waste fiber.

In an embodiment, pinch wheels 180 may guide forceps, not shown, into the furnace 160 to draw fiber from the preform. The pinch wheels 180 may guide the fiber into a diameter sensor 134 through an initial iris 178 that may center the fiber within the diameter sensor 134. In an embodiment, a secondary iris 176 may be located after the diameter sensor 134 that may center the fiber as it exits the diameter sensor 134. In an embodiment, the fiber may pass through an optical sensor 132 that may monitor the quality of the fiber as it is drawn.

The diameter sensor 134 may be mounted under the furnace, and is used to measure the fiber diameter as it emerges from the furnace. This diameter sensor is used in an active control loop to control the draw speed. If the diameter is not correct, the draw speed is raised or lowered until the proper speed is reached to achieve nominal diameter.

Figure 3:
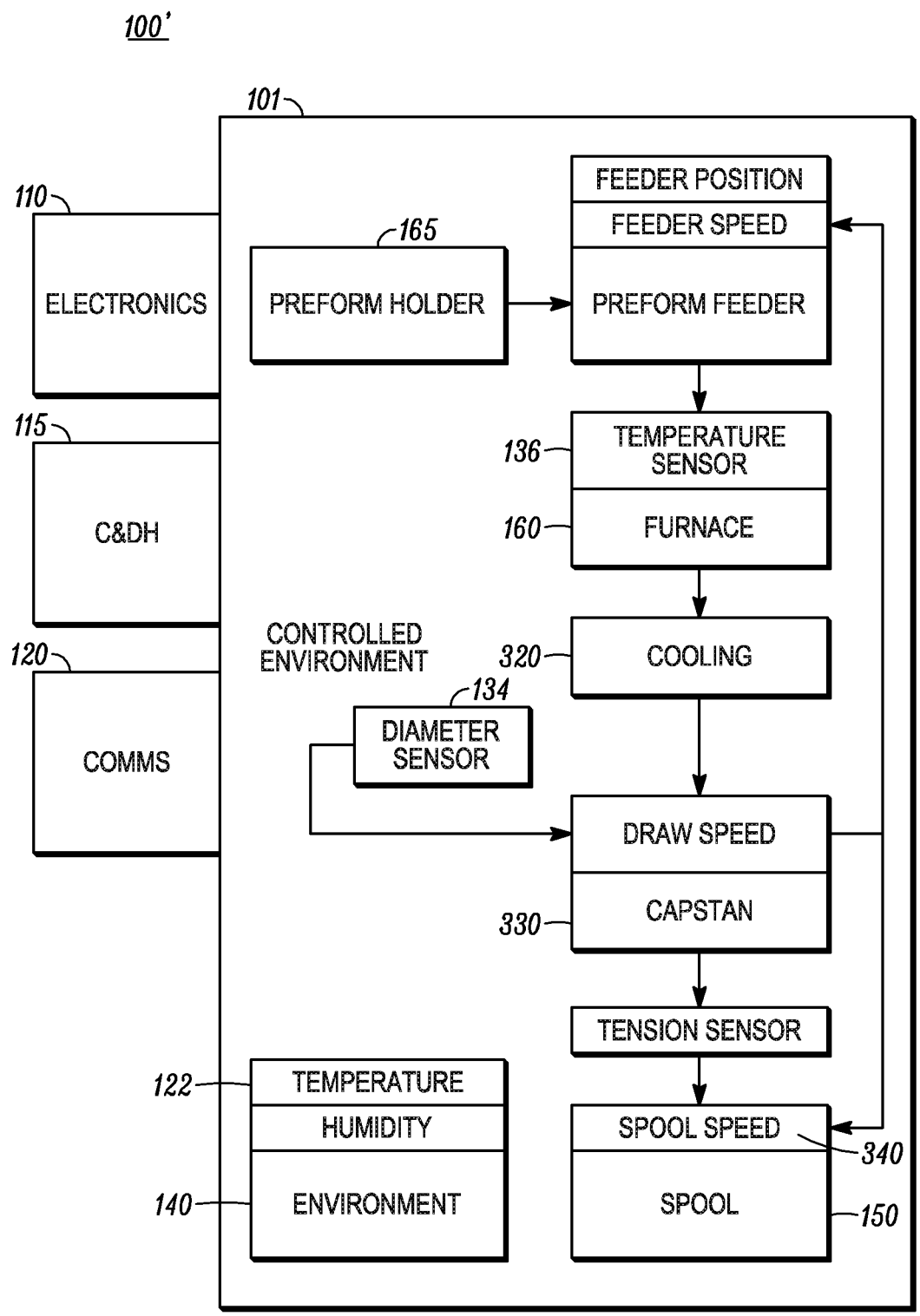
FIG. 3 illustrates another function diagram of a system for manufacturing optical fiber.
Figure 4A:
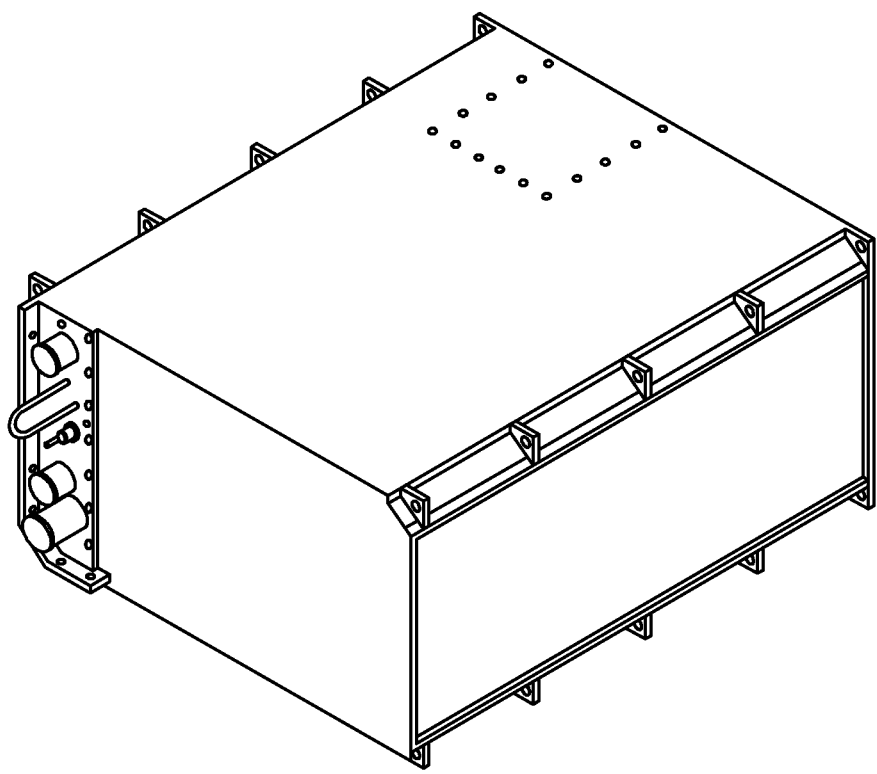
FIGS. 4A-4D illustrate various views of an exemplary housing structure for a system for manufacturing optical fiber.
Figure 4B:
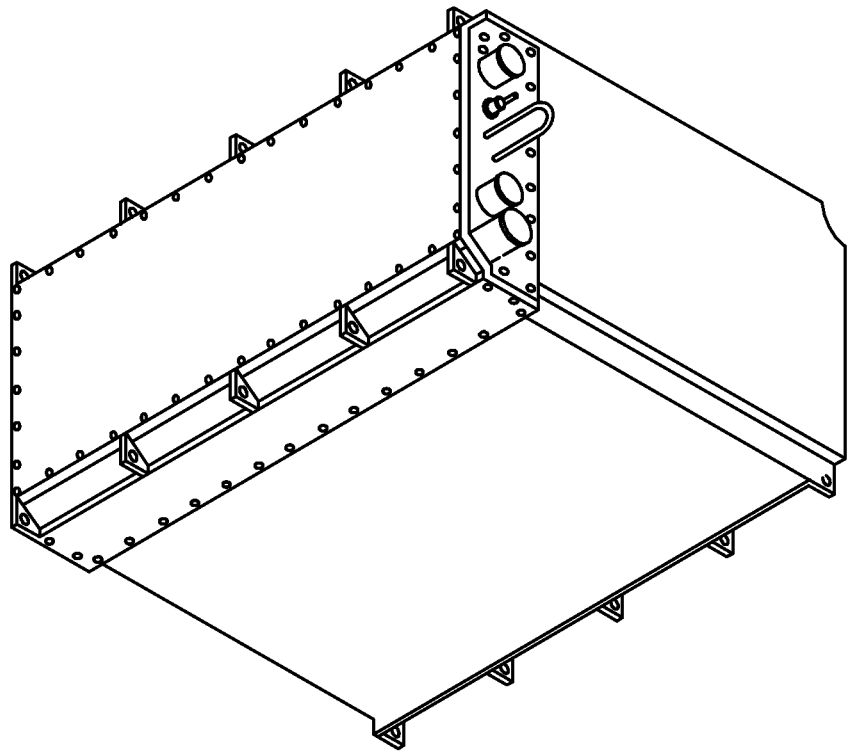
Figure 4C:
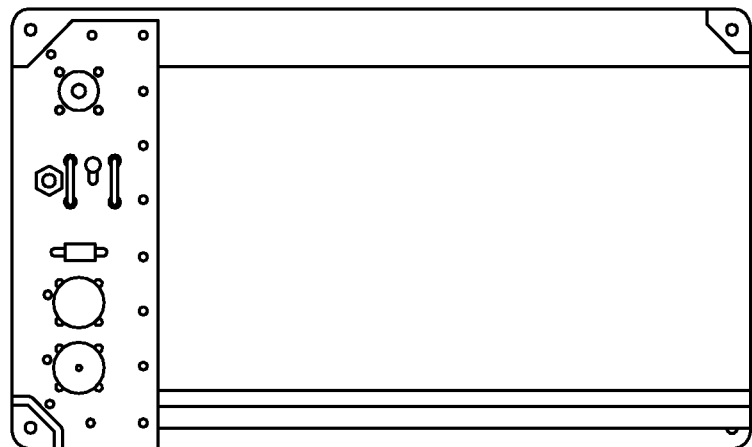
Figure 4D:
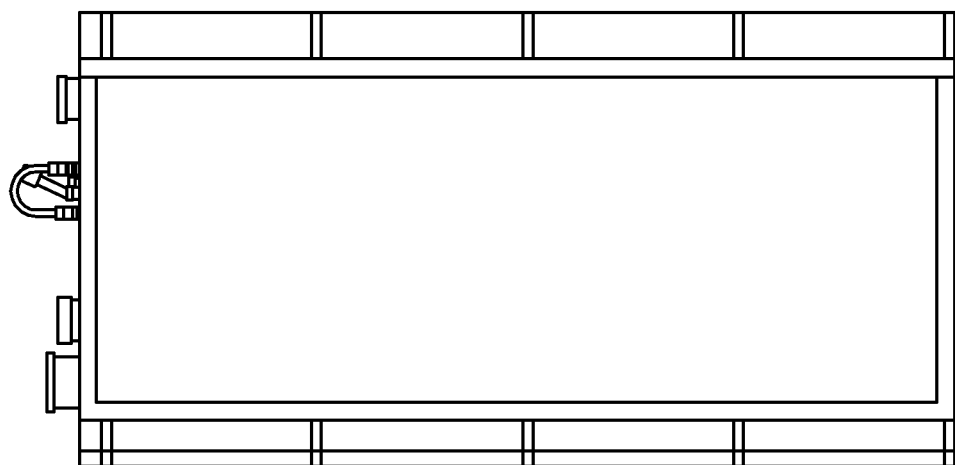

As shown in FIG. 3, a cooling system can be integrated below the diameter sensor to rapidly cool the fiber before it is coated. In an embodiment, an air pump or a fan may be located perpendicular to the fiber, which cools the fiber by passing air over the fiber. Bladeless fans could also be used to channel air along the fiber length. In another embodiment to cool the fiber, it may also be possible to touch the fiber with rolling pins, creating a conductive thermal pathway from the fiber.

The fiber may also be drawn through a redirection assembly 155, which may prepare the fiber for collection. The fiber may be pulled through a series of sensors 130, 128, such as a second optical sensor 130 and a tension sensor 128. The tension sensor 128 may allow the system to recognize if there is a break in the fiber and allow for control over spooling parameters by providing a sensed data that is provided to the computing functionality of a processing system as disclosed in FIG. 56. A fiber spool 150 may collect the fiber, wherein the draw speed 190 may adjust based on sensor data that is provided to the computing functionality of a processing system. Non-limiting examples of the sensor include, but is not limited to, the diameter sensor 134, tension sensor 128 or combination of multiple sensors. In an embodiment, an endoscope spool 145 may be located beyond the fiber spool 150.

Figure 2:
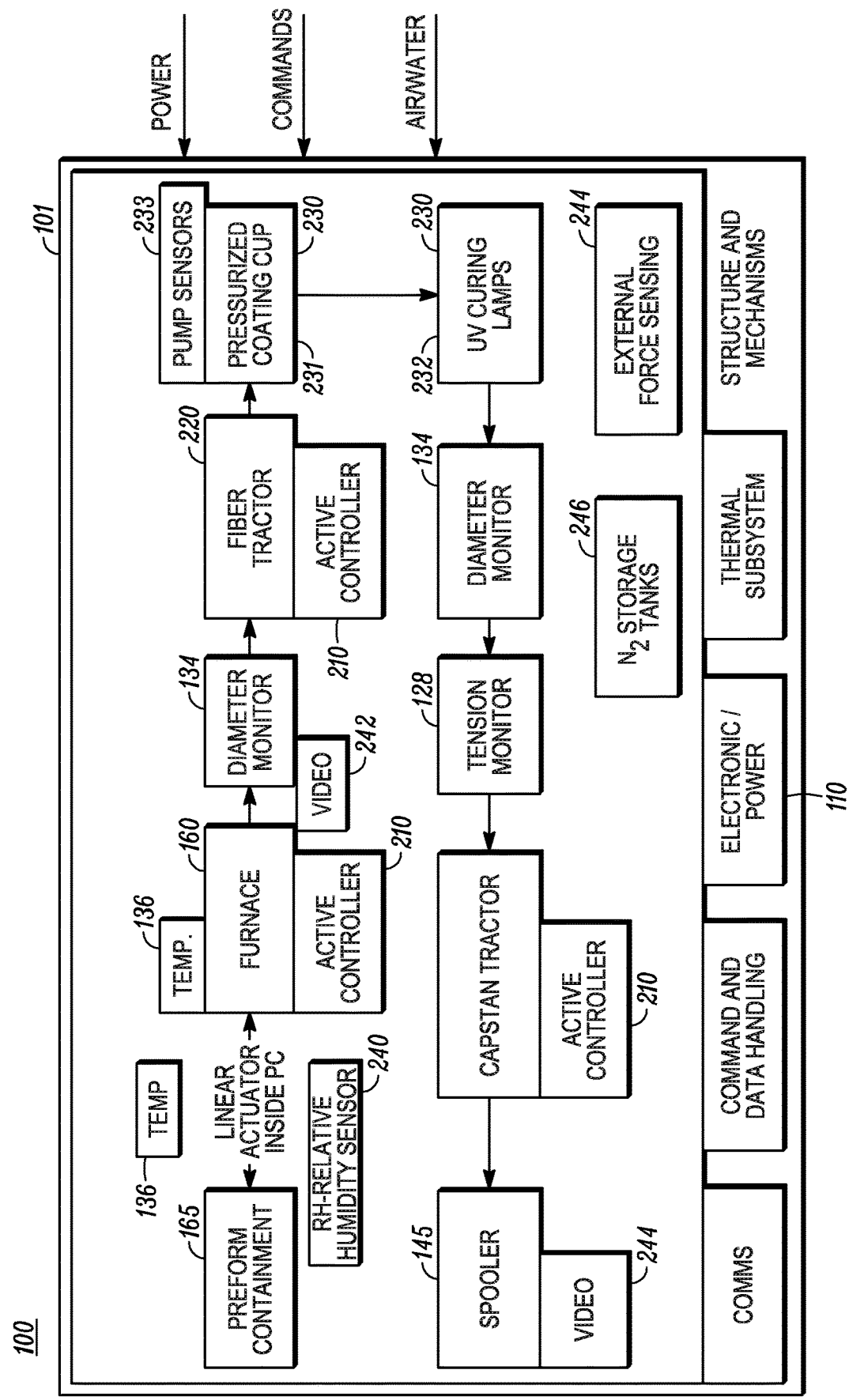
FIG. 2 illustrates another functional diagram of a system for manufacturing optical fiber.

FIG. 2 illustrates another functional diagram of a system for manufacturing optical fiber. As shown the preform holder 165, or containment device is disclosed. The preform holder 165 holds onto multiple preforms as well as at least one temperature sensor 136. It then feeds preforms slowly into the furnace 160, providing the necessary material for creating the fibers. The furnace 160 is used to soften the glass preforms. The temperature may be read from integrated sensors 136, and it is actively controlled, such as with an active controller 210, to insure a stable thermal environment. Thus an active controller 210 is provided. As disclosed above, a diameter sensor 134 or monitor is provided. A fiber tractor 220 is provided to provide a pulling force to draw the fiber from the preform. A coating device 230, such as, but not limited to a pressurized coating cup 231, is provided to apply a coating to the generated fiber. The coating device 230 may further comprise an ultraviolet ("UV") curing lamp 232 to assist in solidifying the applied coating. Pump sensors 233 are also shown as being provided with the coating device 230.

Also shown are several monitors devices, or sensors, including temperature sensors 136, relative humidity sensor 240, video camera 242, pump sensors 233, external force sensors 244 and diameter sensors 134. Also shown is a UV curling lamp 230 and a nitrogen storage tank 246. This take may or may not be within the housing 101. When not in the housing 101, a feed line is provided through the housing 101.

As explained further herein, the drawing mechanism may comprise at least one of a capstan, tractors, and/or spool. This mechanism provides the pulling force necessary to draw the fiber from the preform, as well as wind the created fiber into a compact vessel, such as, but not limited to the spool, that can then be unwound back on Earth. These systems can be split, allowing the fiber to travel longer distances inside the box before being spooled. Further, several subsystems, identified as start/stop subsystem, provide for drawing the fiber from a heated preform without the aid of gravity, as well as being used for stopping the drawing process in a controlled manner. The processor disclosed herein and active controllers provides for an autonomous start/stop system.

The tension and diameter monitors may be sensors used to take measures of the tension in the line and the diameter of the created fiber, respectively. Humidity, temperature, and pressure sensors may be used to detect the parts per million (PPM) of water content, the temperature, and the pressure inside the controlled environment, respectfully. External Force Sensors, such as but not limited to at least one accelerometer, may be used inside the system to measure vibrations, which could affect fiber quality As disclosed herein, the entire system may be held inside a controlled environment, defined by a housing. A high purity noble gas may be used within the housing.

Communications (or command), control data handling (CD&H) is used to record and transmit data from the process, as well as communicate with the automated systems.

An electronics/power subsystems are used for conditioning power from the space station, as well as controlling all the different subsystems.

A thermal subsystem comprises the subsystems necessary to cool the interior and exterior of the system. Also, a structure and mechanisms provide structure containing the environment and other subsystems, along with necessary mechanisms to make them function.

As a non-limiting example, the system disclosed herein launches from Earth to the ISS in a form factor required by the Express Rack. This structure is sealed to prevent any infiltration of humidity into the system, and filled with a dry environment. This environment may be maintained with a gas pump circulating air through a HEPA filter, a carbon black filter, and molecular sieve, or other forms of environmental control (such as pumping in fresh nitrogen from the exterior).

The process, in summary, revolves around taking a large diameter ZBLAN preform, heating that preform until it is in a viscous state, then applying tension to the end of this preform. This tension causes a section of the preform to decrease in diameter forming a "neck". From this neck, a small fiber can be pulled out and attached to a spool. By changing the spooling speed, the diameter of the fiber can be controlled. Coating systems can then apply a polymer layer to the glass, allowing it to be bent without surface cracks breaking. Normally, gravity aids the process by automatically allowing the neck to form, as the weight of the bottom of the preform causes the heated preform to naturally draw down.

FIG. 3 illustrates another function diagram of a system for manufacturing optical fiber. As shown, a reform holder 165 is provided. Preform material is provided to a feeder position monitor that is provided with a feeder speed device and the preform feeder 310. The preform material is provided to the furnace 160. A temperature sensor 136 is provided at the furnace 160. In this embodiment a cooling device 320 is shown, hence the optical fiber is pulled from the furnace and is feed through the cooling device. A draw speed device 330 is provided at a capstan 330, through which the optical fiber is pulled. A tension sensor 128 is shown to measure tension of the optical fiber after passing through the capstan 330. A spool speed device 340 is shown in communication with the spool 150. A diameter sensor 134 is shown. As is also visible, the draw speed device, feeder speed device and spool speed device are in communication with a diameter sensor. Though not shown, a controller may be provided to use the data collected from the diameter sensor to establish the speed of the feeder speed device, draw speed device and spool speed device. The ECU 140 is also shown along with a humidity sensor and temperature sensor.

Referring now to FIGS. 4A-4D, various views of an exemplary housing structure 101 for a system for manufacturing optical fiber is illustrated.

Figure 5A:
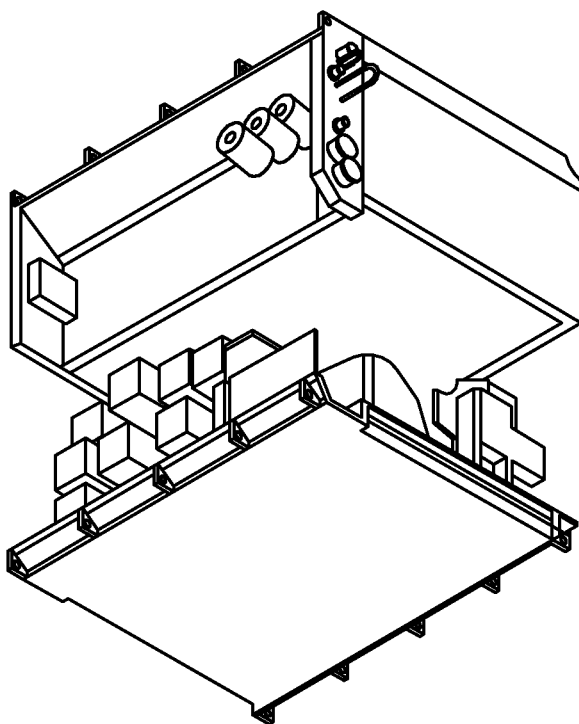
FIGS. 5A-5B illustrate embodiments of a partially exposed view of an exemplary housing structure for a system for manufacturing optical fiber.
Figure 5B:
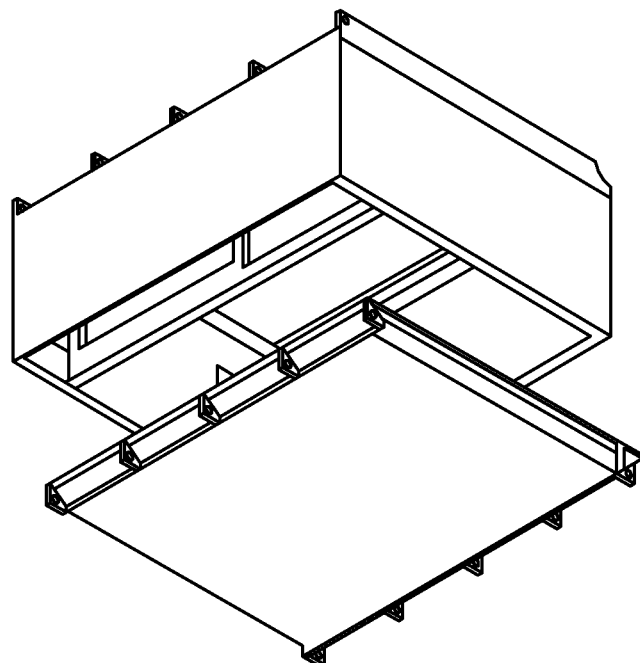

Referring now to FIG. 5A-5B, embodiments of a partially exposed view of an exemplary housing structure 101 for a system for manufacturing optical fiber is illustrated.

Figure 6:
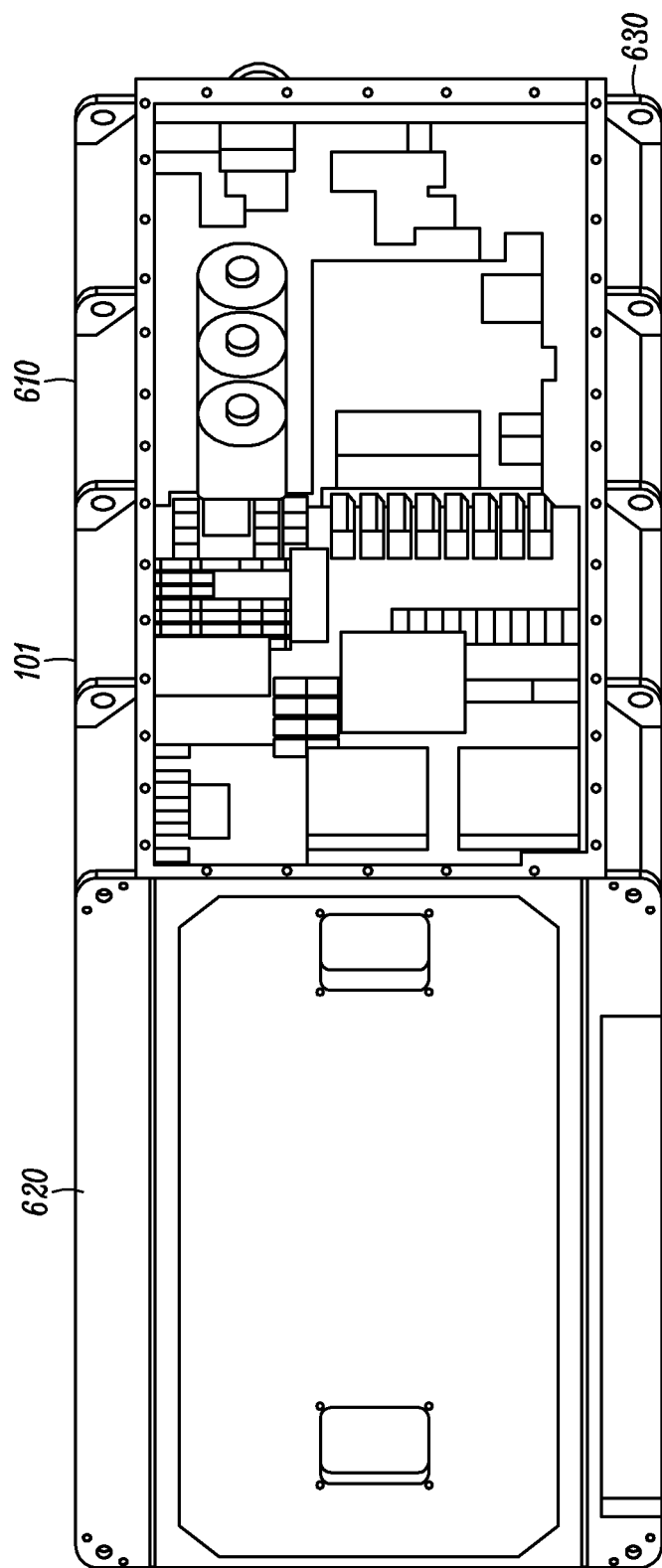
FIG. 6 illustrates a perspective view of an exemplary system for manufacturing optical fiber.

Referring now to FIG. 6, a side view of an exemplary housing structure for the system for manufacturing optical fiber is illustrated. The structure 101 may comprise two pieces, a top welded shell 610 with a detachable left wall 620, and a bottom plate 630. The components disclosed herein may be mated to the top shell 610 on an interior wall.

In an embodiment, the components disclosed herein are separated entirely. The pulling subsystems disclosed herein may be mounted to the bottom plate 630 or ease of assembly. The pulling assembly may be located in a hermetically sealed, dry nitrogen environment.

Figure 7:
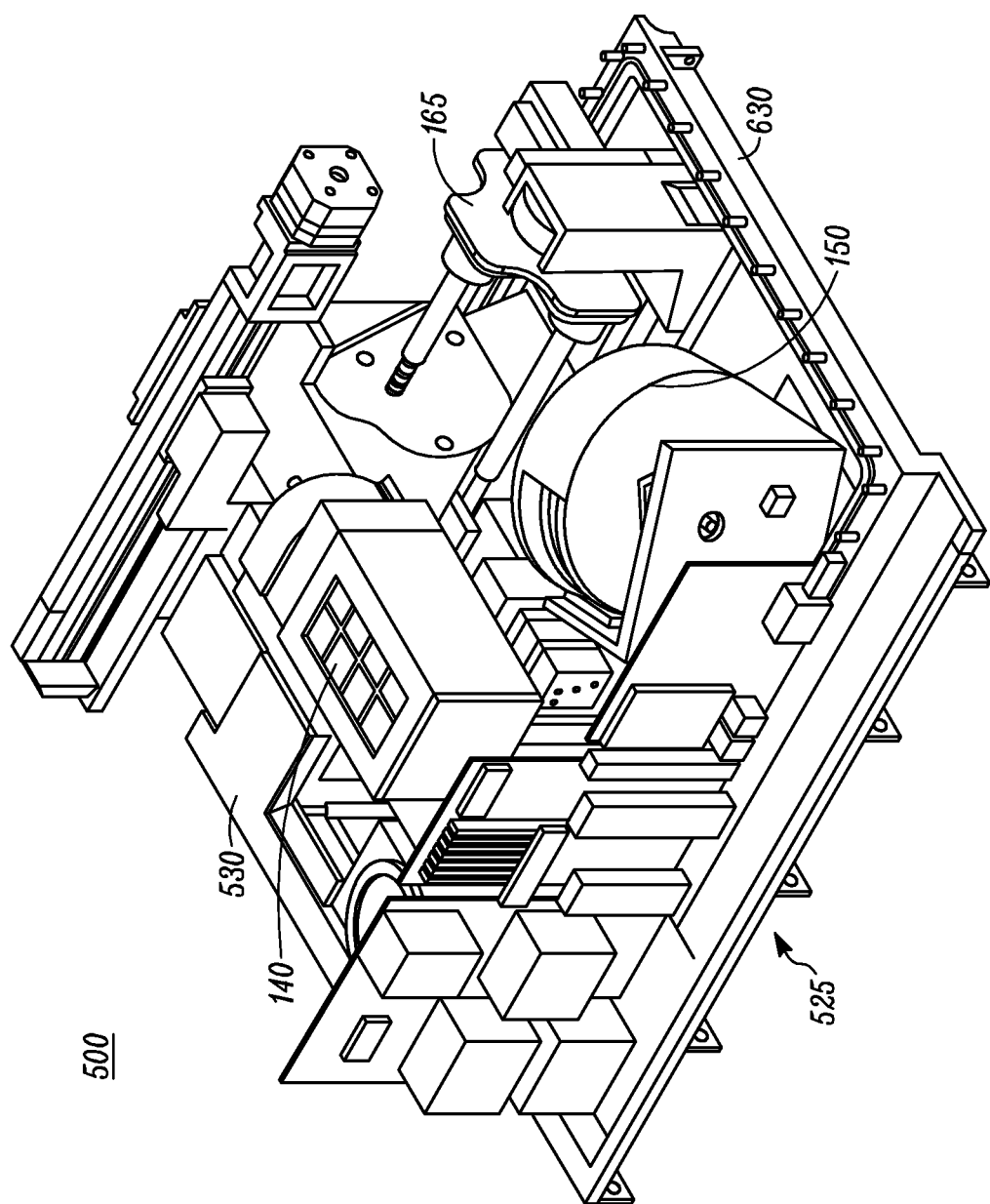
FIG. 7 illustrates a perspective view of another exemplary system for manufacturing optical fiber.

Referring now to FIG. 7, a perspective view of an exemplary system 500 for manufacturing optical fiber is illustrated. The system 500 may comprise electronics 525 that may be located external to the hermetically sealed housing 101. In some aspects, the system 500 may comprise an environmental control unit 530 that may maintain a stable and clean environment.

Figure 8:
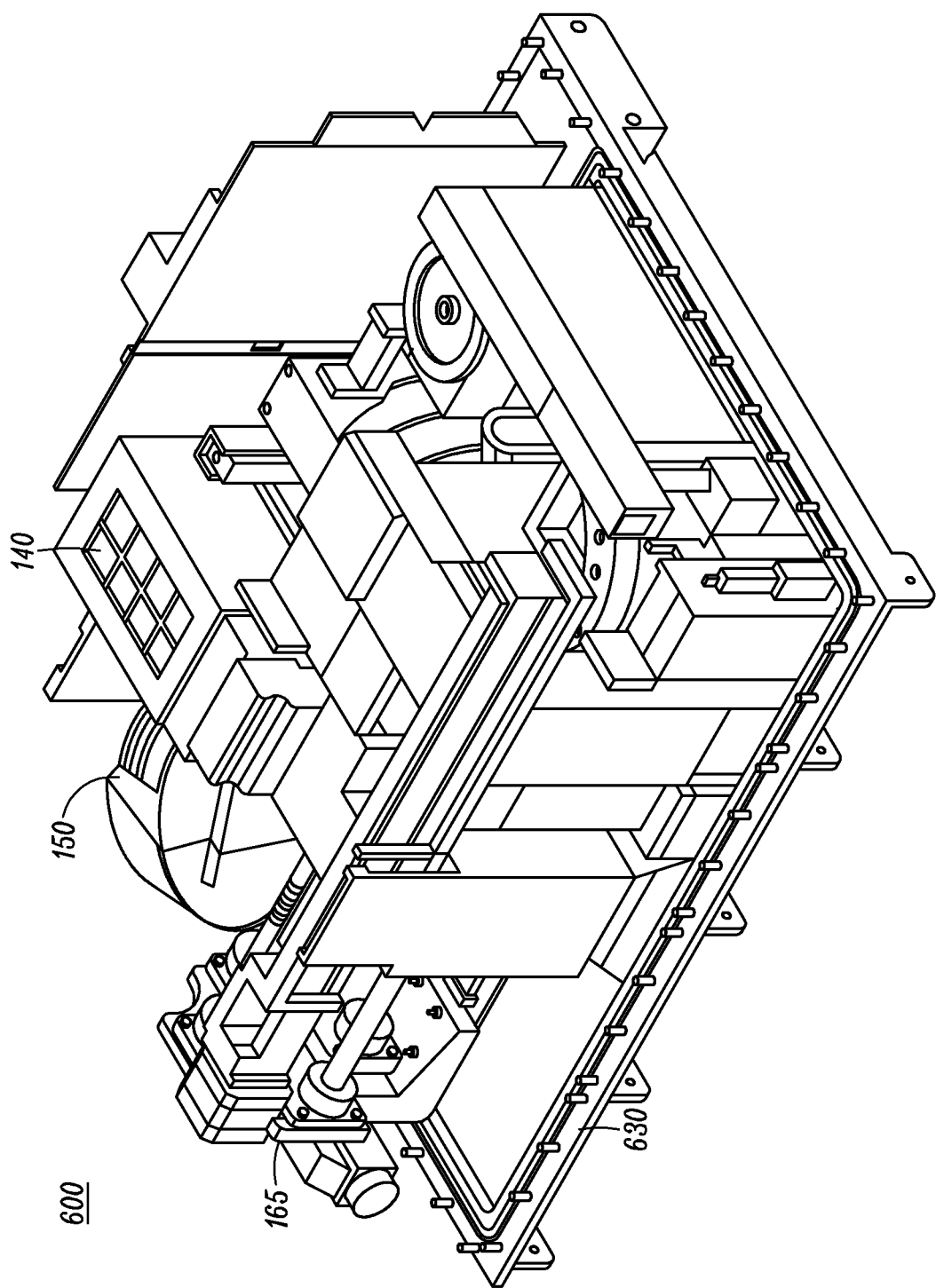
FIG. 8 illustrates another exemplary system for manufacturing optical fiber.

Referring now to FIG. 8, a perspective view of an exemplary system for manufacturing optical fiber is illustrated. The preform holder may comprise a revolver design that carries a temperature sensor rod, as well as several pre-coated preforms. These are moved into the furnace along a linear axis. From the furnace, the fiber is led by endoscopic forceps through a diameter sensor, then through to the spooling system. Further, the environmental control unit and avionics bays are shown as well, the former responsible for maintaining low humidity, the latter for containing the electronics boards in a cooled environment. The endoscopic forceps may be autonomously controlled by at least one controller disclosed herein where the controller receives data from at least one sensor of the sensors disclosed herein to provide information to allow for autonomous operations.

As further shown in FIG. 8, the preform holder 165 may be a solid state revolver design that carries a temperature sensor rod 136, as well as several precoated preforms. These are moved into the furnace 160 along a linear axis. From the furnace 160, the fiber is led by endoscopic forceps through a diameter sensor 134, then through to the spooling system 150. Further, the environmental control unit 140 and avionics bays are shown as well, the former responsible for maintaining low humidity, the later for containing the electronics boards in a cooled environment.

Figure 9:
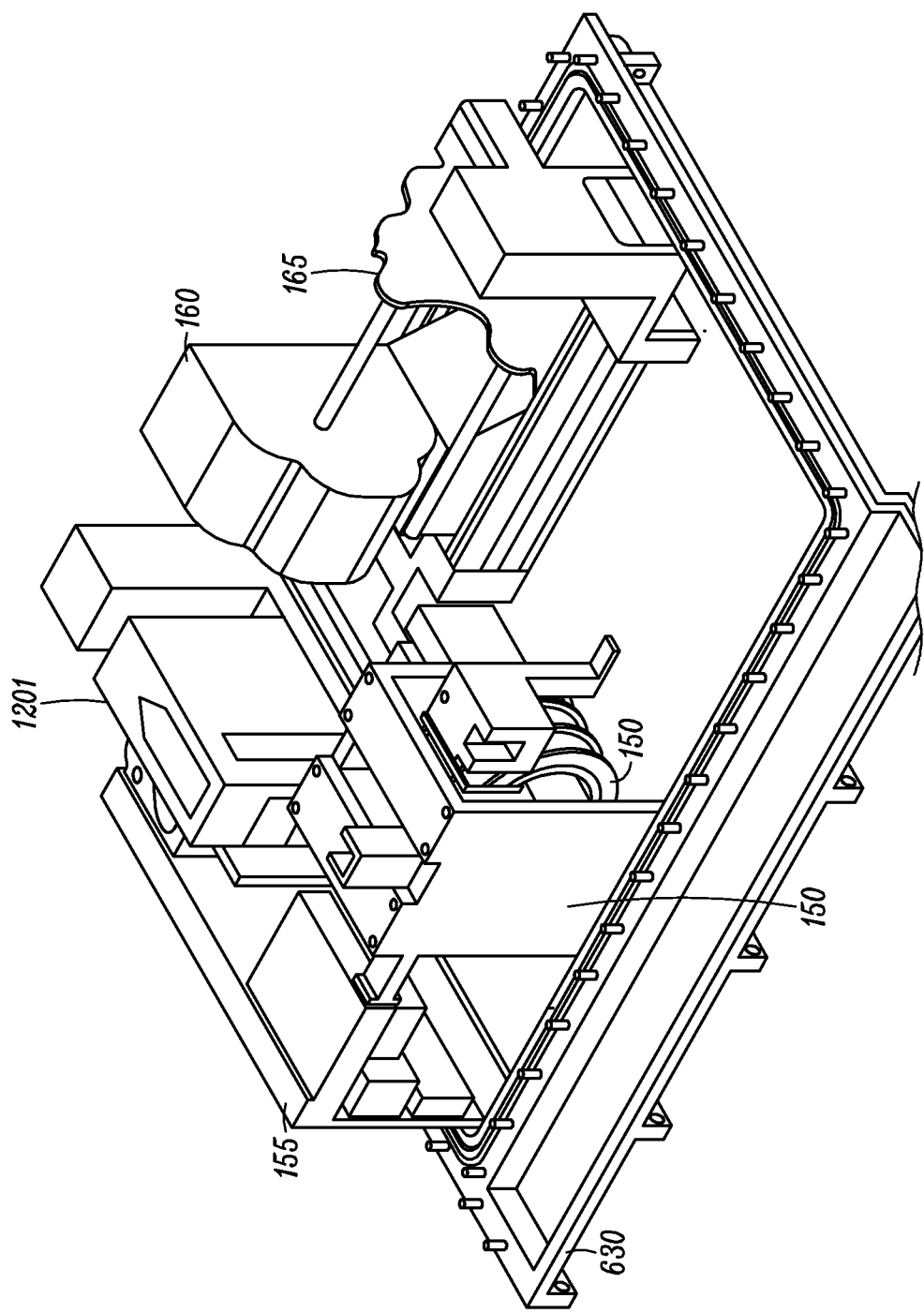
FIG. 9 illustrates another embodiment of the system.

Referring now to FIG. 9, a perspective view of an exemplary system for manufacturing optical fiber with pulling equipment shown is illustrated. In some aspects, the system may comprise a preform holder that may hold a series of preforms and at least one temperature probe 136. In some aspects, the preform holder does not include a temperature probe. The preform holder may alternately insert a preform and temperature probe into the furnace 160. Fiber may be drawn from a melted preform and directed into a diameter sensor, such as a laser scanner, that may monitor the diameter of the drawn fiber. Once the fiber reaches a target diameter, the subpar fiber may be disconnected and discarded into a waste collector, and the fiber within the diameter parameters may be guided onto a fiber redirection assembly 155, which may direct the fiber onto a spool.

Figure 10:
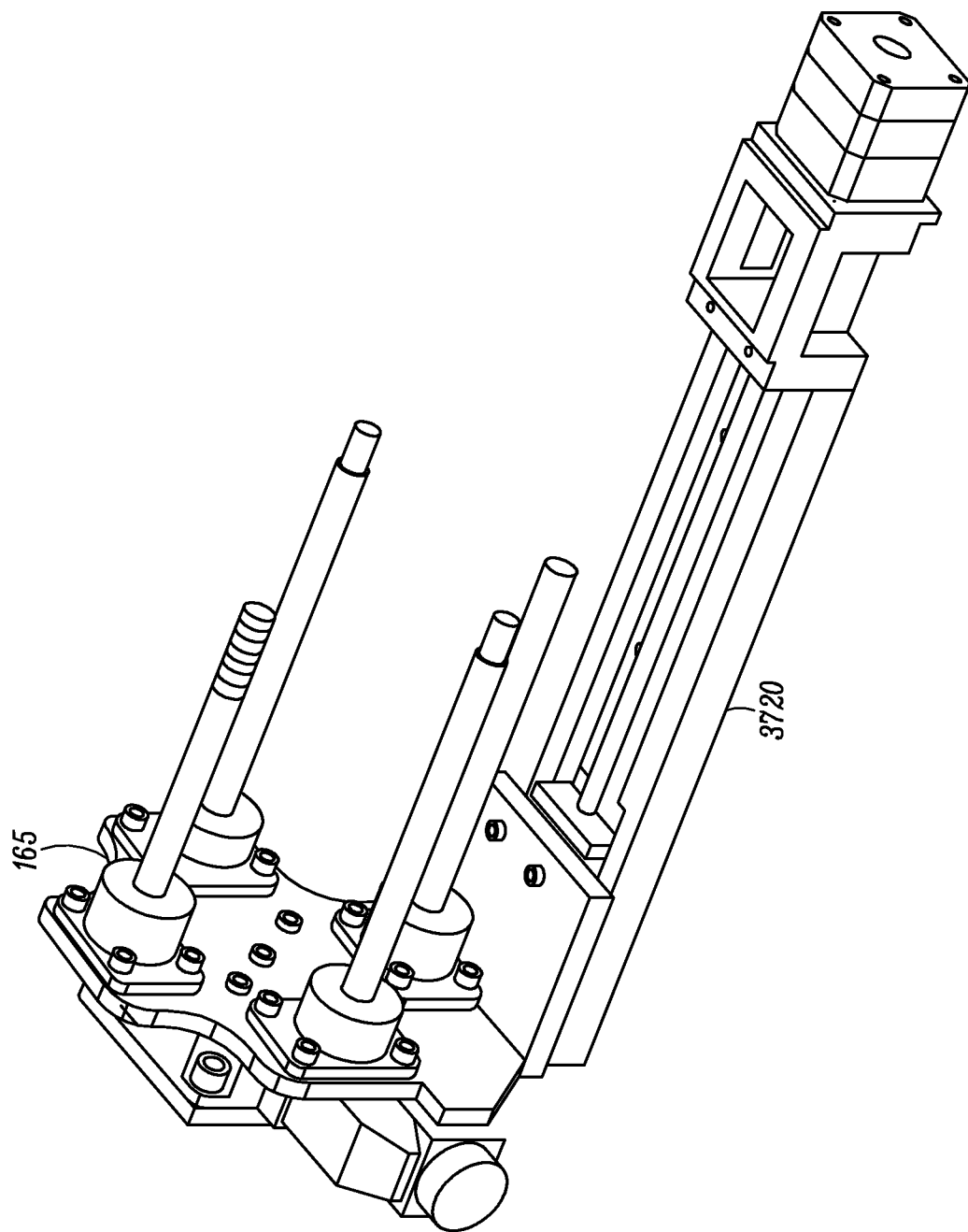
FIG. 10 illustrates an exemplary preform holder fitted to an exemplary furnace for a system for manufacturing optical fiber.

Referring now to FIG. 10, an exemplary preform holder for a system for manufacturing optical fiber is illustrated. In some aspects, the preform holder may comprise a revolver mounted on a high accuracy stepper motor, which may be mounted to a linear axis. In some embodiments, the preform holder may comprise a temperature probe that may be inserted into the furnace between preforms, which may ensure that the temperature profile within the furnace is constant.

Figure 11:
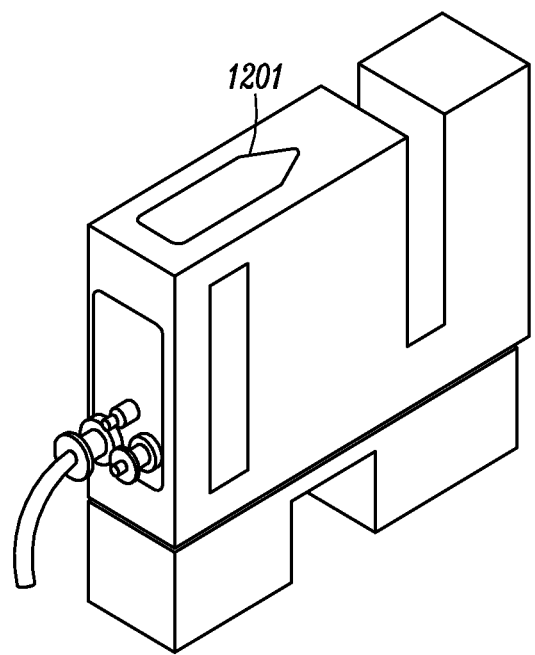
FIG. 11 illustrates an embodiment of a micrometer.

Referring now to FIG. 11, an exemplary micrometer 1201 for a system for manufacturing optical fiber is illustrated. In some aspects, a laser scanner, such as a high accuracy Aeroel XLS13XY/480, may measure both diameter and concentricity. In some implementations, such as where the system may be subjected to heavy vibrations, the micrometer may be secured to the housing to limit movement.

The furnace 160 is used to create the heated environment for the preform, or preform material. This environment will decrease the viscosity of the preform in certain sections, allowing the preform to be drawn into fiber. The furnace 160 may be cylindrical, with an opening at the top, or a first side, of the furnace 160 allowing for the preform to be inserted and an opening at the bottom, or a second side, allowing for the generated fiber to be pulled towards the spooling system.

The furnace 160 could have several possible designs. The current baseline is a stainless steel cylindrical element with inserted cartridge heaters, which are controlled using an active PID loop. In an embodiment, a furnace 160 may include a hot wire or pipe that has different modes of heating through different amounts of wire turns in a set volume, or by utilizing radiative methods with extremely hot localized elements.

Further, this furnace can have an installed system built in so that ambient gas can be drawn inside, heated, and forced into the furnace to create a temperature profile like one generated on Earth. The air pump, fans, and parameters necessary for this are being investigated.

Figure 12A:
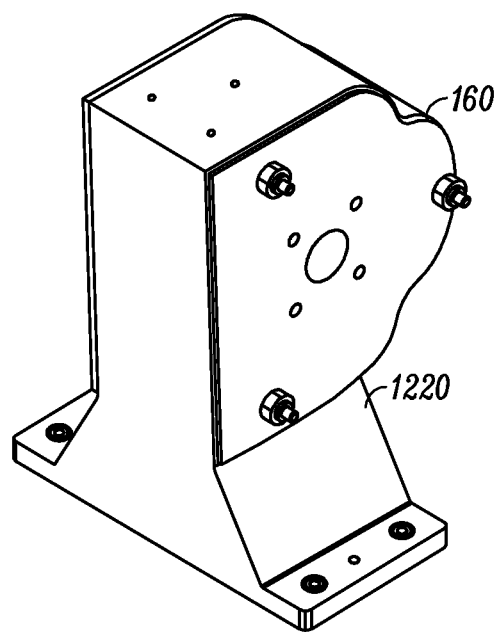
FIGS. 12A-12C illustrate an embodiment of the furnace.
Figure 12B:
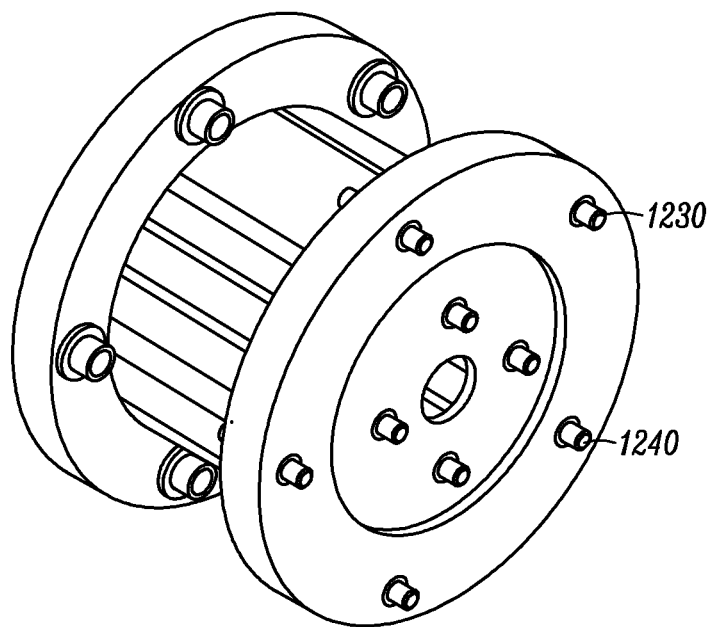
Figure 12C:
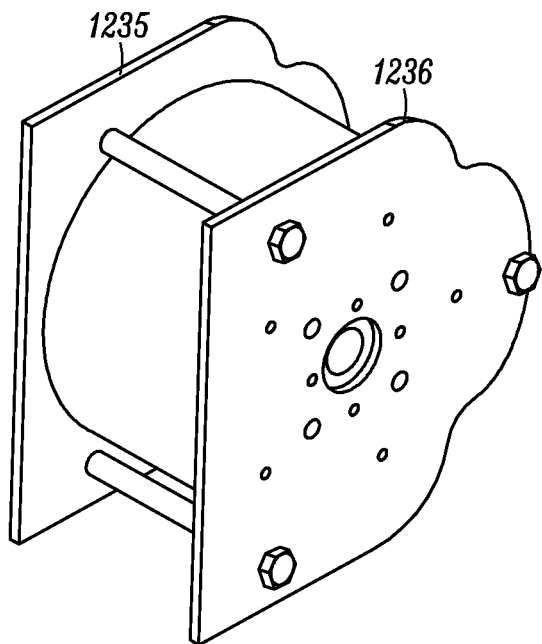

Referring now to FIGS. 12A-12C, perspective views of an exemplary furnace for a system for manufacturing optical fiber are illustrated. In some aspects, a furnace mount 1220 may comprise aluminum. In some embodiments, the heating element 1230 may be positioned between two graphite insulative pads 1235, 1236, which may keep the heating element in place while not conducting heat. In some implementations, the iris 1240 may be mounted to the furnace.

Figure 13A:
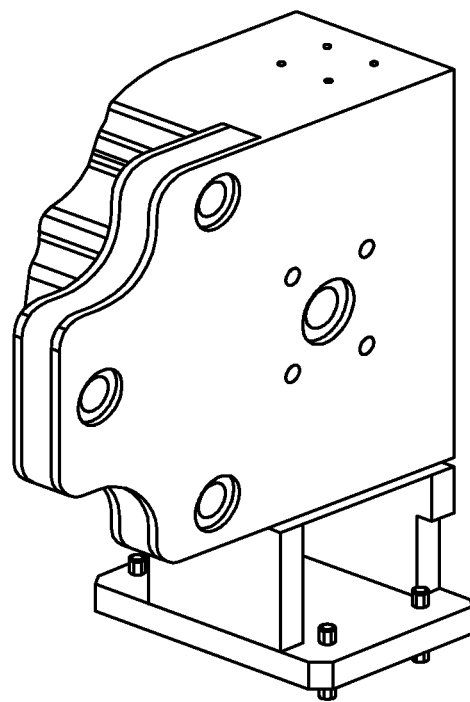
FIGS. 13A-13B illustrate further embodiments of the furnace.

Referring now to FIG. 13A, an exterior view of an exemplary furnace for a system for manufacturing optical fiber is illustrated.

Figure 13B:
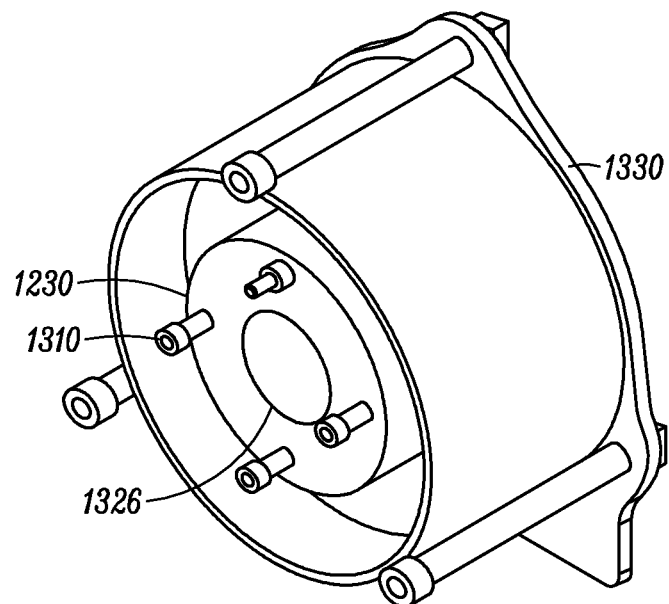

Referring now to FIG. 13B, an interior view of an exemplary furnace 160 for a system for manufacturing optical fiber is illustrated. The heated element 1230 is shown. As a non-limiting example, the heated element may be made of brass or another metal or material, such as, but not limited to a ceramic material. A tube is shown, such as, but not limited to a quartz tube 1320, to remove emissions from the heated element. An alignment pin and screws 1310 are also visible. A housing 1330 is shown. As a no-limiting example, the housing 1330 may be a stainless steel jacket.

The furnace 160 may be used to heat the preform so that fiber may be pulled from it. As a non-limiting example, the furnace 160 may comprise a stainless steel element heated by 4 cartridge heaters and, as a non-limiting embodiment, may use a plurality, such as, but not limited to up to 4, resistance temperature detectors (RTDs) to use proportional-integral-derivative (PID) control of the temperature. This element may be surrounded by a stainless steel jacket, with air or gas, insulation between the heated element and the outer jacket. The heated element is secured in the jacket using either insulative pads or screws. The jacket is then secured into a metal mount, which is bolted to the bottom plate of the structure.

As is illustrated herein, the furnace 160 could have a plurality of designs. In an embodiment, a stainless steel cylindrical element with inserted cartridge heaters is provided, which are controlled using an active PID loop. A quartz tube 1320 could also be included to ensure that emissions from the steel element do not affect the heated preform. Another non-limiting embodiment of the furnace 160 may include a hot wire or pipe that has different modes of heating through different amounts of wire turns in a set volume, or by utilizing radiative methods with extremely hot localized elements.

In some aspects, the furnace 160 may comprise a transparent material, wherein at least a portion of the interior of the furnace may be visible. A visible interior may allow for a precise initial fiber draw from the preform at a hotspot, where the preform is at a melting point or in molten form. In some embodiments, such as in microgravity, forceps may be inserted or touched to the surface of the molten form to initialize the fiber draw. Utilizing a hotspot to initialize the fiber draw may reduce loss of fiber that may occur through other draw methods. As a non-limiting example, where the preform may comprise a disposable tip, any portion attached to that tip may be wasted. In some aspects, the internal topography of the furnace 160 may be varied, wherein the variation may allow for predefined temperature profiles within the furnace.

In an implementation, the hotspot may be determined by directing a light source through the preform and measuring the light as it exits the preform. A pattern may be added to the bottom of the preform, wherein the pattern may change as the preform melts. As the pattern changes, one or both the shadow or the light may be distorted. The pattern may comprise an impression on the surface of the preform or may be coated with a pattern, such as with polytetrafluoroethylene (PTFE).

In an embodiment, forceps may draw fiber from the preform at a predefined location within the furnace. As a non-limiting example, one or both a temperature probe or temperature sensors may indicate the internal temperature profile of the furnace. A target pull location within the furnace may be based on the temperature profile, preform material properties, and speed of preform insertion. The initial fiber draw may draw the fiber from the furnace into the micrometer, which may measure the diameter of the fiber. The speed of insertion may be adjusted throughout the draw process to reach and maintain the target fiber diameter.

In some aspects, the furnace may comprise a heating core and an insulator portion, which may limit the heating of the ambient environment. The insulator portion may comprise a housing and an insulating material or mechanism. As an example, the insulator portion may comprise circulating air. Further, this furnace can have an installed system built in so that ambient gas can be drawn inside, heated, and forced into the furnace to create a temperature profile like one generated on Earth. The air pump, fans, and parameters necessary for this are being investigated.

Over time, the interior portion of the heating core may corrode, fiber may build up on the surface, or general damage may occur. In some aspects, where the system may be accessible, the heating core may be replaceable. A replaceable core may allow for extended use of the system without requiring extensive repairs. In some embodiments, the heating core may be replaced through automation or manually. The replaceable heating cores may ship with the system, wherein the heating cores may be replaced without requiring a separate launch. The replaceable heating cores may be launched in batches as needed or before needed, which may allow for continuous functionality of the system.

The temperature range of the furnace may be different for different types of preforms, such as different glass types or coatings. In some aspects, the temperature range may be adjustable. In some aspects, a furnace may be customized to a particular glass type, such as ZBLAN, which has a lower melting point than other standard optical fiber materials. In some embodiments, the heating core or the furnace may be interchangeable, which may allow for a change in glass type or preform size without requiring a completely new system.

Figure 14:
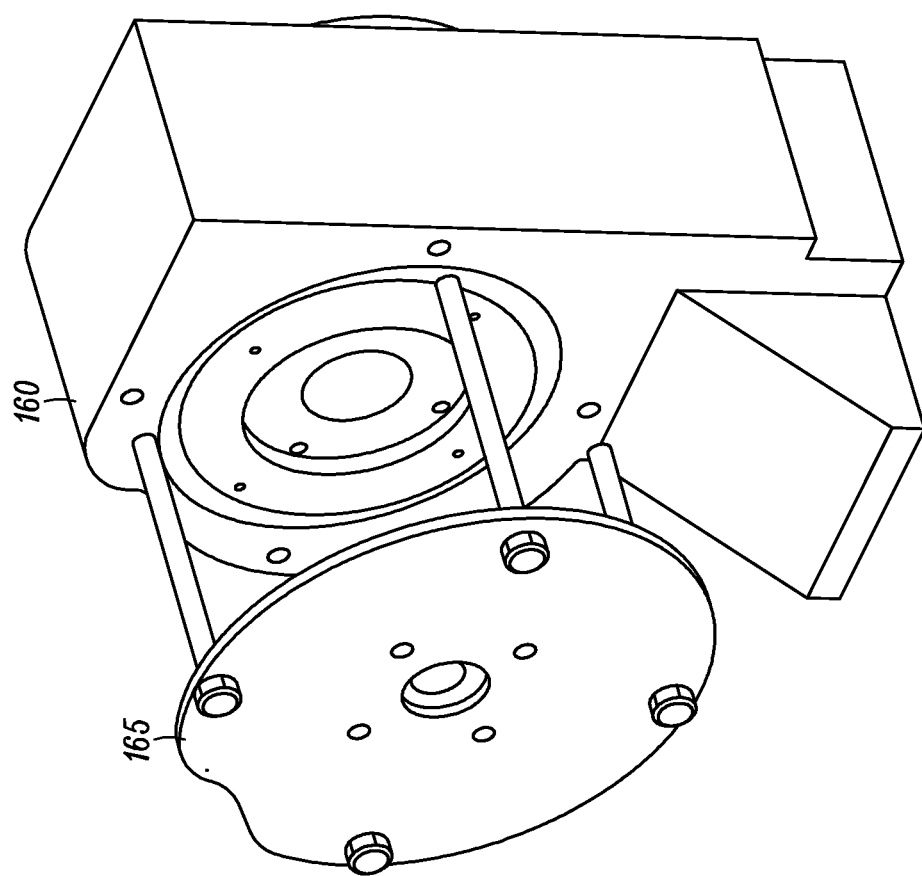
FIG. 14 illustrates an embodiment of a preform holder.
Figure 15:
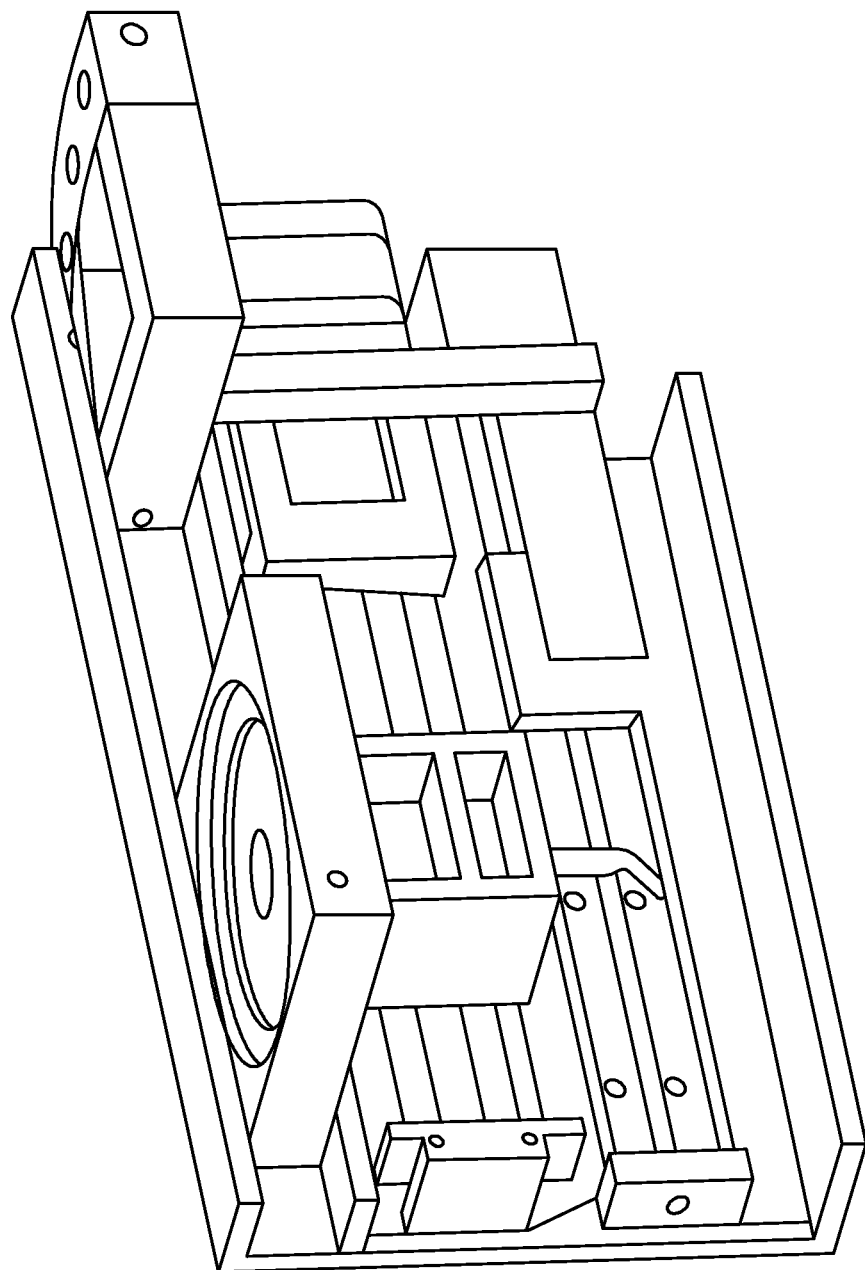
FIG. 15 illustrates an exemplary redirection assembly for collecting fiber in a system for manufacturing optical fiber.
Figure 16A:
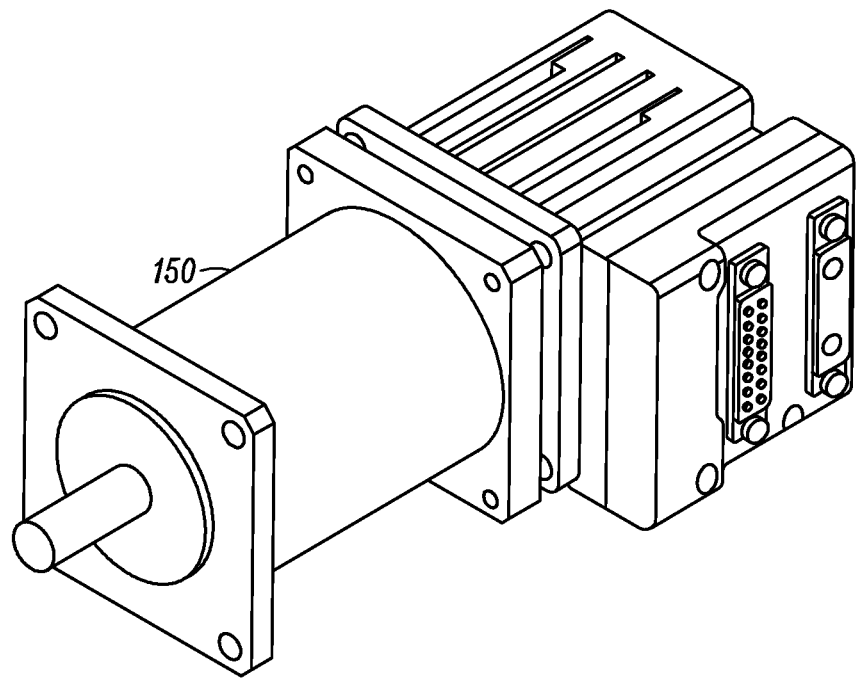
FIGS. 16A-16B illustrate an exemplary spooling mechanism for collecting fiber in a system for manufacturing optical fiber.
Figure 16B:
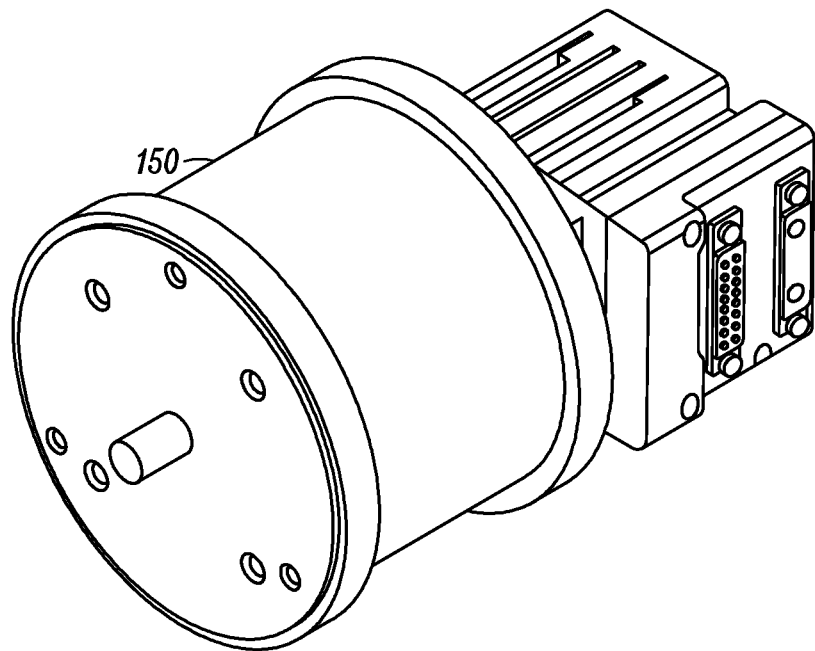

Referring now to FIG. 14, an exemplary preform holder fitted to an exemplary furnace for a system for manufacturing optical fiber is illustrated. In some aspects, pads (e.g., foam pads, rubber pads) may be integrated into the side of the furnace to contain the preforms during launch. The preforms may be contained in these pads to prevent damage from vibration during launch Referring now to FIG. 15, an exemplary redirection assembly for collecting fiber in a system for manufacturing optical fiber is illustrated. In some aspects, the redirection assembly may be a compact version of full wheels, wherein both redirectors may move independently. The one towards the spool may translate the fiber during spooling and may integrate a full wheel and tension sensor. The one towards the furnace may move to allow for waste disposal Referring now to FIGS. 16A-16B, an exemplary spooling mechanism for collecting fiber in a system for manufacturing optical fiber are illustrated. FIG. 16A shows the spool component without an outercover. In some embodiments, the spool 150 may comprise an embedded DC motor and gearbox 128. A passive clamp may be used to grip fiber down to the spool. For example, RPM may be less than 50 at all times to reduce chance of breaking the fiber.

Figure 17:
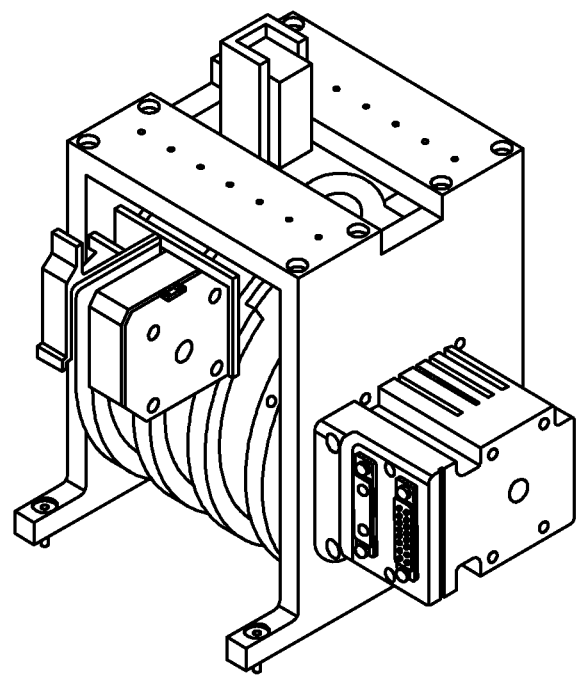
FIG. 17 illustrates an exemplary spooling mechanism for collecting fiber in a system for manufacturing optical fiber.

Referring now to FIG. 17, an exemplary spooling mechanism for collecting fiber in a system for manufacturing optical fiber is illustrated.

Figure 18:
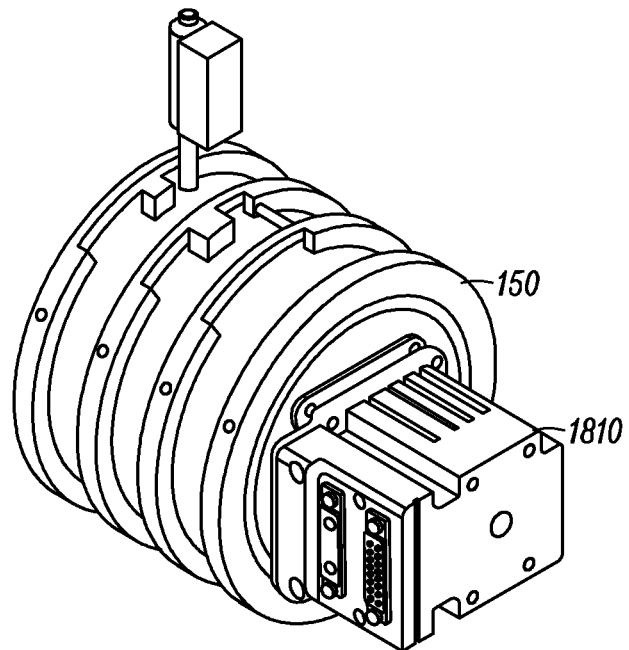
FIG. 18 illustrates an exemplary spooling mechanism with clamp for collecting fiber in a system for manufacturing optical fiber.

Referring now to FIG. 18, an exemplary spooling mechanism with clamp for collecting fiber in a system for manufacturing optical fiber is illustrated. The spool 150 may use a clamp, springs, and a small magnet to initialize a clamp on the fiber. A servo 1810 may move the magnet down, make contact on the clamp, and pulling up. The fiber may be drawn under the clamp. The servo may pull up farther, breaking the connection between the magnet and clamp. The spring may bring the clamp down onto the fiber and pin it.

Figure 19:
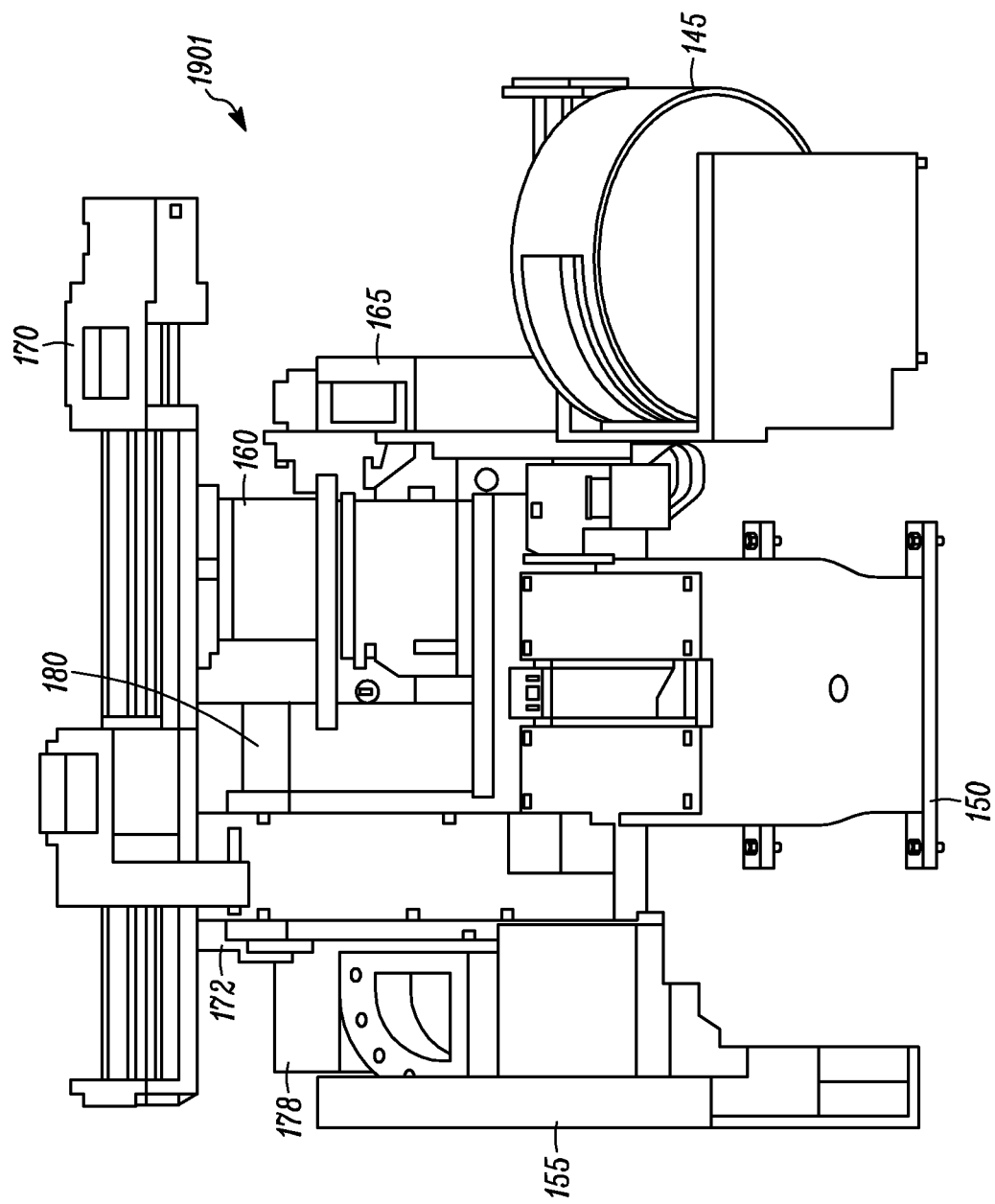
FIG. 19 illustrates an exemplary perspective view of an exemplary system for manufacturing optical fiber with start/stop systems shown.

Referring now to FIG. 19, an exemplary a perspective view of an exemplary system for manufacturing optical fiber with start/stop systems shown is illustrated.

The start/stop subsystem 1901 is a general name for starting the pulling process, as well as ending it. The subsystem 1901 interfaces with a spooling subsystems extensively. The system 1901 begins the necking process of the preform as disclosed herein, either by poking the molten end of it, or by pulling a large section of the bottom. Once the neck is formed, the waste can be disposed of, and a subsystem used to draw the fiber through the entire system, eventually attaching the fiber to a spool. There can be several different tractors, cutting assemblies, and irises used for this process.

A grabber mechanism is provided which inserts into an attached mount on the preform. The grabber inserts into the preform once the preform is inserted into the hot spot, applying a constant force to simulate 1G of gravity or the force of Earth's gravity. The grabber may then pull the bottom chunk of material and mount back, then cut the residual off the main fiber strand. Irises and pinch wheels 180 then may be provided to close around the fiber strand, inserting the fiber into a waste bin until it is the proper size to go through the rest of the system. Endoscopic forceps extend from behind the spool, through a clamp and two-redirection assemblies, though a single redirection assembly may be used, and grabs the end of a cut fiber that has been pulled from the preform. The forceps then draw this fiber back through the system and to the spool, where the fiber is attached. Drawing of the fiber can then commence.

In order to stop pulling, the preform feeding is stopped, and either the fiber is cut or allowed to break at the neck. The spool continues to pull this loose fiber through the system, where it is finally secured to spool for safe keeping until reentry, bringing the fiber back to Earth for use.

Figure 20B:
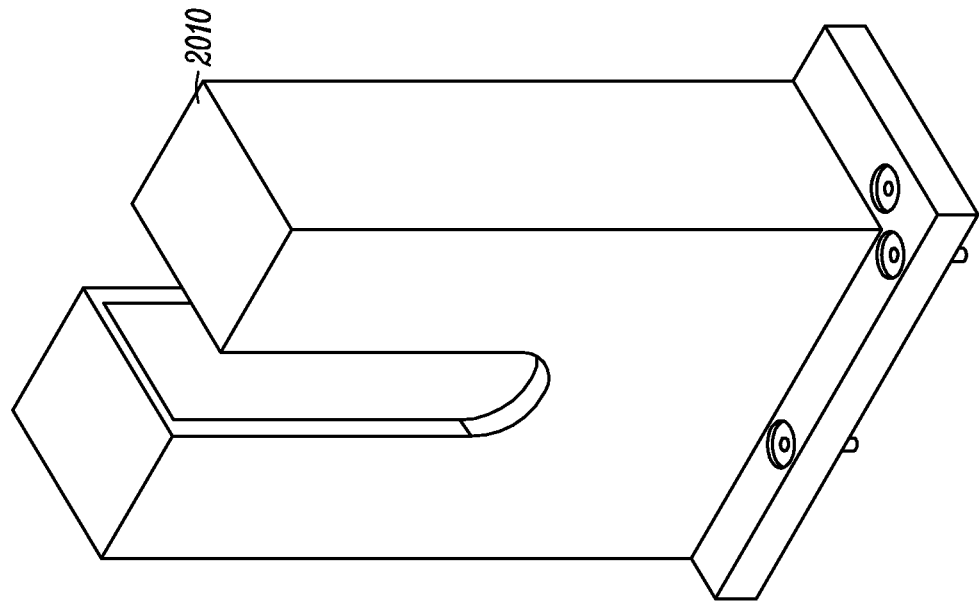
FIGS. 20A-20B illustrate an exemplary pinch wheel assembly for gripping fiber in a system for manufacturing optical fiber.
Figure 20A:
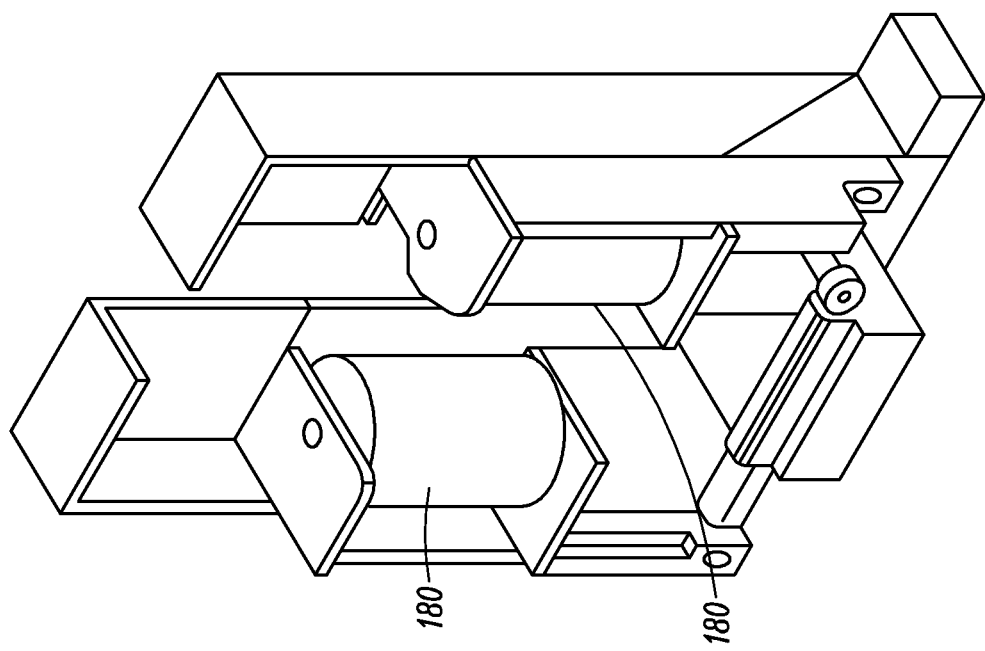

Referring now to FIGS. 20A-20B, a perspective view of an exemplary system for manufacturing optical fiber with start/stop systems shown is illustrated. A pinch wheel assembly 180 may be used to grip fiber and get it to desired diameter before drawing through system. This assembly may be removed based on testing, depending on fiber sensitivity to bending, as well as size of fiber when drawn out of furnace. A cover 2010, as shown in FIG. 20B, may also be provided.

Figure 21C:
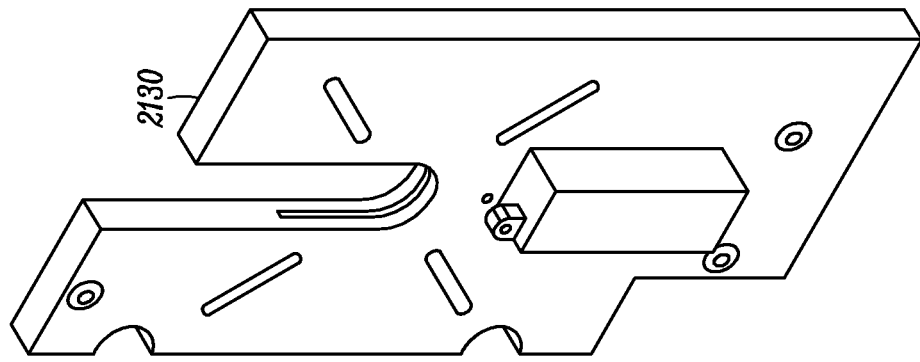
FIGS. 21A-21C illustrate an exemplary centering mechanism in a system for manufacturing optical fiber.
Figure 21B:
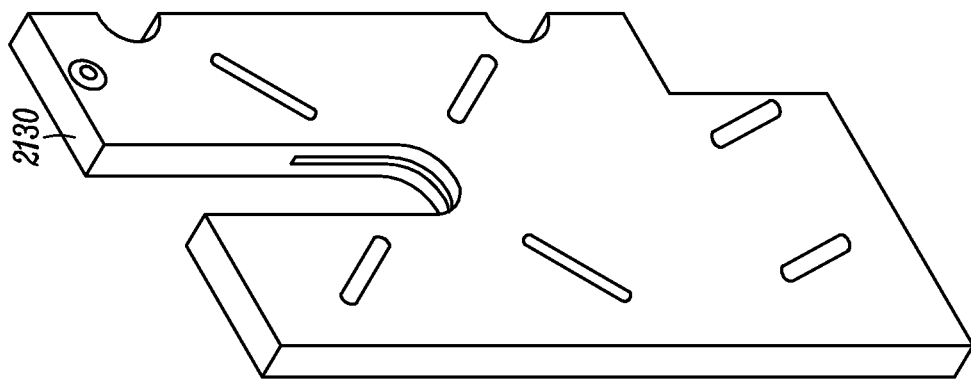
Figure 21A:
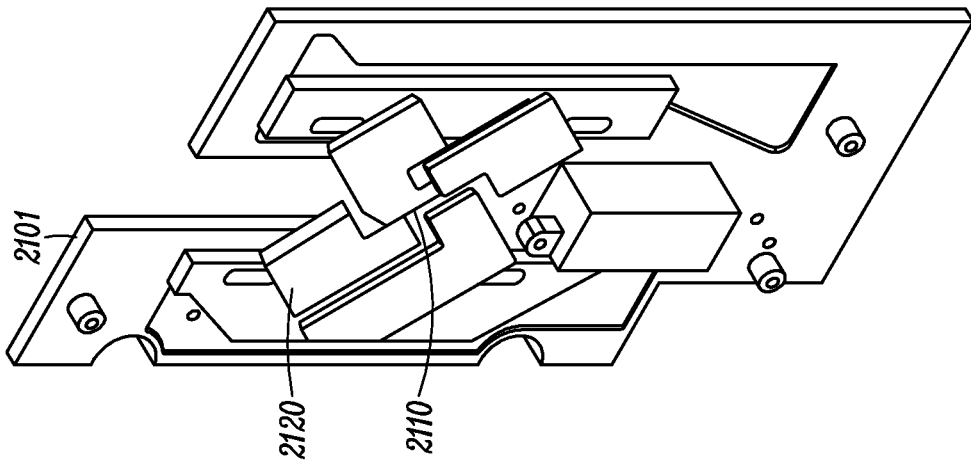

Referring now to FIGS. 21A-21C, an exemplary centering mechanism 2101 in a system for manufacturing optical fiber is illustrated. An iris 2110 may be used to center the fiber for the start/stop process. In some aspects, the iris 2110 may comprise a servo and machined parts 2120 that may fit into each other as the fiber is centered. A covering 2130, as shown in FIGS. 21B-21C, may be provided to enclose the components associated with the iris.

Figure 22:
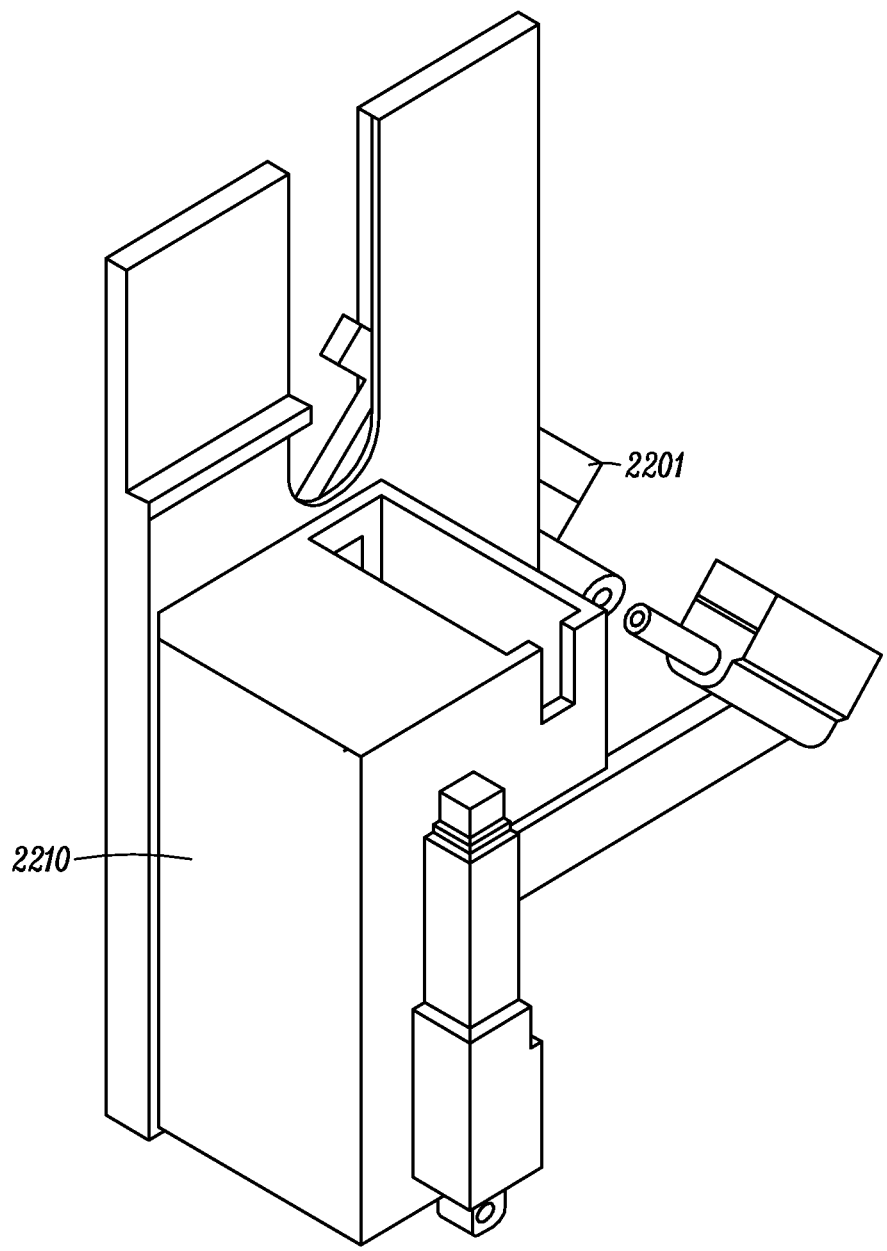
FIG. 22 illustrates an exemplary fiber cutting mechanism with waste collector in a system for manufacturing optical fiber.

Referring now to FIG. 22, an exemplary fiber cutting mechanism 2201 with waste collector 2210 in a system for manufacturing optical fiber is illustrated. In some aspects, a wire cutter may be heated nichrome wire, which may cut through the fiber. The cutting mechanism 2201 may be used to end the process, as well as during certain parts of the start process. The waste collector 2210 may be used to keep waste fiber and used to contain large preform 'drops.' A fan may be used to ensure all waste is sucked to the bottom of the container.

Figure 23B:
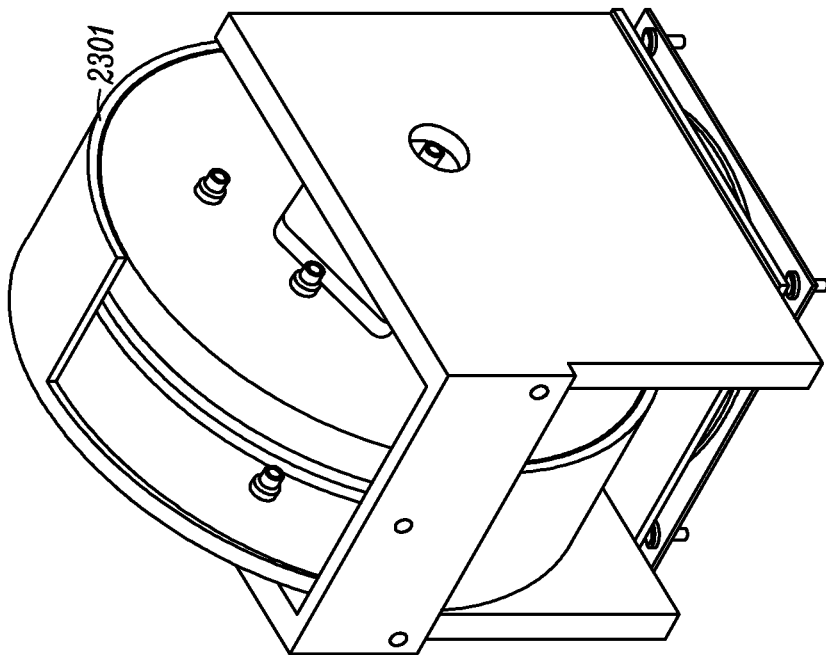
FIGS. 23A-23B illustrate an exemplary endoscope spool mechanism in a system for manufacturing optical fiber.
Figure 23A:
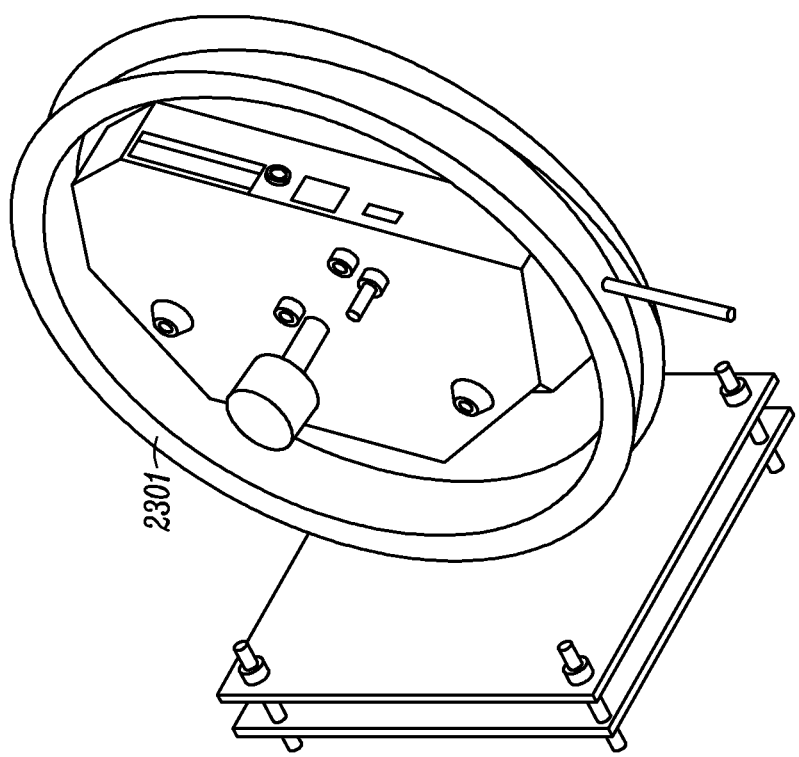

Referring now to FIGS. 23A-23B, an exemplary endoscope spool mechanism in a system for manufacturing optical fiber is illustrated. An endoscopic spool may hold and control the opening and closing of the forceps. In some aspects, the endoscopic spool 2301 may be located behind the spooling mechanism, and the endoscopic spool 2301 may feed the forceps through the system, where it may release the fiber onto the spooling mechanism.

Figure 24:
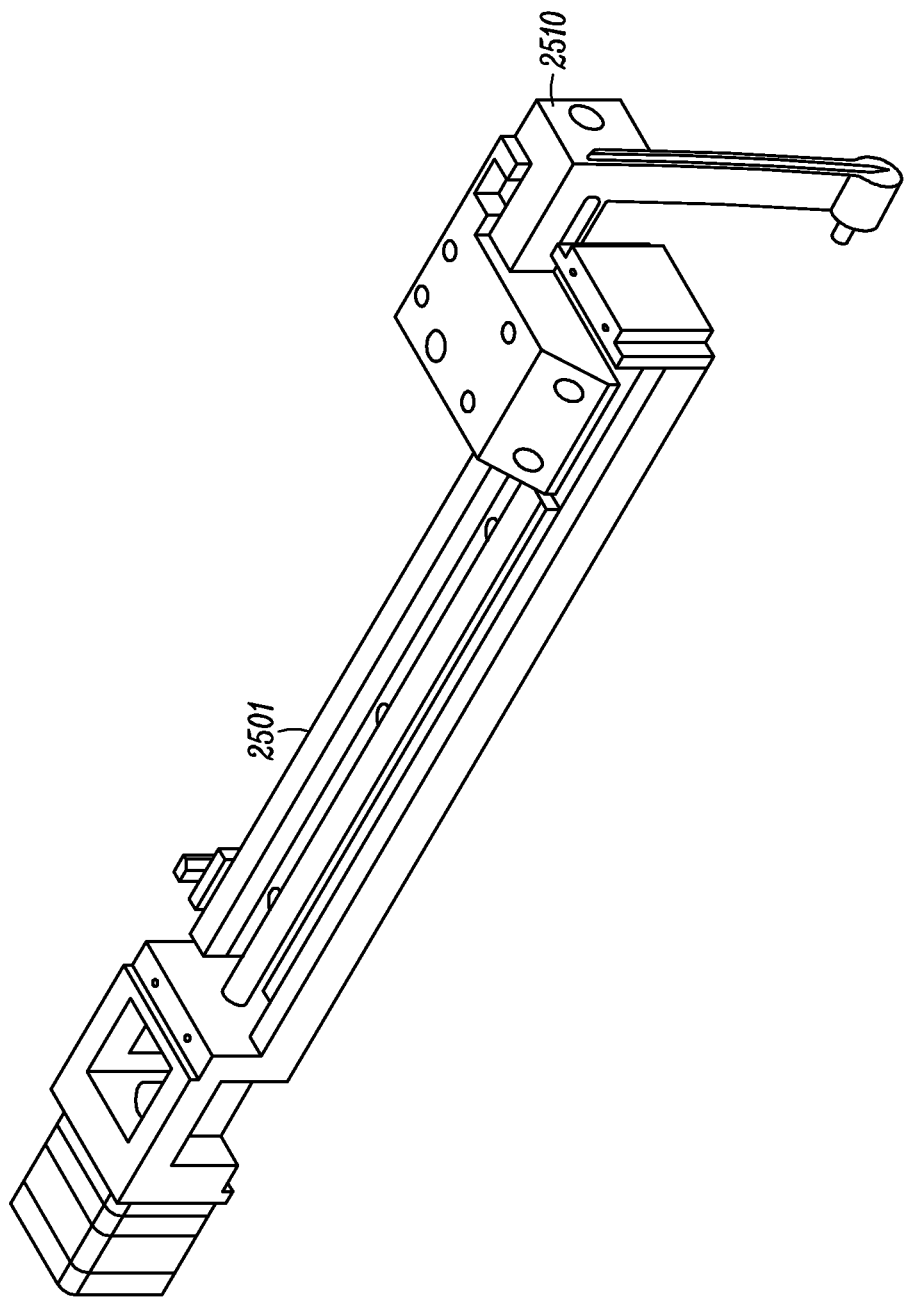
FIG. 24 illustrates an exemplary gripping mechanism for initializing draw from the preform in a system for manufacturing optical fiber.

Referring now to FIG. 24, an exemplary gripping mechanism 2501 for initializing draw from the preform in a system for manufacturing optical fiber is illustrated. A gripper 2510 may be used to insert into preattached grips on the preform. The gripper 2510 may also be referred to as a force sensor as it creates 1G of gravity to initiate drawing the optical fiber form the preform material. The gripper mechanism may contain a small load cell to ensure force remains in acceptable tolerance. In some aspects, the gripper may pierce the tip of a viscous preform, wherein pulling the piercing may initiate a fiber draw.

Figure 25:
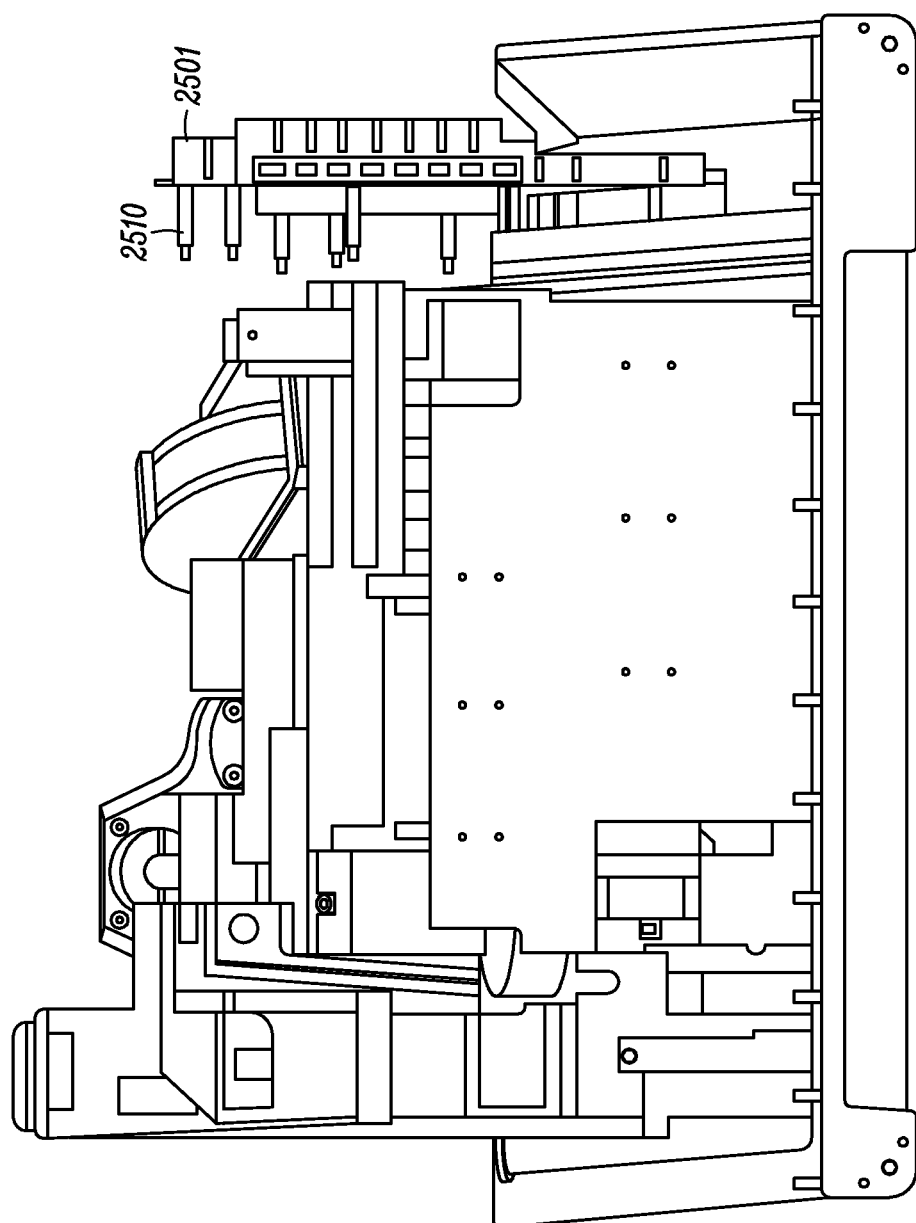
FIG. 25 illustrates an exemplary perspective view of an exemplary system for manufacturing optical fiber with an exemplary gripping mechanism highlighted.

Referring now to FIG. 25, a perspective view of an exemplary system for manufacturing optical fiber with an exemplary gripping mechanism 2501 highlighted is illustrated. The gripper 2510 can be moved out of the way to allow for the fiber redirection assembly to be moved into place, which may also allow for residual globs to be added to the waste collector.

The system described herein is sealed to prevent any infiltration of humidity and filled with a dry environment. This environment could be maintained with a gas pump circulating air through a high efficiency particulate air (HEPA) filter, a carbon black filter, and molecular sieve, or other forms of environmental control, such as pumping in fresh nitrogen from the exterior.

In some implementations, the system may comprise an environment control unit (ECU) 140. The ECU 140 is used to maintain the environment when the pulling operation is not occurring. The ECU 140 utilizes filters to eliminate particles, volatiles, and humidity from the inert gas atmosphere inside the environment. In an embodiment, the ECU 140 may use a fan to suck air through a filter, such as but no limited to a HEPA filter, and activated charcoal. This air is then pushed through a molecular sieve. The molecular sieve may have baffles to create a long path for the flow through the sieve. Thus, the ambient environment can be completely clean including filtering out of water.

The ECU 140 may be periodically active, such as during operation of the furnace. In some embodiments, such as where materials may be restocked, the system may be continuously operating. The ECU 140 may continuously operate, may operate periodically, or based on monitored conditions.

In some aspects, an ECU 140 may maintain the environment according to predefined condition parameters. An ECU 140 may comprise a filter and a fan that may draw air into the filter. The filter may comprise one or more a HEPA filter, charcoal, specialized ceramic, or a molecular sieve, as non-limiting examples. In some aspects, surface area may be increased through use of baffles or tubing. Tubing may allow the ECU 140 to be adapted into non-standard shapes and fit between the components in the system. The ECU 140 may comprise passive and active components. For example, the fan may draw air through the ECU 140 when the system is active, such as when the furnace is on or fiber is being spooled. The ECU 140 may passively filter the air when the system is not in operation and a separate circulation device, such as a fan, may be collecting debris from a prior fiber draw.

In some embodiments, the ECU 140 may be replaceable, such as where the system is accessible. Where the system may be opened and accessed, the ECU 140 may be periodically replaced manually or through automation. In some aspects, the environment may be large enough to include an automation system that may replace consumable and damaged components. The ECU 140 may not be activated until the system is in use or at least until the system is sealed. For example, the ECU 140 may periodically run while the system is in storage to maintain the environment within the predefined parameters.

In some aspects, the ECU 140 may be engaged during the assembly process, wherein the ECU 140 may initiate the purging of the system, as the housing is hermetically sealed. The system may be over-pressured and under-pressured to effectively purge the environment. One or more the system or its components, such as, but not limited to, the filter, molecular sieve, pump or fan and an inner or internal surface of the ECU 140 housing, may be baked until they are effectively outgassed. The entire system may be flushed with nitrogen gas, helium, or other gas to control the oxygen levels. In some aspects, where the system is flushed with an inert gas, at least a portion of the assembly may occur within an inert gas environment. In some aspects, the components or preforms may be pretreated before assembly, such as with methanol.

In some embodiments, an ECU 140 may comprise a cooling mechanism that may supplement general airflow mechanisms in the case of emergencies. For example, in the event of a failure, there may be a need to quickly lower temp to prevent fiber from sticking to walls of the furnace or other parts within the box. If the furnace overheats, a cooling mechanism may reduce damage from furnace failure.

Figure 26A:
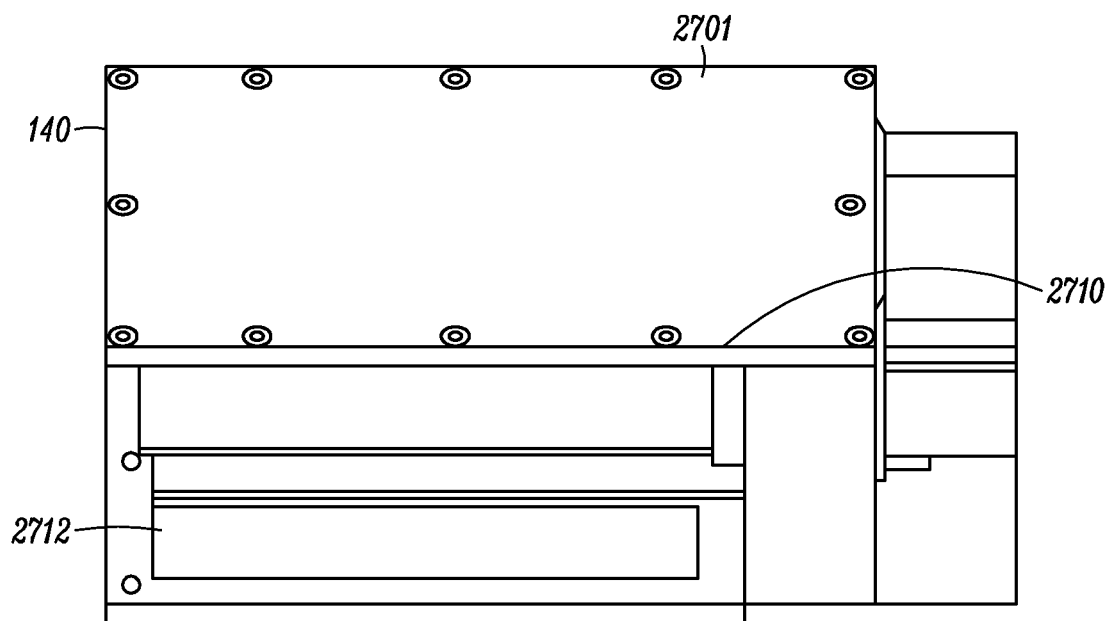
FIGS. 26A-26B illustrate an exemplary environmental control unit in a system for manufacturing optical fiber.
Figure 26B:
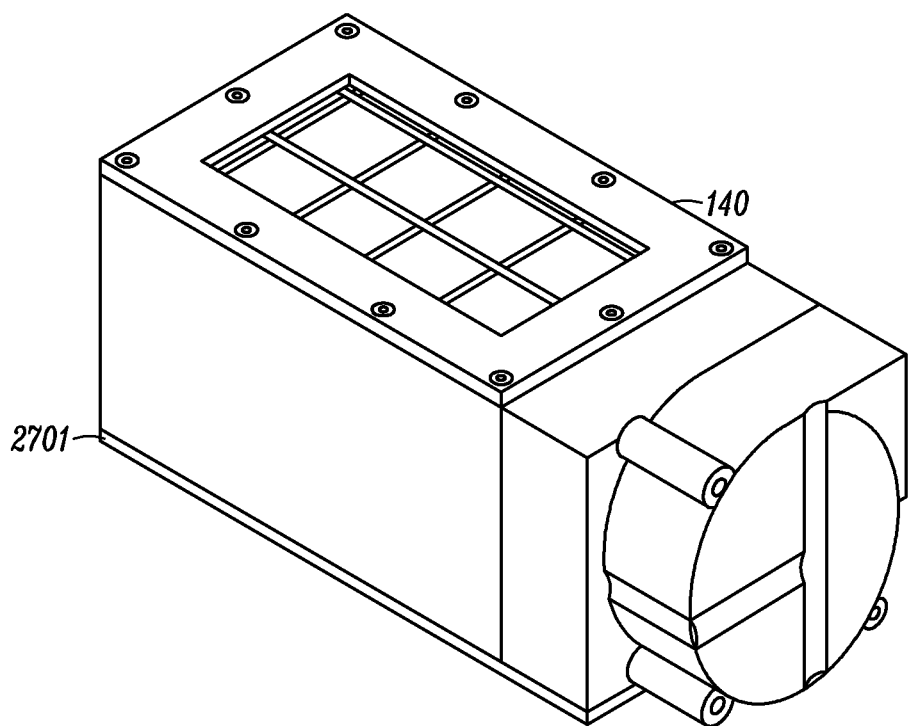

More particularly, referring now to FIGS. 26A-26B, an exemplary environmental control unit in a system for manufacturing optical fiber is illustrated. In some aspects, an ECU 140 may comprise a compact rectangular package 2701, or housing, but with the incorporation of baffles, can still give a long residence time of the air with the sieve 2720. It can be used with either a high throughput fan, or a higher pressure pump. It incorporates both a charcoal filter 2710 and HEPA filter 2712. Note that these filters will be the first to touch the flow, so that only clean, slow, and uniform airflow touches the molecular sieve 2720. Moreover, these filters can clean the interior of anything outgassed during a pull. In some embodiments, the ECU may have integrated humidity sensors. The ECU 140 may communicate with sensors located throughout the system, such as sensors for temperature, pressure, or contamination.

Thus, as shown, activated charcoal filters 2710 (or carbon black filters) and HEPA filters 2712 are located in order to cleanse the air from any contaminants. Then, a molecular sieve 2720 is contained in a series of meshes and baffles, which dehumidifies the air or dry the air to the single PPM range. This subsystem is used both before unit operation, to dry any residual humidity from the environment during a bake out, and between operations to filter any outgassed air.

Other configurations than the box configuration can be used, such as, but not limited to a cylindrical configurations and a tube configuration. Thus, form factor of the unit to change based on what is needed for the flight system.

The molecular sieve 2720 may be contained in a series of meshes and baffles, which dehumidifies the air. The molecular sieve 2720 may dry the air to the single PPM range. This subsystem may be used both before unit operation, to dry any residual humidity from the environment during a bake out, and between operations to filter any outgassed air. Configurations other than the box configuration may be used, including, for example, cylindrical configurations tube shaped systems. These allow the form factor of the unit to change based on what is needed for the flight system.

In some implementations, scrubbing/cleaning a gas environment of moisture may enhance the manufacturability of fiber optic materials in a contained environment. In some aspects, drawing (pulling)/pushing the environmental fluid through a filter membrane then through a molecular sieve then back to the environment may be autonomous and inherent to the closed system. By using a closed system, it ensures environmental quality of the fluid, thus limiting the chance for imperfections/defects in the manufacture in the fiber optic material. The system operates by sensing the humidity in the environment and then turning on when it becomes greater than the set desired level. The manufacturing environment may be isolated from external environmental elements.

Figure 27:
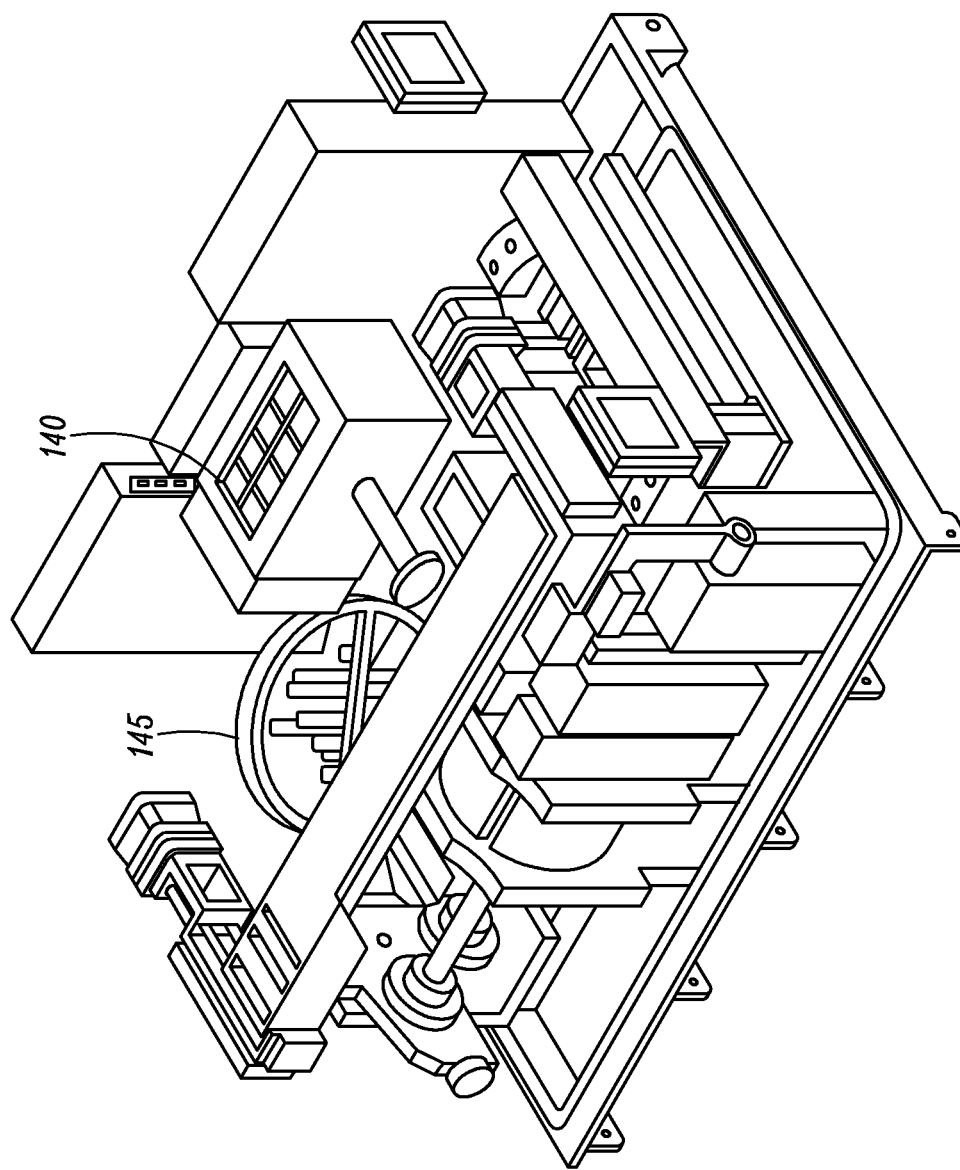
FIG. 27 illustrates an exemplary perspective view of an exemplary system for manufacturing optical fiber with an exemplary environmental control unit highlighted.

Referring now to FIG. 27, a perspective view of an exemplary system for manufacturing optical fiber with an exemplary environmental control unit highlighted is illustrated.

Figure 28:
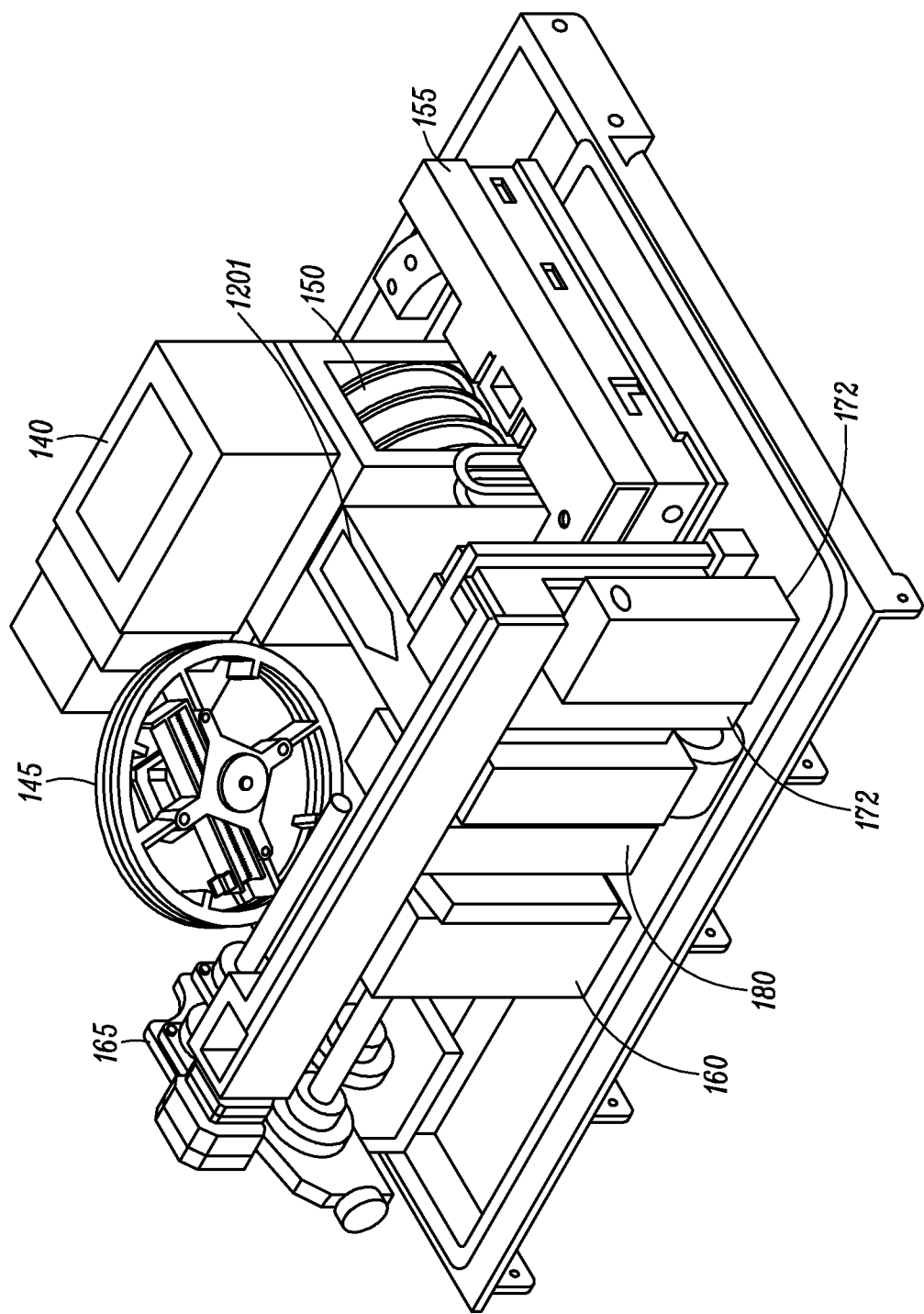
FIG. 28 illustrates another embodiment of the system.

FIG. 28 is another embodiment of the system. As shown, the system comprises the ECU 140, the spool, a redirection assembly, a waste water disposal container. A cutting device, a micrometer, pinch wheels, the furnace, the preform holder and the endoscopic forceps.

A method provides for scrubbing/cleaning a gas environment of moisture, water, to enhance the manufacturability of fiber optic materials in a contained environment. This method utilizes a method of drawing(pulling)/pushing the environmental fluid through a filter membrane then through a molecular sieve then back to the environment. This method is autonomous and inherent to the closed system. By using a closed system, it ensures environmental quality of the fluid, thus limiting the chance for imperfections/defects in the manufacture in the fiber optic material. They system operates by sensing the humidity in the environment and then turning on when it becomes greater than the set desired level. The manufacturing environment will be isolated from external environmental elements.

Thus, the method comprises sensing humidity in the environment, where an optical fiber is being manufactured, with a sensor. The method further comprises relaying the sensed data to a controller. The method also comprises drawing environmental fluid through a filter membrane then through a molecular sieve then back to the environment with at least one of a fan and a pump based on the sensed data to control environmental conditions where the optical fiber is being manufactured as controlled by the controller.

The method may also comprise comprising accelerating flow reduction to a lower temperature with a cooling mechanism. Also, the method may comprise outgassing at least one of the filter, the molecular sieve, at least one of the pump and the fan and an internal surface of the housing with a heater.

Figure 29:
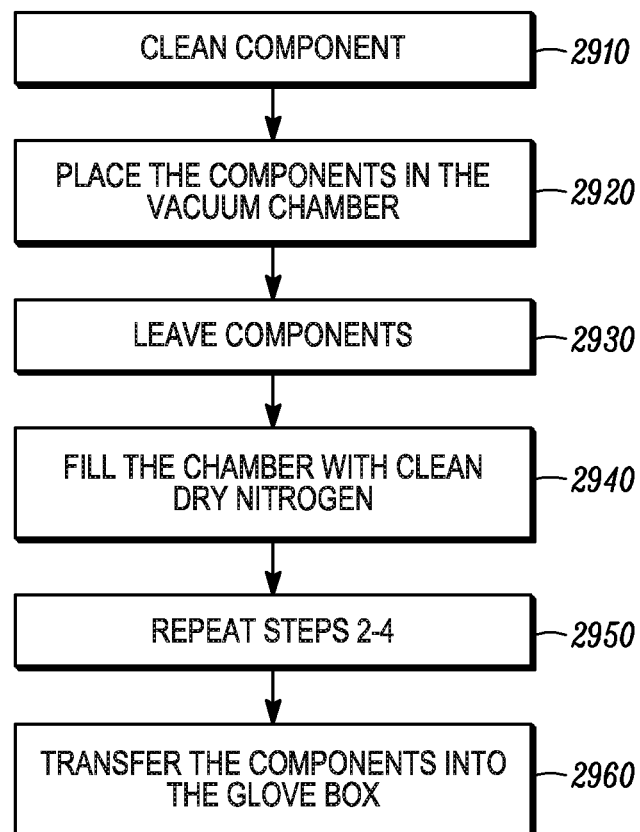
FIG. 29 illustrates exemplary method steps for removing component moisture in preparation for pre-coating a preform.

Referring now to FIG. 29, exemplary method steps for removing component moisture in preparation for pre-coating a preform are illustrated. The method 2900 may comprise the components that may be cleaned of all oils and contaminates using the proper solvent/cleaner for the material, at 2910. The components may be placed in the vacuum chamber of the glovebox and open the vacuum valve, at 2920. As a non-limiting example, the components may be left in the chamber for 30 minutes to an hour, at 2930. The chamber may be filled with clean dry nitrogen at 2930. The steps in the glovebox may be repeated, at step 2950, and the components may be transferred into the glove box with the environmental atmosphere being circulated through a molecular sieve, at step 2960.

Figure 30:
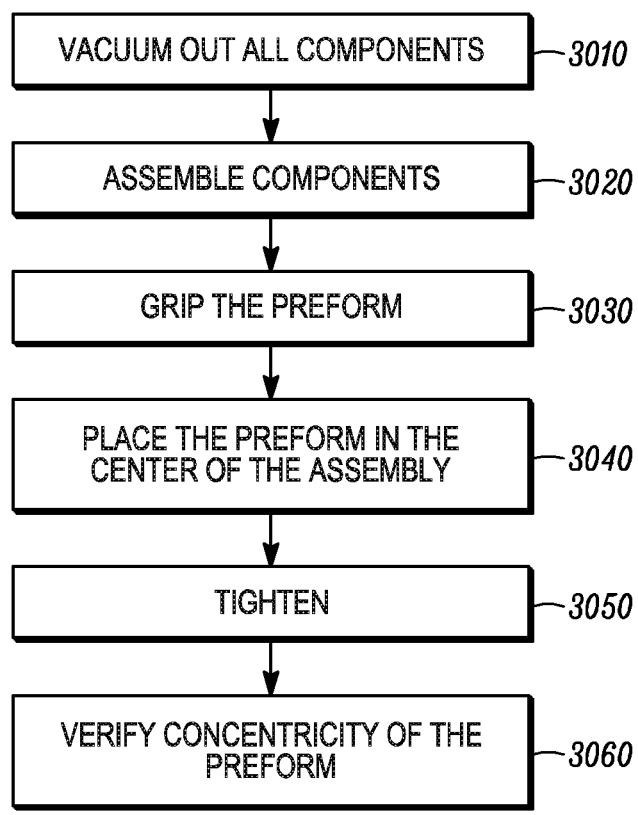
FIG. 30 illustrates exemplary method steps for assembling fixtures in preparation for pre-coating a preform.

Referring now to FIG. 30, exemplary method steps for assembling fixtures in preparation for pre-coating a preform are illustrated. The method 3000 comprises the components that may be vacuumed, at step 3010, and then assembled, at step 3020. The preform may be gripped, at step 3030, so that approximately 0.5 inches (8 mm), plus or minus a quarter of an inch, is being gripped by a collet. The preform may be placed in the center of the assembly, at step 3040, so that if spun the preform remains as concentric as possible. Tightening may be performed, at 3050, so that the collet grips the preform, wherein not to over tighten limitations are provided. In an embodiment, hand tight is fine. The concentricity of the preform may be verified, at step 3060, by turning the assembly and observing the preform.

Figure 31:
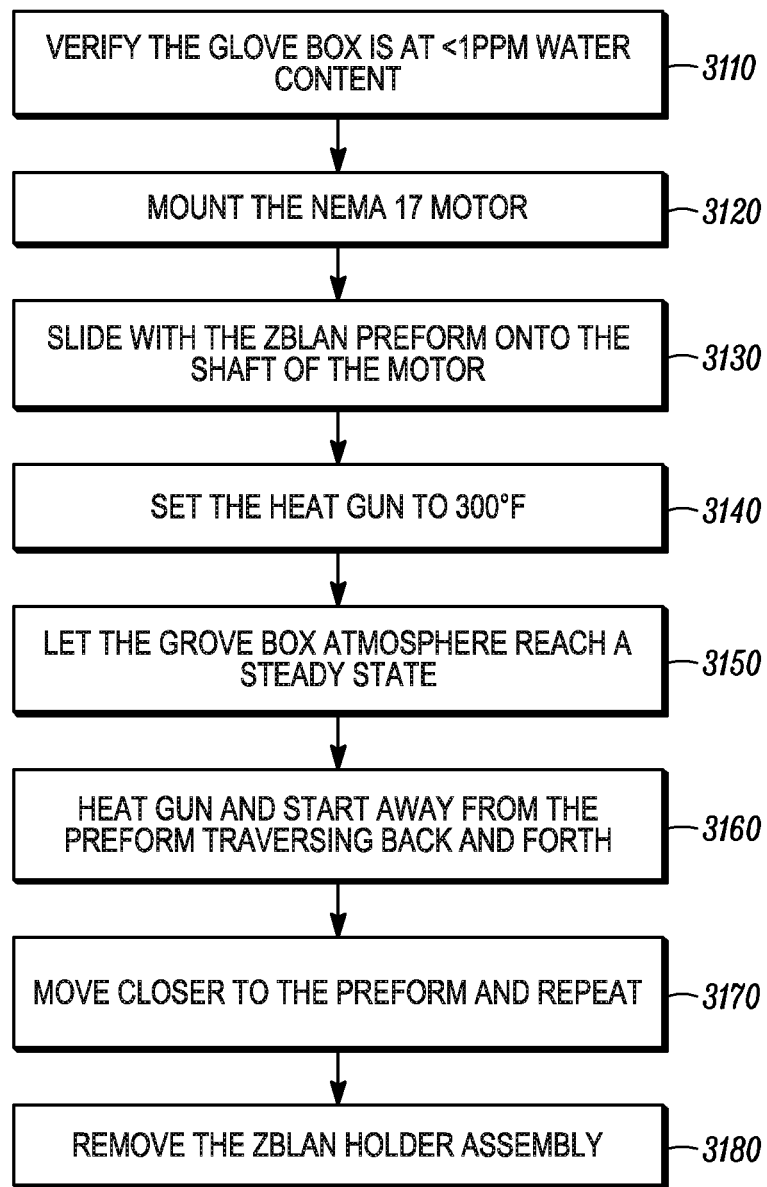
FIG. 31 illustrates exemplary method steps for preheating a preform in preparation for pre-coating a preform.

Referring now to FIG. 31, exemplary method steps for preheating a preform in preparation for pre-coating a preform are illustrated. The water content of the glove box may be confirmed for <1 PPM water content, at step 3110. The motor, which may be a stepper motor, such as but not limited to a NEMA 17 motor, may be mounted, at step 3120, approximately 8-10 inches, plus or minus one inch, vertically in an area a heat gun freely may be freely manually manipulated. Though a heat gun is disclosed, other heat producing or generating sources may be used. Therefore, a heat gun is non-limiting. The preform holder may be slid with the ZBLAN preform onto the shaft of the motor, at step 3130, and turn the motor on to a desired speed, such as but not limited to 30 RPM. A heat gun may be provided and set at a desired temperature, at step 3140, such as, but not limited to approximately 300° F. (149° C.), plus or minus five degrees, at a low fan setting, which may be placed on the floor of the glovebox so that it is not blowing on or near the preform and up. The glovebox atmosphere may reach a steady state, at 3150. During this time, pressure and moisture content in the glovebox will rise and may be monitored closely, relieving pressure when applicable. The glovebox may remain like this until the moisture level is less than 1 PPM water.

The heat gun may start a distance away from the preform traversing back and forth at approximately 1 inch (25 mm), plus or minus half an inch for approximately 2 minutes, plus or minus a minute, at step 3160, wherein a non-limiting example of distance may be approximately 8 inches, plus or minus two inches. The heat gun may move closer, at step 3170, such as but not limited to approximately one inch, to the preform repeating the above process until a given distance away, such as, but not limited to approximately three inches (76 mm), plus or minus one inch, from the preform is achieved. The preform is removed from the holder assembly, at step 3180.

Figure 32:
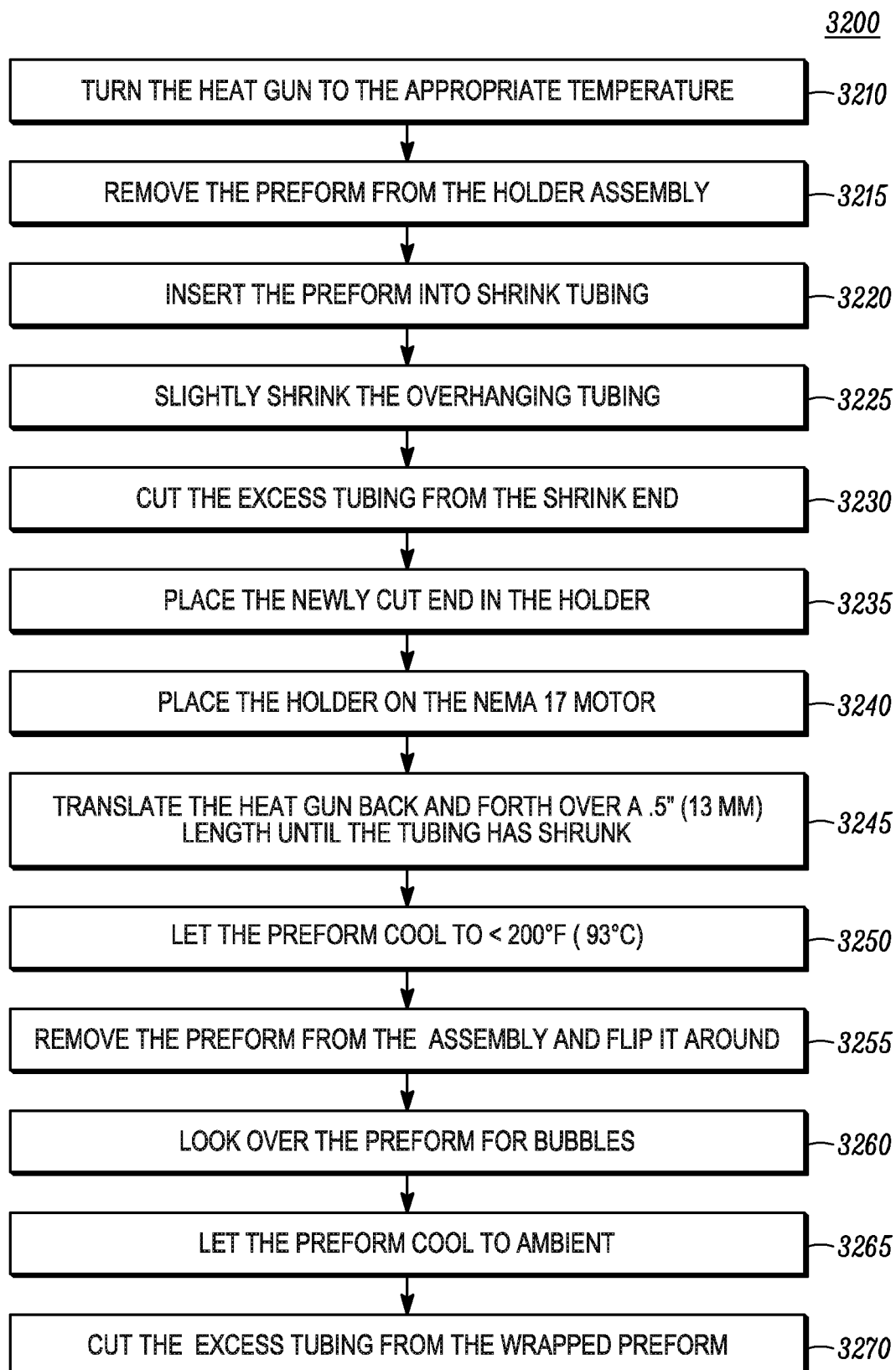
FIG. 32 illustrates exemplary method steps for wrapping a preform in a process for pre-coating a preform.

Referring now to FIG. 32 exemplary method steps for wrapping a preform in a process for pre-coating a preform are illustrated. During this process, 3200, the PPM of water moisture level inside the glove box may be between approximately 0-1.5 PPM, plus or minus 0.25 PPM. If it raises above this level, the process may be shut down until it falls below 1 PPM before restarting. The heat gun may reach the appropriate temperature, at step 3210, keeping the fan speed at the lowest setting. A Type K thermocouple or equivalent may be used to test the temperature of the heat gun approximately 2.5 inches (63 mm), plus or minus 0.5 inches, from the nozzle. Verify it is within ±10° of the desired temperature. If the temperature is not within the appropriate range adjust the heat gun's temperature accordingly until the proper temperature is achieved.

The preform may be removed from the holder assembly, at step 3215. The preform may be inserted into a piece of shrink tubing ~1.5" (38 mm) longer than the preform, at step 3220, so there is an equal amount of tubing on either end. The wrapped preform assembly may be held approximately 3 inches (76 mm), plus or minus one inch, above the heat gun, wherein the overhanging tubing may slightly shrink, at step 3225. The excess tubing may be removed from the shrunk end, at step 3230. The newly cut end may be placed in the holder, at step 3235, and the holder may be placed on the motor, at step 3240.

Figure 34:
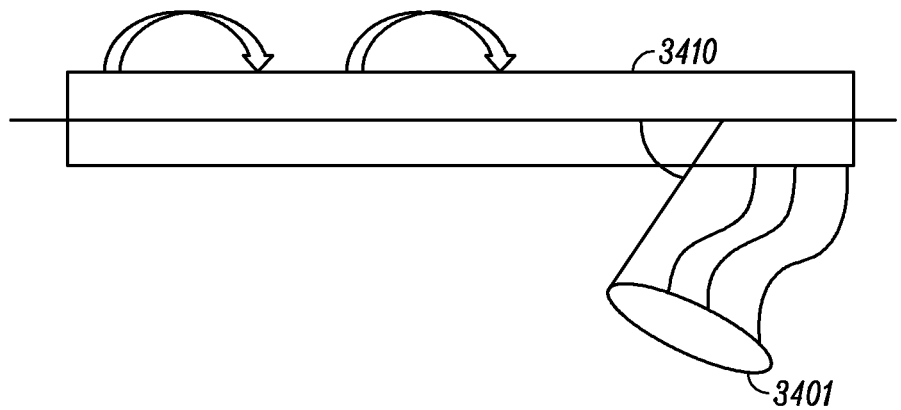
FIG. 34 illustrates an exemplary heat gun application in a process for pre-coating a preform.

The heat gun may be aimed at the free end of the wrapped preform at a 45°-60° angle from the rotational axis (see FIG. 34). The heat gun may be moved back and forth over a 0.5" (13 mm) length until the tubing has shrunk which for PTFE tubing will turn clear then shrink, at step 3245.

The preform may cool, at step 3250, to less than approximately 200° F. (93° C.), plus or minus ten degrees and then may be removed from the assembly and flipped around, at step 3255, where the other side may be shrink-wrapped. The preform may be examined for bubbles, at step 3260, if any appear hold the heat gun over that area moving back and forth as before. Once completed, the preform may be cooled to ambient, at step 3265, and the excess tubing may be cut from the wrapped preform, at step 3270.

Figure 33:
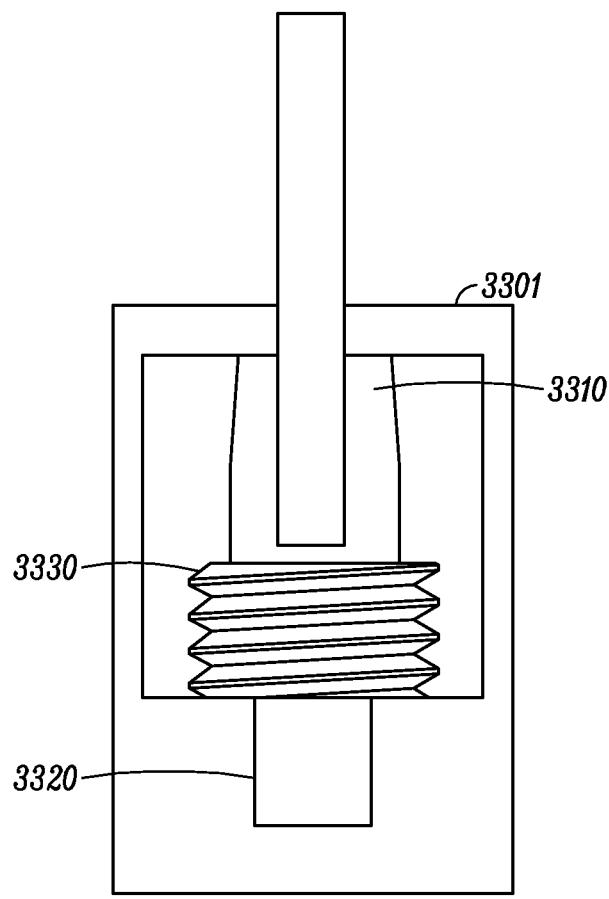
FIG. 33 illustrates an exemplary preform holder for utilization in a process for pre-coating a preform.

Referring now to FIG. 33, an exemplary preform holder for utilization in a process for pre-coating a preform is illustrated. A preform material extends from the preform holder 3301. A clamp 3310 is provided to hold the preform material. Also shown is a guide rod 3320 and engagement threads 3330 which are used to secure the clamp 3310.

Referring now to FIG. 34, an exemplary heat gun application in a process for pre-coating a preform heat gun is illustrated. As shown a heat gun 3401, is applying heat to a preform, a preform material, or a material rod. A coating 3410 is shown as being around the preform material.

Figure 35:
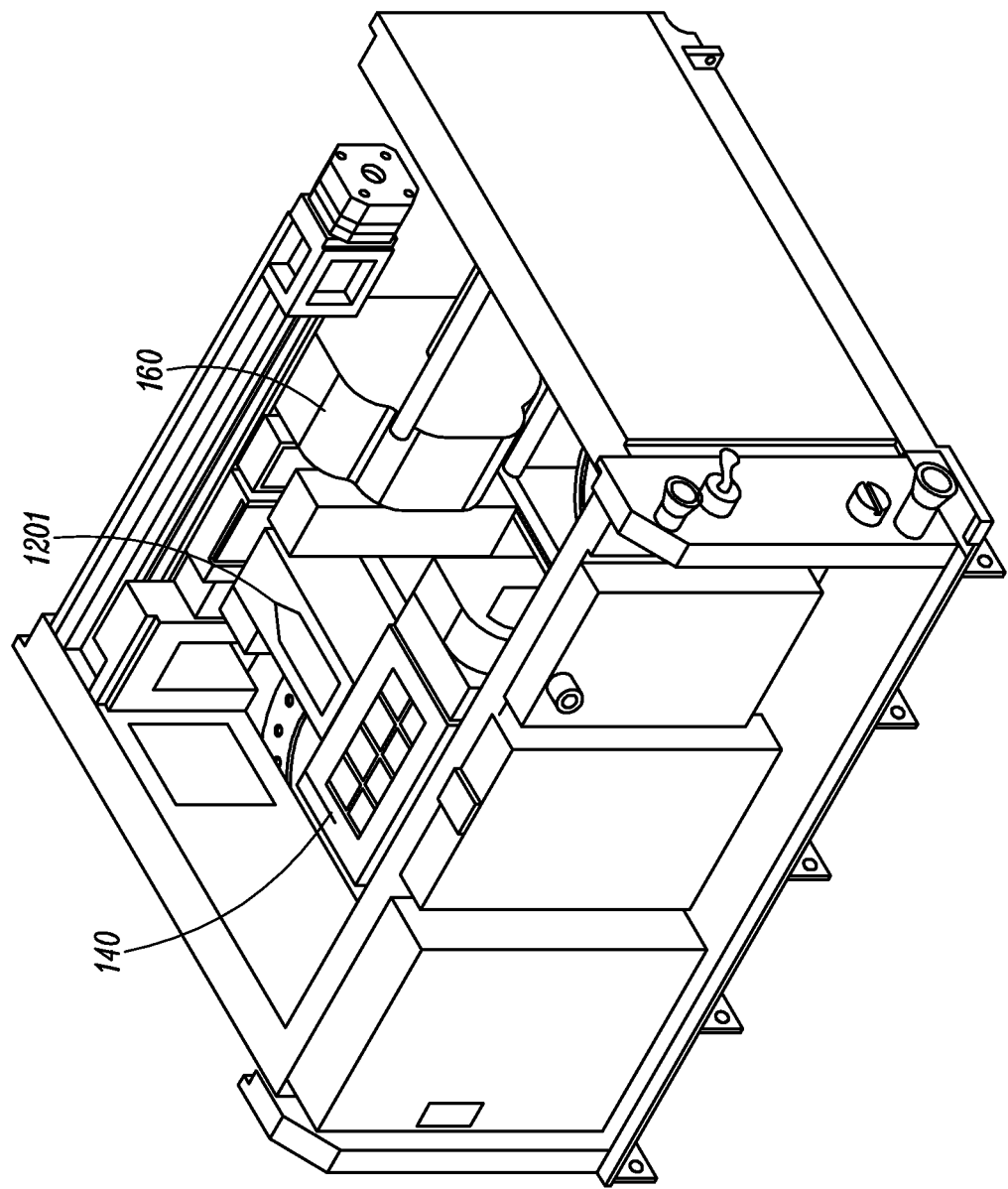
FIG. 35 illustrates an exemplary avionics bay with electronics boards of a system for manufacturing optical fiber.

Referring now to FIG. 35, an exemplary avionics bay with electronics boards of a system for manufacturing optical fiber is illustrated.

Figure 36:
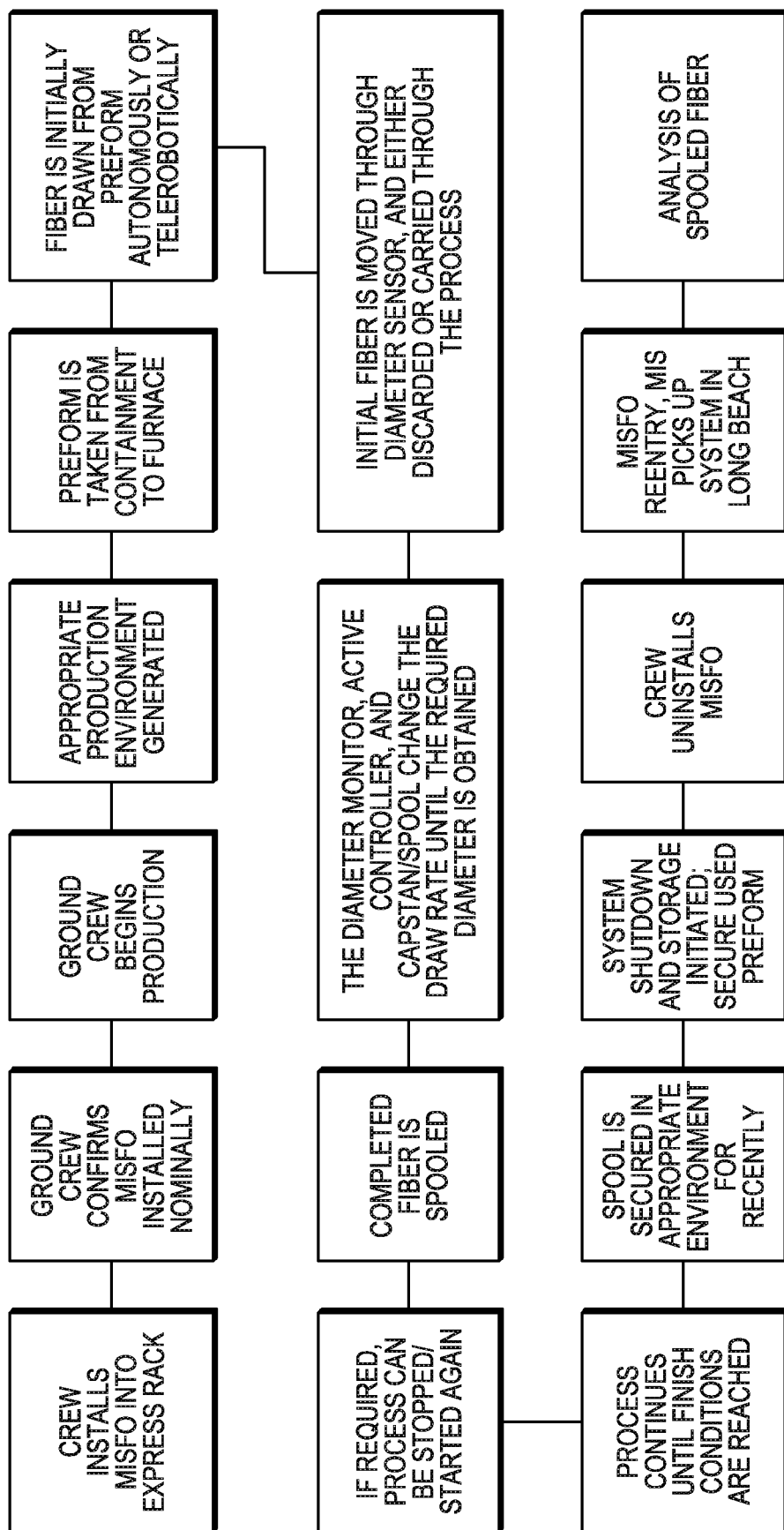
FIG. 36 illustrates exemplary method steps for data flow in a system for manufacturing optical fiber.

Referring now to FIG. 36, exemplary method steps for data flow in a system for manufacturing optical fiber is illustrated. The fiber optic production facility is referred to as "MISFO." In some aspects, a portion of the steps may occur manually prior to launch or may be omitted. Software may perform tasks throughout the process, and installation may occur manually. Collection of the fiber and data after retrieval may occur manually and through use of software.

Figure 37:
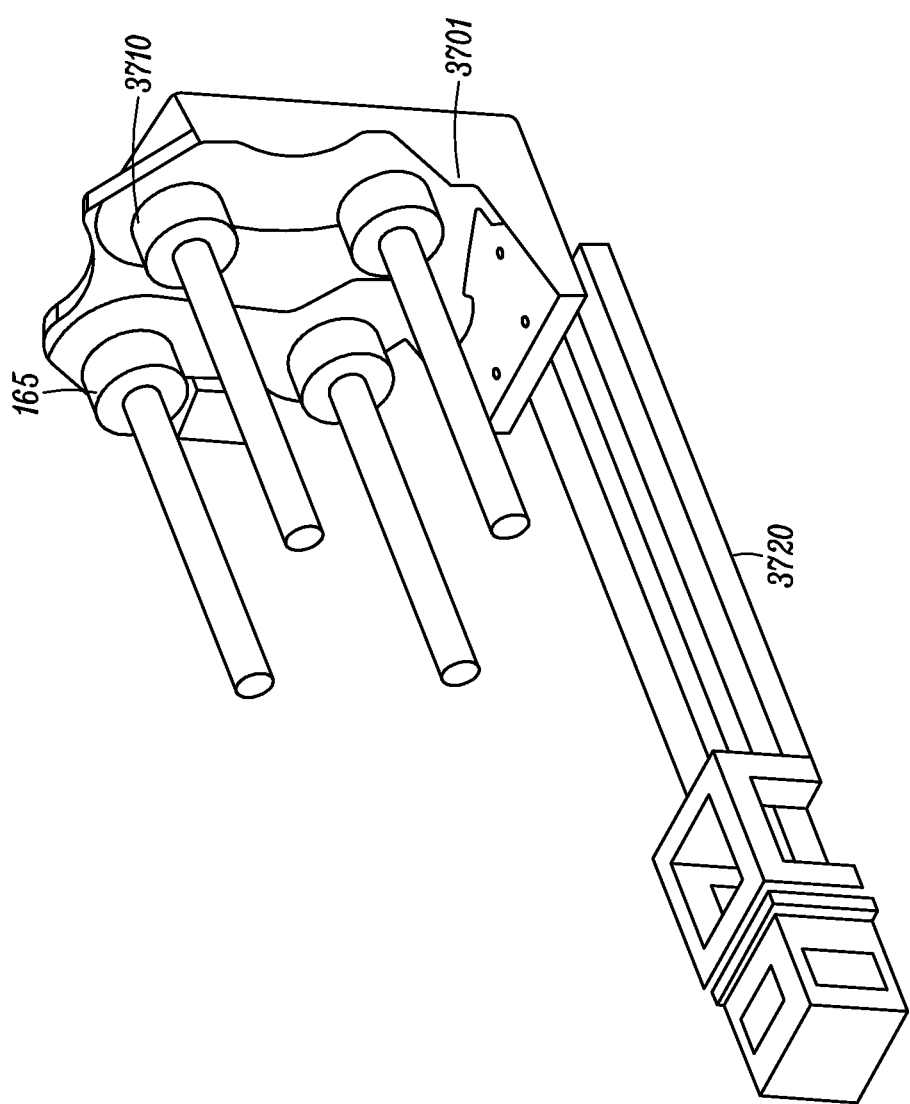
FIG. 37 illustrates an exemplary preform holder for a system for manufacturing optical fiber.

Referring now to FIG. 37, an exemplary preform holder for a system for manufacturing optical fiber is illustrated. The preform holder 165 may include a rotatable revolver piece 3701 with preforms secured using stainless steel clamps 3710. The revolver may be turned using a highly accurate stepper motor, and translated using a linear rail with attached stepper. In some aspects, homing sensors may be used to ensure knowledge of position and autonomous operation.

Once a preform is aligned with the top of the furnace 160, it may be moved through the furnace 160 using the rail 3720. It may be fed at a set rate, feeding new material into the hot spot of the furnace so that new fiber can be pulled.

Thus, it may rotate a solid revolver piece, with preforms secured using stainless steel clamps. The revolver is turned using a highly accurate stepper motor, and translated using a linear rail with attached stepper. Homing sensors may be used to ensure knowledge of position and autonomous operation. Once a preform is aligned with the top of the furnace, it is moved through the furnace using the rail. It is fed at a set rate, feeding new material into the hot spot of the furnace so that new fiber can be pulled.

Figure 38:
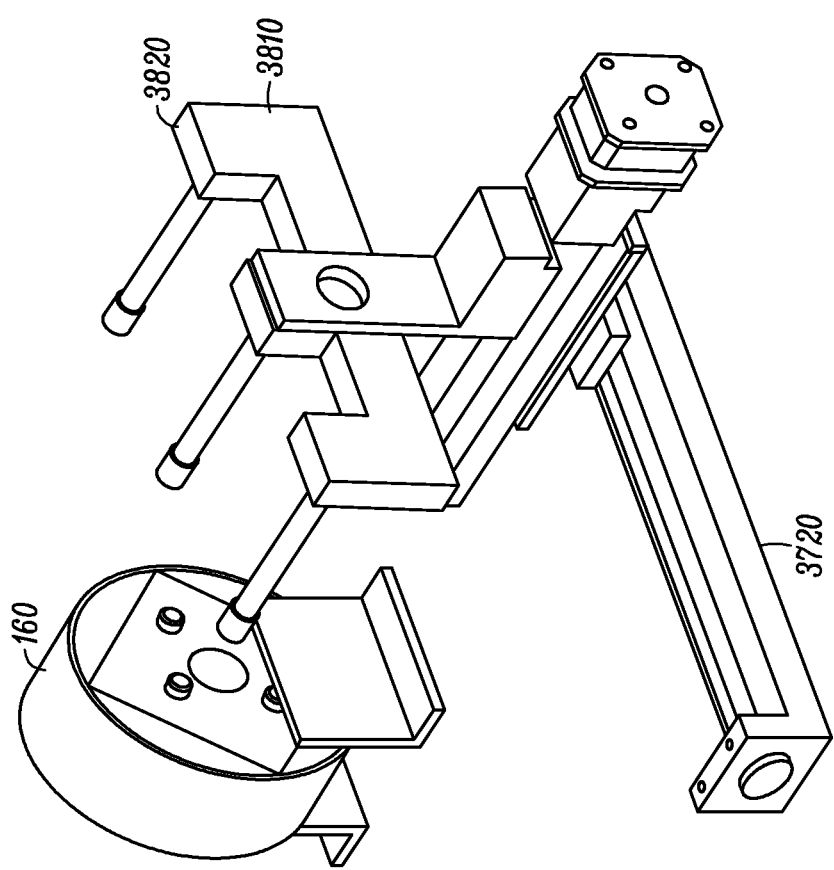
FIG. 38 illustrates an alternate exemplary preform holder for a system for manufacturing optical fiber.

Referring now to FIG. 38, another exemplary preform holder for a system for manufacturing optical fiber is illustrated. In some aspects, the preform may comprise a trident 3810, which may hold multiple cantilevered preforms in a linear stepper on a traversal. The preforms may be gripped in chucks mounted to a backboard 3820. The backboard 3820 may be translated forward to feed the current preform into the furnace 160. Once the preform feed is complete, the residual preform is retracted and the next preform translated into an aligned position with the furnace 160. In another embodiment, the linear stepper is mounted on a traversal. Two actuators may be needed.

Figure 39:
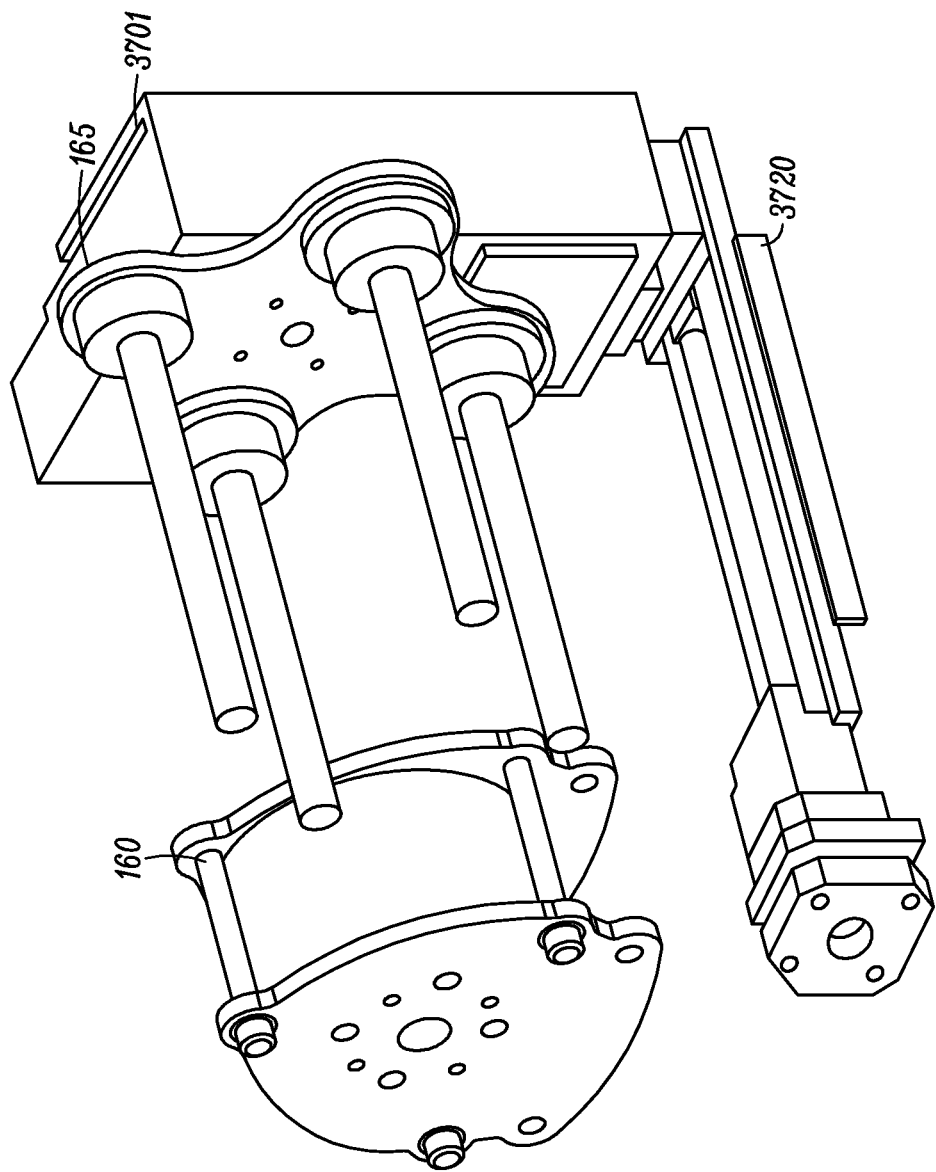
FIG. 39 illustrates an alternate exemplary preform holder for a system for manufacturing optical fiber.

Referring now to FIG. 39, an alternate exemplary preform holder 165 for a system for manufacturing optical fiber is illustrated, wherein the preform holder comprises a solid-state revolver 3701. With a linear rail and a rotary actuator 3720, the preform holder 165 may support multiple preforms. Similarly to the trident example, the preform holder is not deformed or changed, but remains "solid-state." Here, instead of a trident design, the preforms may be mounted to a revolver. The system may translate forward to feed a preform into the furnace. Once the preform feed is completed the residual is retracted, and a new preform moved into place by revolving the entire backboard.

Figure 40:
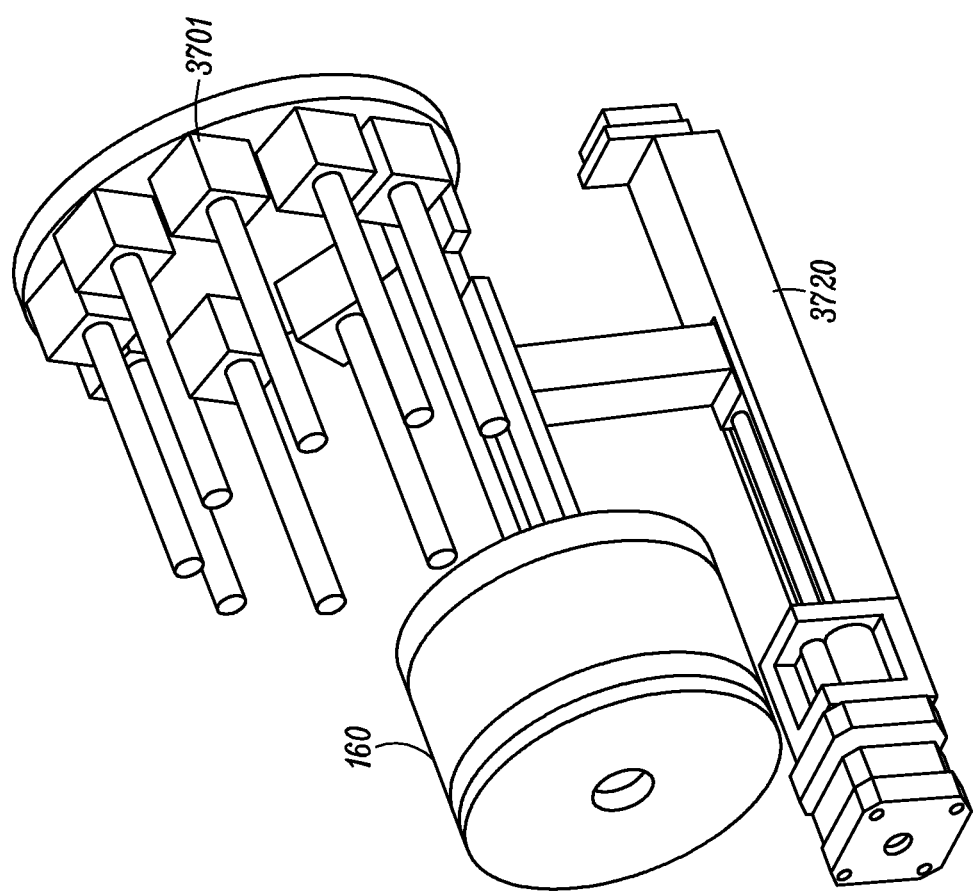
FIG. 40 illustrates an alternate exemplary preform holder for a system for manufacturing optical fiber.

Referring now to FIG. 40, another embodiment of a preform holder for a system for manufacturing optical fiber is illustrated. Using a guide rail 3720 to the furnace 160, a linear actuator, a rotary actuator, and a 'screw or bolt' actuator, may increase the amount of preforms used. Here, the preforms may be mounted to a revolver which can rotate. However, the preforms may be removed from their mounts, and translated separately using the linear axis. This may free up space on the revolver 3701 for increasing the number of preforms.

Figure 41:
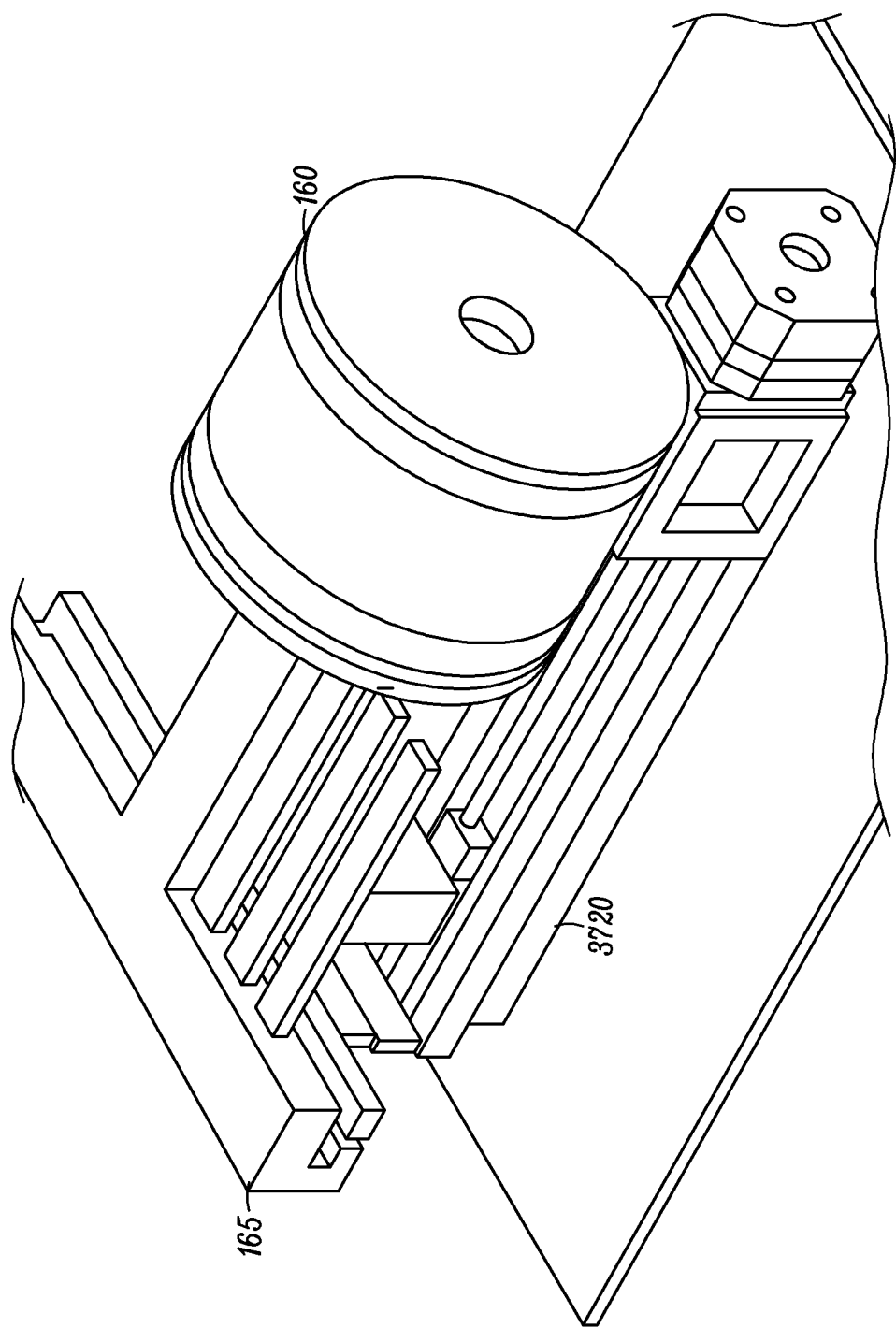
FIG. 41 illustrates an alternate exemplary preform holder for a system for manufacturing optical fiber.

Referring now to FIG. 41, another embodiment of a preform holder for a system for manufacturing optical fiber is illustrated. Using a guide rail 3720 to the furnace 160, 2 linear actuators, and a 'screw or bolt' actuator may increase the amount of preforms used. Similar to the revolver embodiments, except instead of a revolver driven by stepper and the preforms being removed from the revolver with a translation device, the preforms are fed in using a 'clip'-like system, where preforms are stored on a rail, and then translated using a linear actuator or spring into a feed position. Once they are in this position, the preforms can be moved into the furnace using a linear axis. This concept allows for the most efficient preform packing, but is complex.

The preform containment and feed system may be provided with different concepts for holding multiple preforms. One may use a solid-state revolver to hold the preforms in a circular configuration, while others may utilize different magazine designs that use springs or motors to move preforms into position.

In one embodiment, the preforms is mounted on two linear rails in a trident position. The preforms are gripped in chucks mounted to a backboard. The backboard is translated forward to feed the current preform into the furnace. Once the preform feed is complete, the residual preform is retracted and the next preform translated into an aligned position with the furnace.

Similar to the trident example, in that the preform holder is not deformed or changed, but remains 'solid-state', instead of a trident design, the preform may be mounted to a revolver. The system can translate forward to feed a preform into the furnace. Once the preform feed is completed the residual is retracted, and a new preform moved into place by revolving the entire backboard. This is both less complex than the next two methods listed and space saving over the trident example.

In another embodiment, the preforms are mounted to a revolver 3701 which can rotate. However, the preforms can be removed from their mounts, and translated separately using the linear axis. This is similar to a bullet being fed to a chamber from a revolving magazine. This frees up space on the revolver for increasing the number of preforms.

Similar to the embodiment immediately above, instead of a revolver driven by stepper and the preforms being removed from the revolver with a translation device, the preforms are fed in using a 'clip' like system, where preforms are stored on a rail, and then translated using a linear actuator or spring into a feed position. Once they are in this position, that can be moved into the furnace using a linear axis. This concept allows for the most efficient preform packing, but is complex.

In the creation of an autonomous fiber pulling device the ability to redirect delicate fibers is critical. When the assembly needs to shrink due to limited area for a system, the pulley wheel takes up considerable volume. To save volume several small pulleys can be arranged so that their surfaces are tangent to the surface of the larger pulley. The fiber can then take the direction change resting on several pulleys that take up considerably less volume than the equivalent single large pully. Surrounding the pulleys is a guide path that allows an endoscope like mechanism to be pushed through the pulley assembly and then retracted with a fiber attached so that the fiber only contacts the metal bearings and no other surface.

Figure 42A:
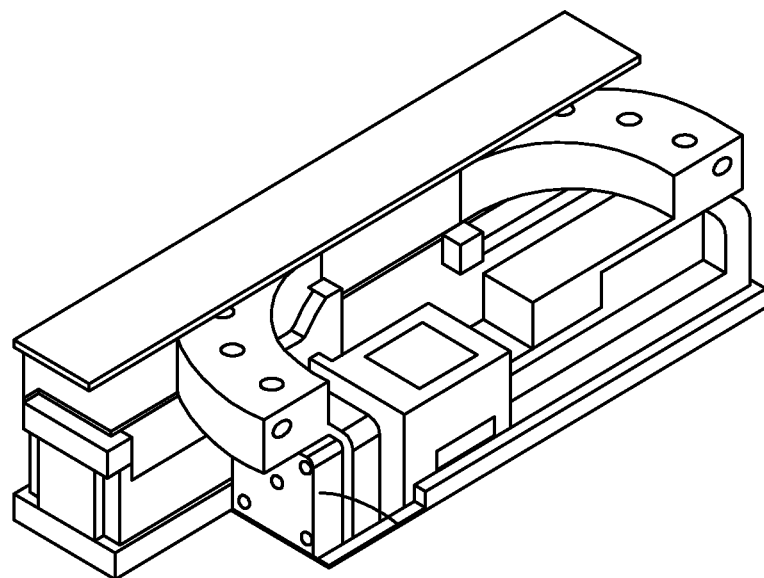
FIGS. 42A-42C illustrate an exemplary redirection assembly design for a system for manufacturing optical fiber.
Figure 42B:
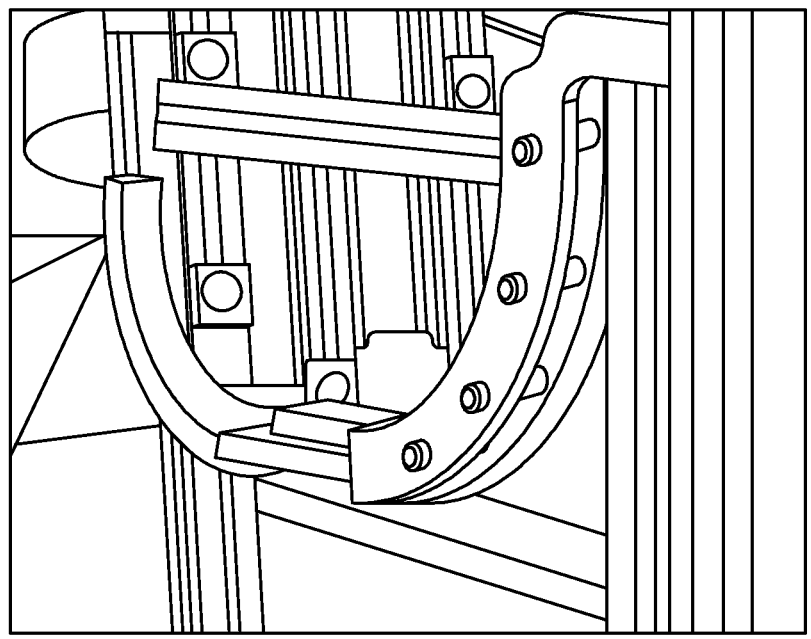
Figure 42C:
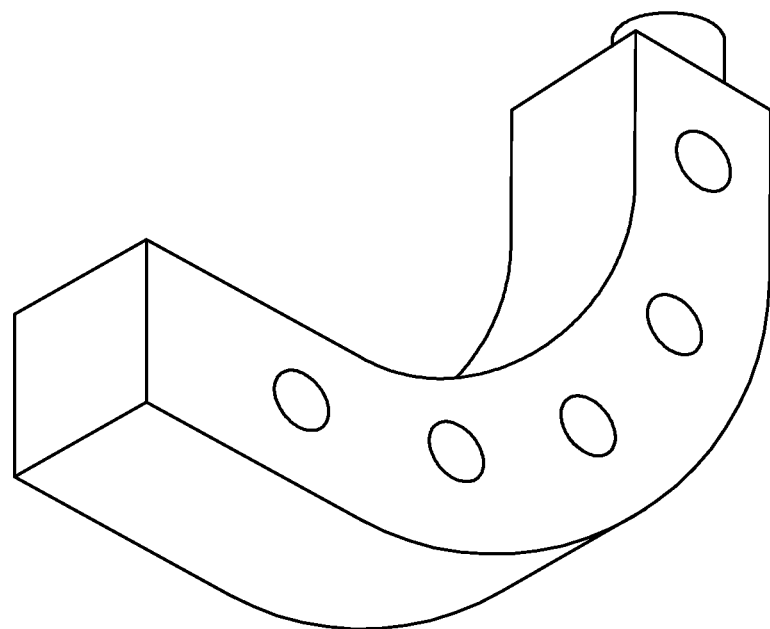

Referring now to FIGS. 42A-42C, an exemplary redirection assembly design for a system for manufacturing optical fiber is illustrated. It is arranged onto rails, enabling them to be moved, both to change the fiber feed path onto the spool, and to enable it to be moved into position once the start/stop process is initiated.

In the creation of an autonomous fiber pulling device, redirection of delicate fibers is essential. Surrounding the pulleys is a guide path that allows an endoscope-like mechanism to be pushed through the pulley assembly and then retracted with a fiber attached so that the fiber only contacts the metal bearings and no other surface.

Referring now to FIG. 42B, an exemplary cutaway displaying the interior of the fiber redirection assembly is shown. Metal bearings may be used to redirect the fiber without the need for a large wheel or pulley.

Referring now to FIG. 42C, an exemplary portion of the fiber redirection system is shown. Note that all edges can be rounded and funnels added to insure the fiber is center.

Figure 43:
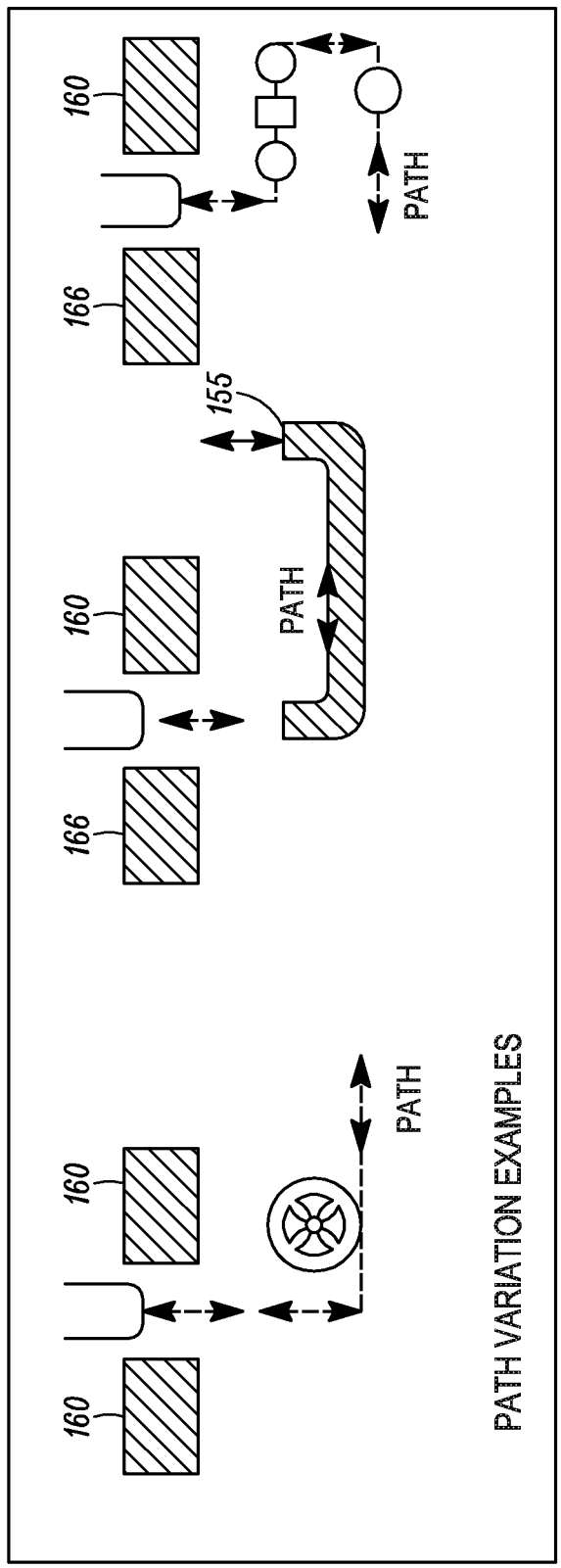
FIG. 43 illustrates exemplary path variations within a system for manufacturing optical fiber.

Referring now to FIG. 43, exemplary path variations within a system for manufacturing optical fiber are illustrated. In some aspects, these may be lined up at slight angles, so that the fiber path could be increased to larger and larger lengths if required. This distance allows the fiber time to cool, and allows the spool to mount in different configurations. The left shows using a wheel, the center using a fiber redirection assembly, and the right showing the ability to customize the path as needed using either method. Note that many of these can be lined up at slight angles, so that the fiber path could be increased to larger and larger lengths if required. The allows the fiber time to cool, or allows the spool to mounted in different configurations, as shown below.

Figure 44:
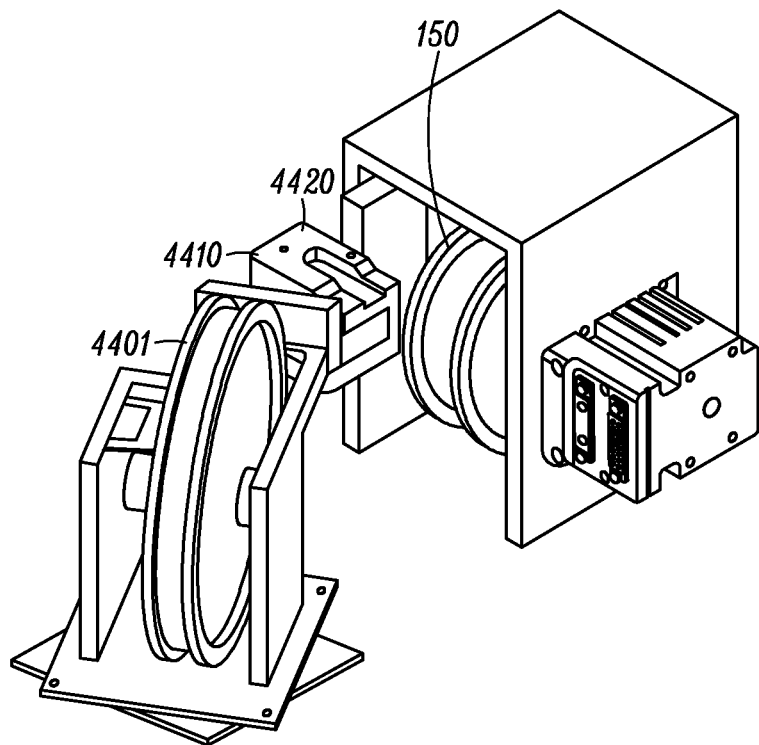
FIG. 44 illustrates exemplary assembled spools for a system for manufacturing optical fiber.

Referring now to FIG. 44, an exemplary spooling assembly for a system for manufacturing optical fiber is illustrated. A large spool 4401 responsible for housing as well as opening and closing the endoscopic forceps 4410 is shown on the far left. A stepper motor may be used to push the endoscope through the system. An attached optical sensor 4420 may be used to ensure the endoscope remains in the correct positions. The spool 150 incorporates a gearbox and DC motor, which drives the spool to the correct RPM based on input from the micrometer.

In some embodiments, a DC motor may be used to control the revolutions per minute ("RPM") of the spool, while the fiber is fed from the furnace (not shown) through the two fiber redirection assemblies to spool. The fiber redirector closest to the spool may be translated on a linear axis, allowing the fiber to be translated on the spool. This enables the fiber to be laid down onto the spool properly, giving efficient and safe packing of the material.

Figure 45A:
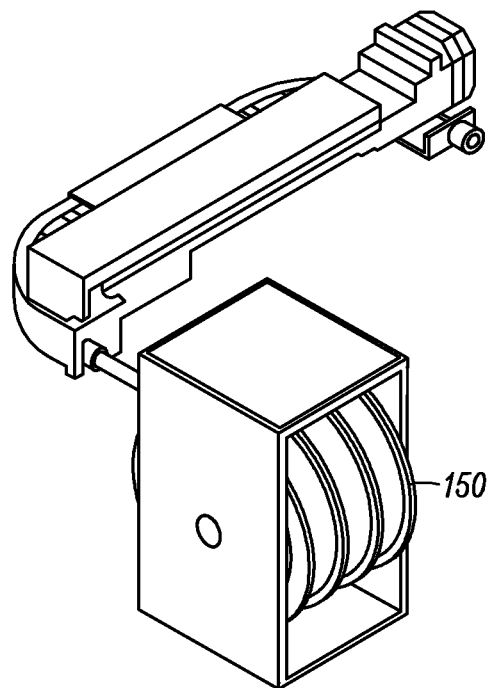
FIGS. 45A-45B illustrate an exemplary spooling assembly with redirection assembly for a system for manufacturing optical fiber.
Figure 45B:
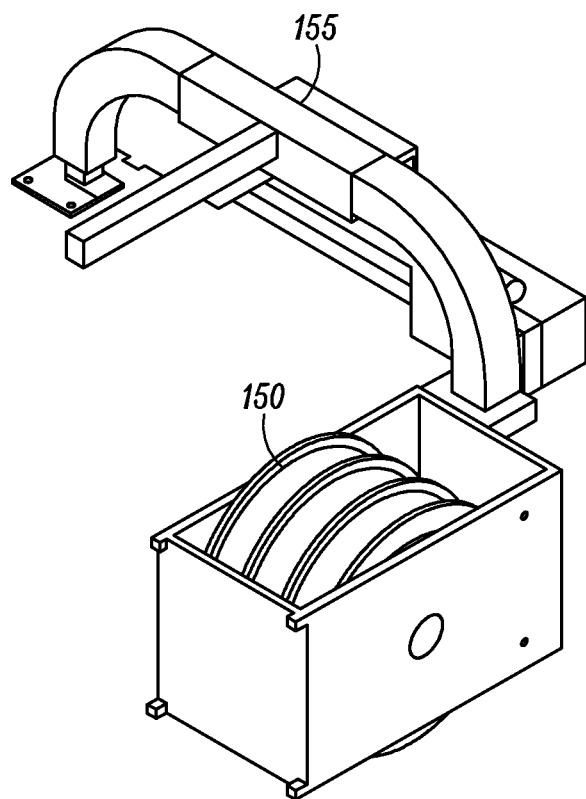

Referring now to FIGS. 45A-45B, an exemplary spooling assembly with redirection assembly for a system for manufacturing optical fiber is illustrated.

Referring now to FIG. 45A, an exemplary view of the spooling assembly from the top is shown. The linear axis (the black piece) is mounted to the top of the box. It allows the left fiber redirection assembly to move, which can move the fiber to different places on the spool (shown in green). It allows the left fiber redirection assembly to move, which can move the fiber to difference places on the spool.

Referring now to FIG. 45B, an exemplary view of the assembly from the bottom is shown. The fiber redirection assemblies are shown in red, the spool is shown in green. The spool is driven by a DC motor, the fiber can be attached to the spool by using an endoscope like device, shown later. A linear axis may be mounted to a top of the box.

An embodiment uses a DC motor to control the RPM of the spool (shown as green in the picture), while the fiber is fed from the furnace (not shown) through the two fiber redirection assemblies to spool. The fiber redirector closest to the spool is translated on a linear axis, allowing the fiber to be translated on the spool. This enables the fiber to be laid down onto the spool properly, giving efficient and safe packing of the material.

Figure 46A:
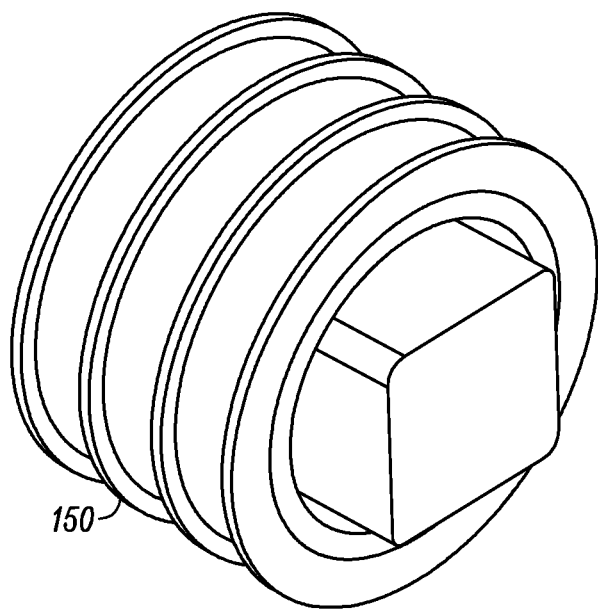
FIGS. 46A-46B illustrate an embodiment of assembled spools for a system for manufacturing optical fiber.
Figure 46B:
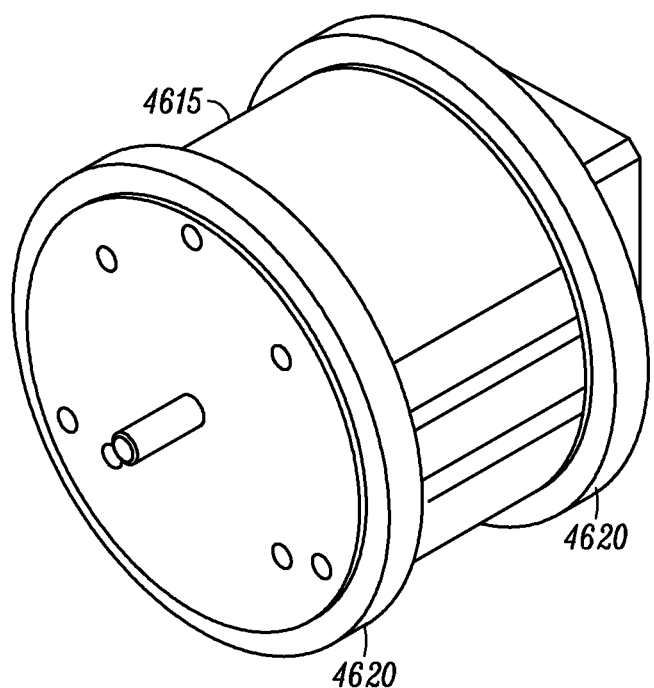

Referring now to FIGS. 46A-46B, exemplary assembled spools for a system for manufacturing optical fiber are illustrated.

Referring now to FIG. 46A, an exemplary assembled spool without backplate is shown. Note the green is the surface that holds the generated ZBLAN fiber, while the black box is the DC motor and gearbox.

Referring now to FIG. 46B, an exemplary spool interior is shown. In some embodiments, there may be a motors housing 4615 and two bearings 4620.

Figure 47:
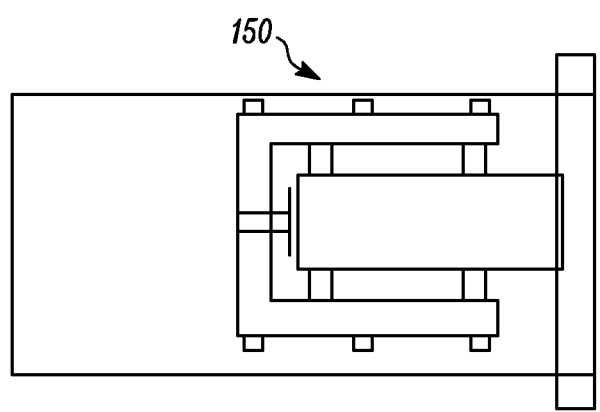
FIG. 47 illustrates a cross sectional view of an exemplary spool for a system for manufacturing optical fiber.

Referring now to FIG. 47, a cross sectional view of an exemplary spool for a system for manufacturing optical fiber is illustrated. When directly driven, the capstan and motor may be concentric with a plate on one end of the capstan extending to the center where it is connected to the motor. The motor may be held fixed with structures extending out the other side of the capstan opposite of the drive shaft. The side to side actuation is performed by linear actuators and rails mounted around the capstan and the slides are connected to the motor structure. This spool may be driven by a DC motor. If the motor requires a gearbox, that can also be placed into the interior of the spool.

Figure 48A:
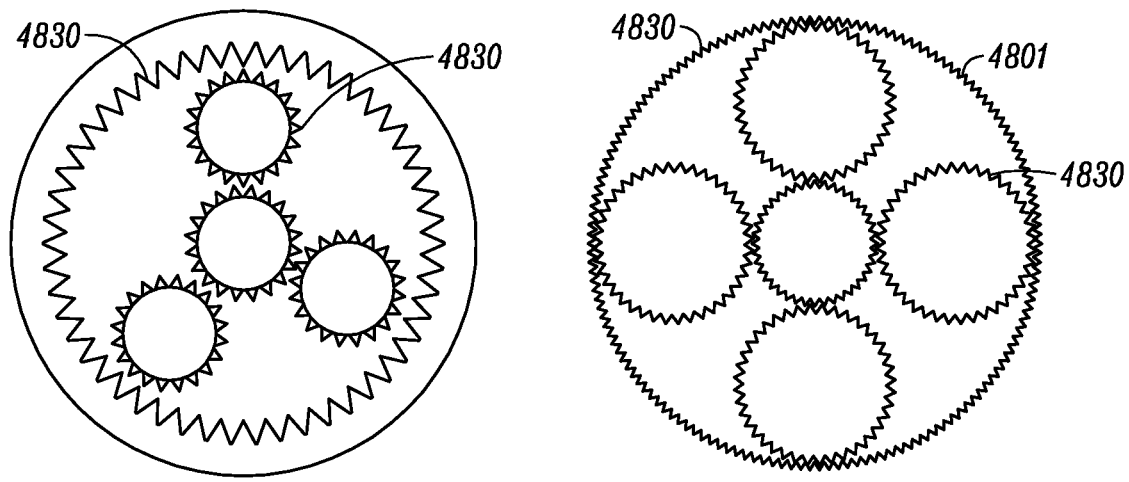
FIGS. 48A-48C illustrate exemplary capstans with various gear designs for a system for manufacturing optical fiber.
Figure 48B:
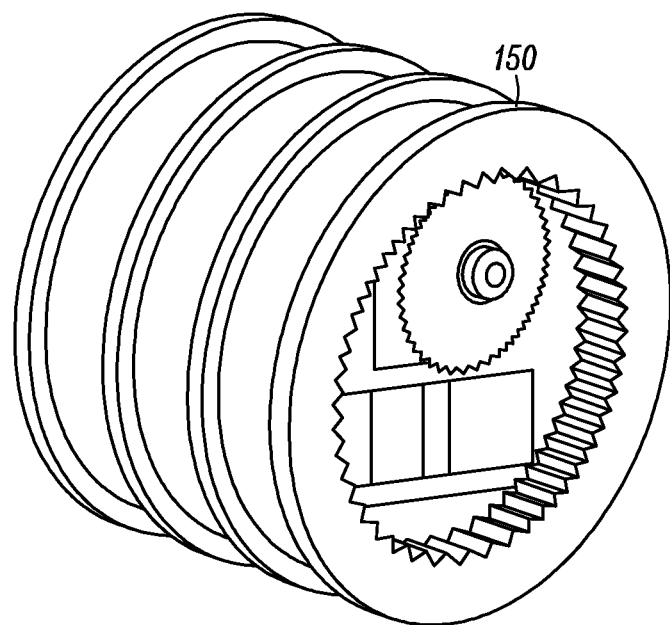
Figure 48C:
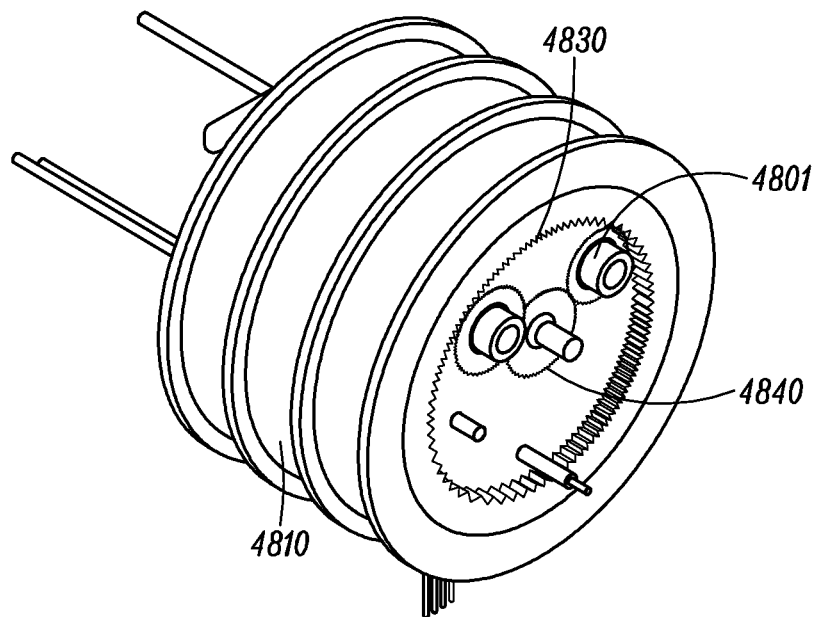
Figure 49A:
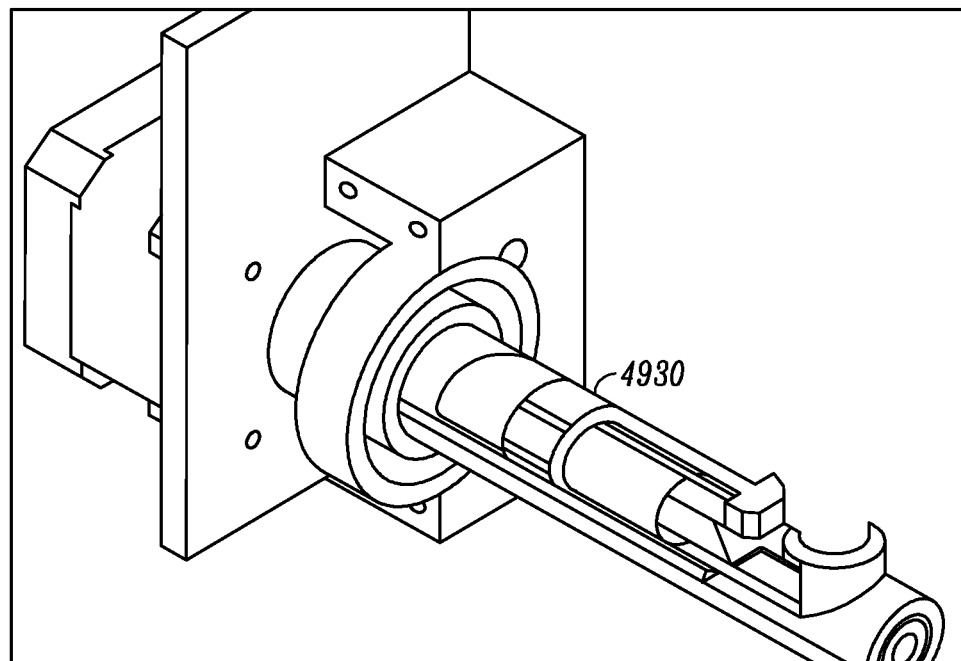
FIGS. 49A-49D illustrate an exemplary grabbing mechanism for a system for manufacturing optical fiber.
Figure 49B:
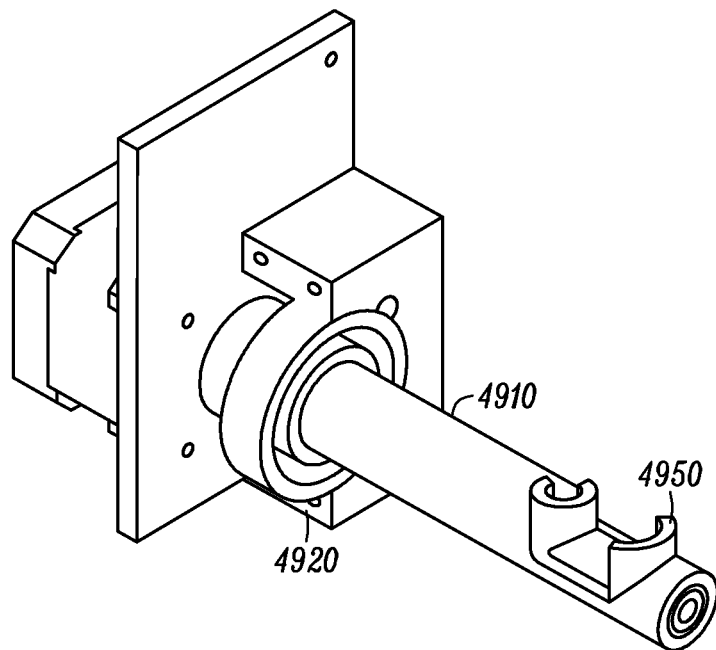
Figure 49C:
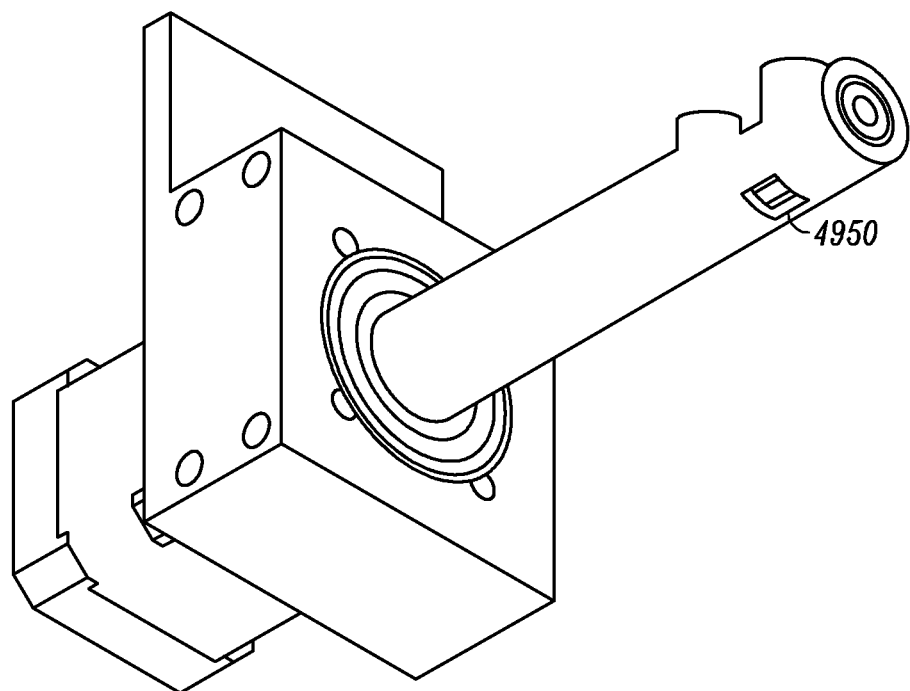
Figure 49D:
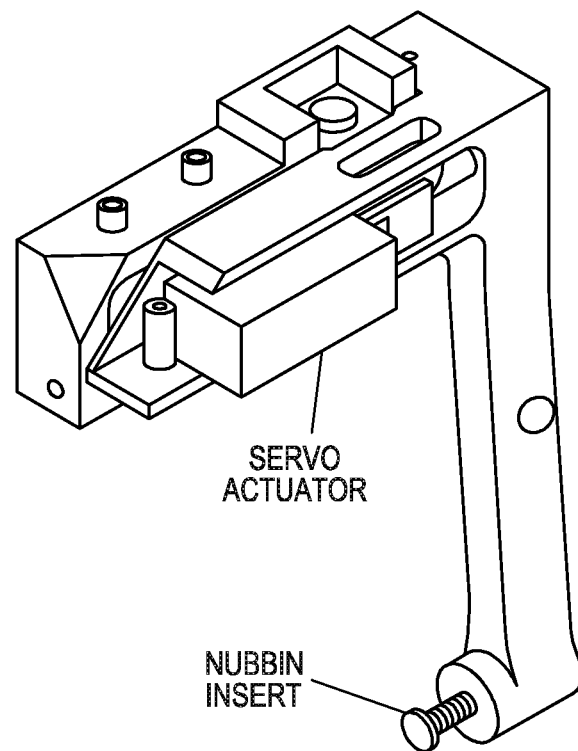

Referring now to FIGS. 48A-48C, exemplary capstans with various gear designs for a system for manufacturing optical fiber is illustrated. In some embodiments, the gear design may comprise an asymmetric planetary gear. The gear driven design 4801 allows for compaction of the actuation components and linear rail inside the capstan instead of outside it. This can help reduce the size considerably. The capstan 4810 is driven by a planetary style gear system. This leaves room free between the gears that allow linear rails to feed through. The planetary gear can either be symmetric with the motor centered on the axis or Asymmetric with the motor not centered on the capstan. Either works but when integrating the actuator motor into the same space the Asymmetric can allow for more internal room for a given capstan diameter.

The tractor, spooling, and capstan system can be provided in a plurality of embodiments. Different stepper motors and DC motors may be used to apply tension onto the preform material. Once combined with heat, this tension on the preform draws it into a fiber. By changing the speed of the DC motors and accompanying spool, the diameter of the fiber can be changed. A fiber tractor may be used before the spool, in order to pull fiber without spooling it, while a large spool spun by motor can apply the main drawing force. By directly changing the rotation speed of the spool, the fiber diameter can be controlled, while by moving the spool or a turning wheel in front of the spool, the fiber can be layered in a set pattern.

A tension sensor may be integrated into the redirection assembly. This sensor, by measuring tension in the line, can help to ensure that the fiber is being drawn with the correct settings to ensure a stable pull.

Referring now to FIGS. 49A-49D, an exemplary grabbing mechanism for a system for manufacturing optical fiber is illustrated. This mechanism is designed to grab onto both glass preforms and glass fiber. A DC motor fixed into a cylindrical barrel actuates a tab with a lead screw to apply the grasping force. The barrel 4910 may be mounted into a bearing 4920, allowing it to rotate by a fixed secondary motor 4930. Using this rotational degree of freedom, the same grabber 4950 may be used to either grab a preform or a fiber. Further, this rotation allows for the mechanism to guide the fiber around redirection wheels and around other mechanisms.

In an embodiment, the grabber 4950 may comprise a secondary heater, wherein a heated grabber may insert into a heated preform to initiate draw of the fiber. In some embodiments, an electrostatic charge may be induced at the tip of the drawn fiber, and the draw system may comprise electrostatically driven pathway, wherein the fiber may be directed through the system through driving a charge through the pathway.

Figure 50A:
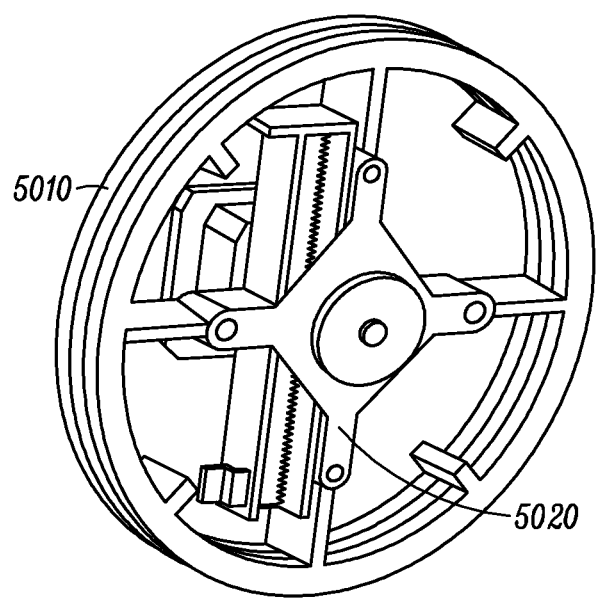
FIGS. 50A-50C illustrate an exemplary forceps control assembly for a system for manufacturing optical fiber.
Figure 50B:
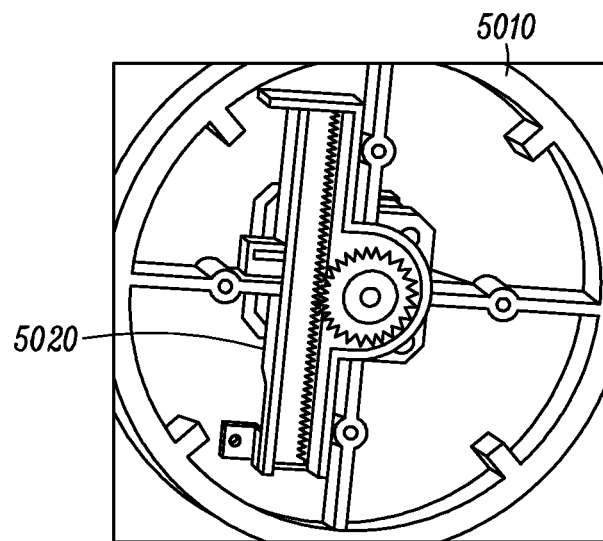
Figure 50C:
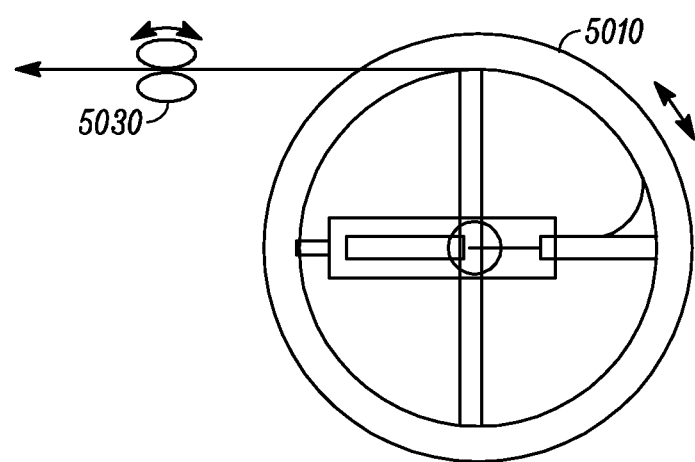

Referring now to FIGS. 50A-50C, an exemplary forceps control assembly for a system for manufacturing optical fiber is illustrated. In an embodiment, a compact assembly may extend and retract an endoscope like device, and mechanically control any mechanism embedded in it. The assembly may provide autonomous control within a compact volume. The forceps/endoscope may be wound around a spool 5010 with the mechanical mechanisms 5020 to control any attachments at the end integrated into the spool. By integrating them into the spool, it reduces a large amount of excess forceps/endoscope that would be wasted as a twisting buffer between the rotating spool and a fixed actuation mechanism. The spool is spring wound to retract the forceps. Before leaving the assembly, the forceps are routed through a motor module that uses a drive wheel/gear and pinch wheel/gear 5030 to drive the forceps/endoscopes forward and backwards. The spring winding of the spool keeps the forceps wrapped neatly around the spool always with one end of the forceps held in position by the motor module.

Figure 51:
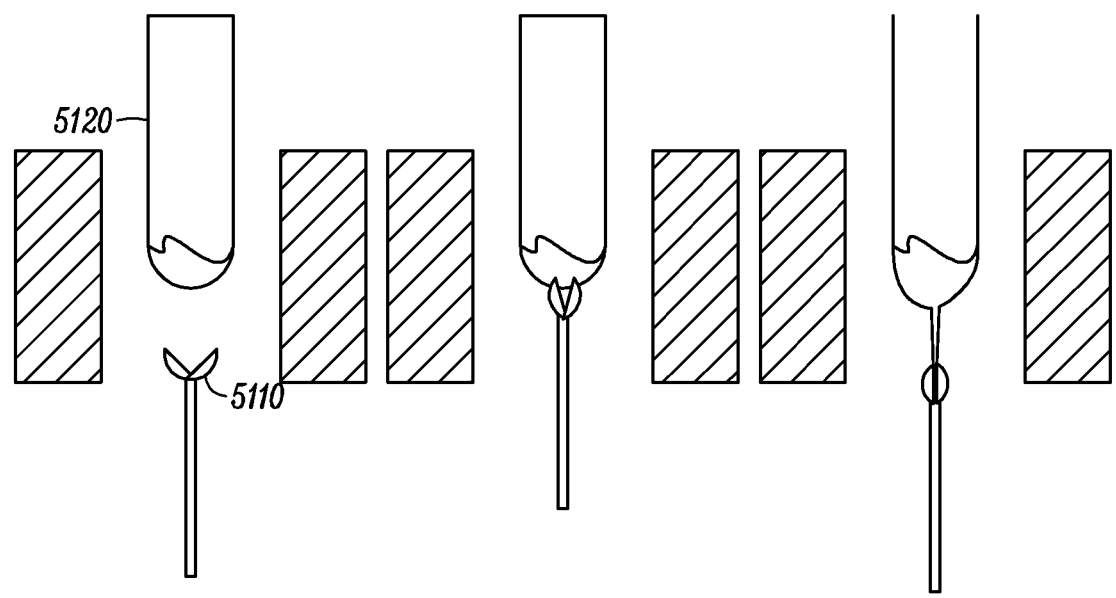
FIG. 51 illustrates exemplary steps for pulling fiber from a preform for a system for manufacturing optical fiber.

Referring now to FIG. 51, exemplary steps for pulling fiber from a preform for a system for manufacturing optical fiber are illustrated. Fiber formation is done using some form of forceps or needle 5110 to grab onto the partially melted preform to then pull the fiber through fiber pulling assembly 5120 (usually includes redirection pulleys and an optical micrometer) where it is attached to a spool that then pulls the remaining majority of fiber. The forceps/needle mechanism 5110 is fed through the fiber spool and remaining components of the assembly until it reaches the preform in the furnace. Once there it attaches to the melting glob, retracts and forms the fiber to be pulled through the assembly and attached to fiber spool.

The current prior art method of fiber drawing involves the use of a person for grabbing the preform drop, cutting and attaching the fiber to a spool. Embodiments disclosed herein are for the automation of that process to a degree that an assembly can be supplied solely with the fiber preforms and output a fully wound spool of fiber without human interaction with the preform or fiber within the assembly. This has uses in the creation of small scale and entirely autonomous manufacturing of fiber. Thus, embodiments may be used to create specialty fibers in the environment of outer space where an autonomous assembly greatly reduces the cost compared to requiring a person to spend only a few seconds beginning and ending a process that can then run autonomously for significant periods of time. Fiber formation may be done using a forceps or needle to grab onto the partially melted preform to then pull the fiber through fiber pulling assembly (usually includes redirection pulleys and an optical micrometer) where it is attached to a spool that then pulls the remaining majority of fiber. The forceps/needle mechanism is fed through the fiber spool and remaining components of the assembly until it reaches the preform in the furnace. Once there it attaches to the melting glob, retracts and forms the fiber to be pulled through the assembly and attached to fiber spool.

Figure 52:
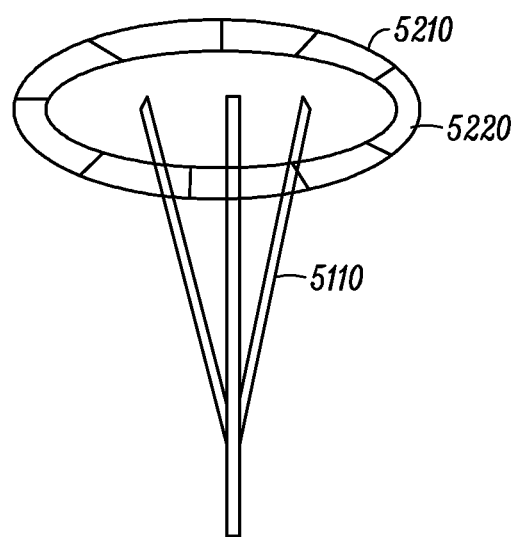
FIG. 52 illustrates an exemplary alignment mechanism for pulling fiber from a preform for a system for manufacturing optical fiber.

Referring now to FIG. 52, an exemplary alignment mechanism for pulling fiber from a preform for a system for manufacturing optical fiber is illustrated. When using forceps for gripping objects, floating in air alignment is quite important, especially when done robotically. This is a simple ring 5210 constructed of electromagnets and an optically based means of determining the position of the forceps 5110. The magnets 5220 are energized specifically to draw the forceps 5110 to specific positions which would align the forceps to whatever target desired without requiring a tight guide tube in that specific area. A similar ring 5210 can also be constructed that uses either electrostatic forces or small puffs of air to create the same outcome.

The prior art procedure for pulling fiber from preforms is to begin heating the preform in the middle so that the weight of the preform causes it to neck in the molten portion. The necking leaves a still solid portion of preform that is then pulled from the rest and a fiber forms between them. The drop is then cut from the fiber and that fiber is then pulled. This method is reliant on the force of gravity and would not work in a microgravity environment.

As disclosed herein as shown a method provides for melting a very tip of the preform to create a semi molten globule. The method further provides for either grabbing by forceps or stabbing with a needle the tip of the preform. The method further comprising pulling a fiber from the glob with the at least one of forceps and needle. The first fiber pulled can then be used to pull the rest of the preform into fiber. This method not only produces less waste but can be utilized in both a gravitational and non-gravitational environment, which is important for manufacturing in space.

Figure 53:
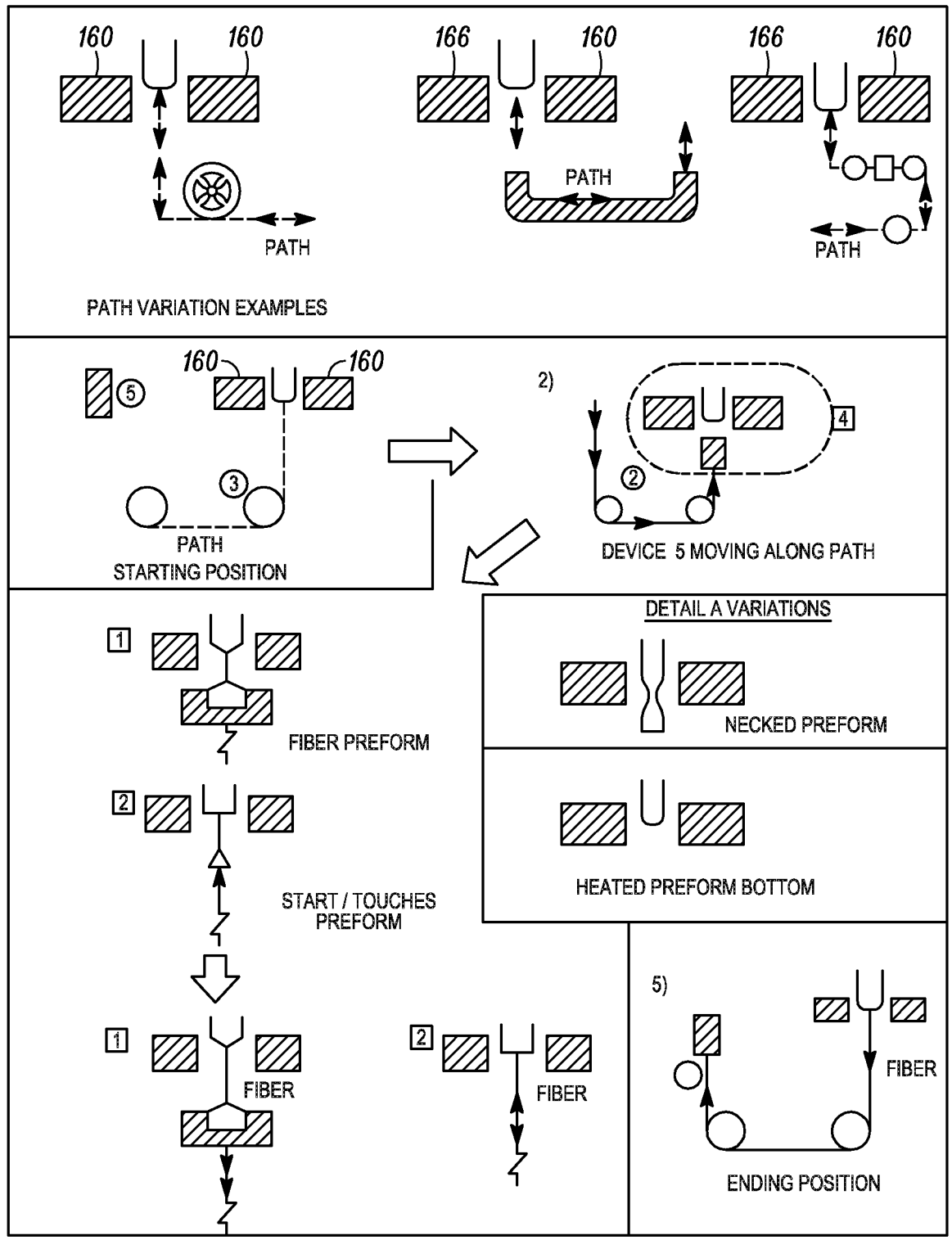
FIG. 53 is an embodiment of an integrated motor and capstan assembly for fiber spooling for a system for manufacturing optical fiber.

Referring now to FIG. 53, an exemplary compact integrated motor and capstan assembly for fiber spooling for a system for manufacturing optical fiber is illustrated. The purpose of this design is to reduce the amount of unused space when driving a capstan for spooling fiber. This is of specific concern when volume is at a premium such as pulling fiber optics in space. The following are variants of the same idea for integrating a motor within the empty space of a capstan and allowing the capstan assembly to actuate side to side. The capstan is essentially a hollow pipe with lips on the outside and large thin form bearings on the inside to spin freely around a motor and other objects placed inside.

As shown in FIG. 53, various variations of a device that is passed through various path intended for the pulling of fiber. This path includes the preform passing through the furnace 160. This device has a head comprising of a gripper or a spear or an interface that allows it to attach itself to either the fiber or the base material from which the fiber is formed. Once the device has attached itself it can then transition the fiber or material through the original path for the purpose of spooling or transitioning it to another stage of manufacture. The path may include passing by a pully and/or through a guide. As further shown, there may be a starting position and an eventual ending position.

Figure 54:
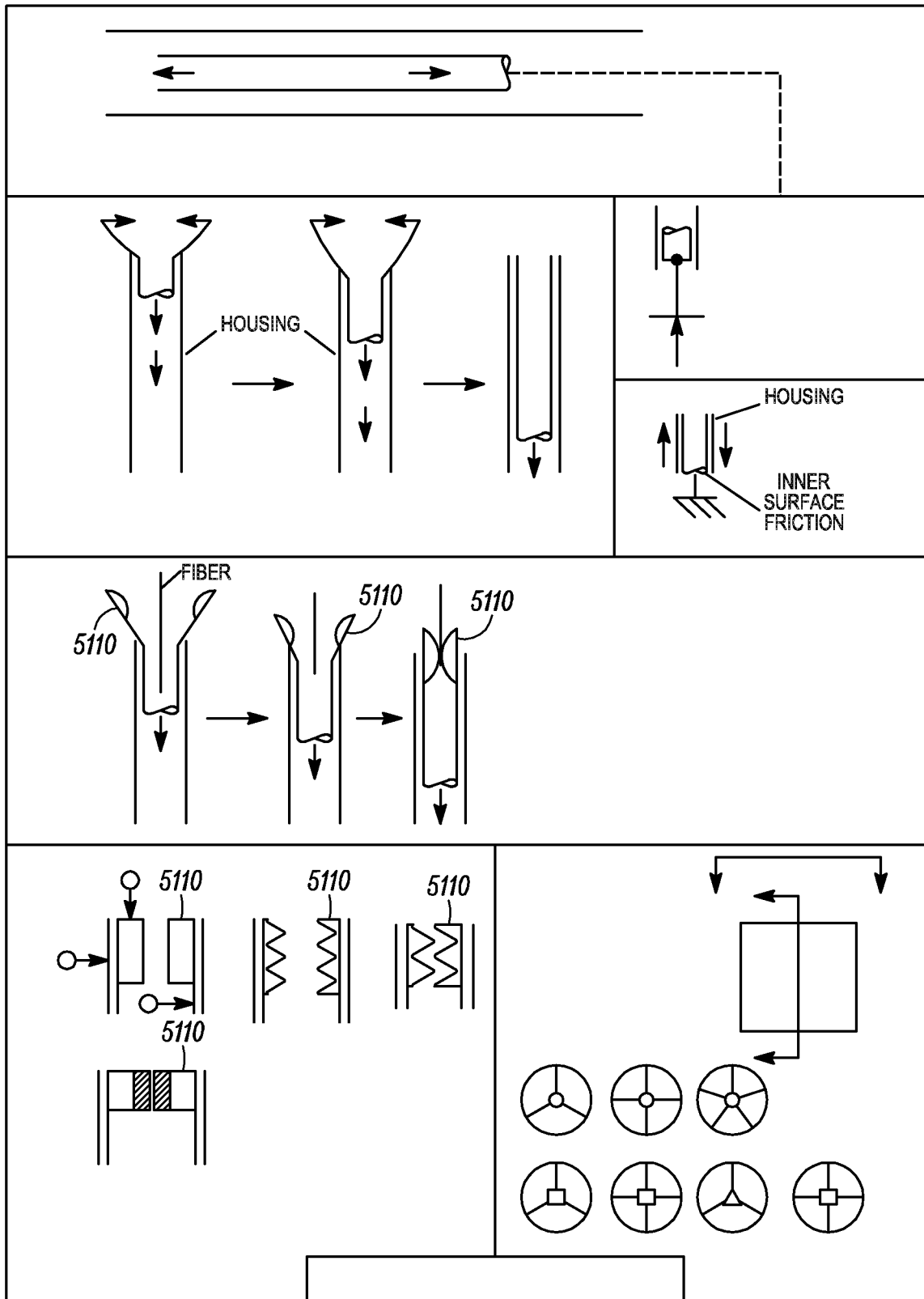
FIG. 54 illustrates exemplary embodiments of forceps designs for a system for manufacturing optical fiber.

Referring now to FIG. 54, exemplary embodiments of forceps designs for a system for manufacturing optical fiber is illustrated. In some aspects, a device may have the added ability to encapsulate a fiber within the device itself. This may lead to a separate manufacturing stage, waste recovery from miss manufacture, temporary holding during transition stages. This ability is inherent to the device and may separate it from the rest of the environment in an intermittent, temporary or permanent fashion. This device may be actuated in a similar manner to linkage cables for shifting a car or activating an endoscope, there is an inner section that translates independently of the outer section. It is this relative motion that allows for the changing relationship to its environment and grants it the ability to isolate itself. As further shown in FIG. 54, the gripper or forceps are able to grab the fiber. As is also shown, the gripper may have a plurality of different ends which engage the fiber.

Thus, as shown in FIG. 54, the device, gripper or forceps, may comprise various inner geometries dependent of the grip type desired, such as circular, toothed, recessed, or shaped to a specific profile. The device may be directly attached to an inner member that is also in the housing and is used to physically push or pull the device relative to the housing dictation the opening and closing feature. This direct physical movement may be due through mechanical connection, a piston pushing a fluid (e.g. water, oil, or air), or the application of a stored energy force, releasing a compressed or stretched spring, as non-limiting examples. This device may be used to isolate the inner housing from the environment, pressure/temperature carrying fluid (e.g. oil, coolant, or air) or used to contain a desired element/material from the environment.

In another embodiment, the device may be actuated with an electrical for and/or an outside mechanical force.

Figure 55:
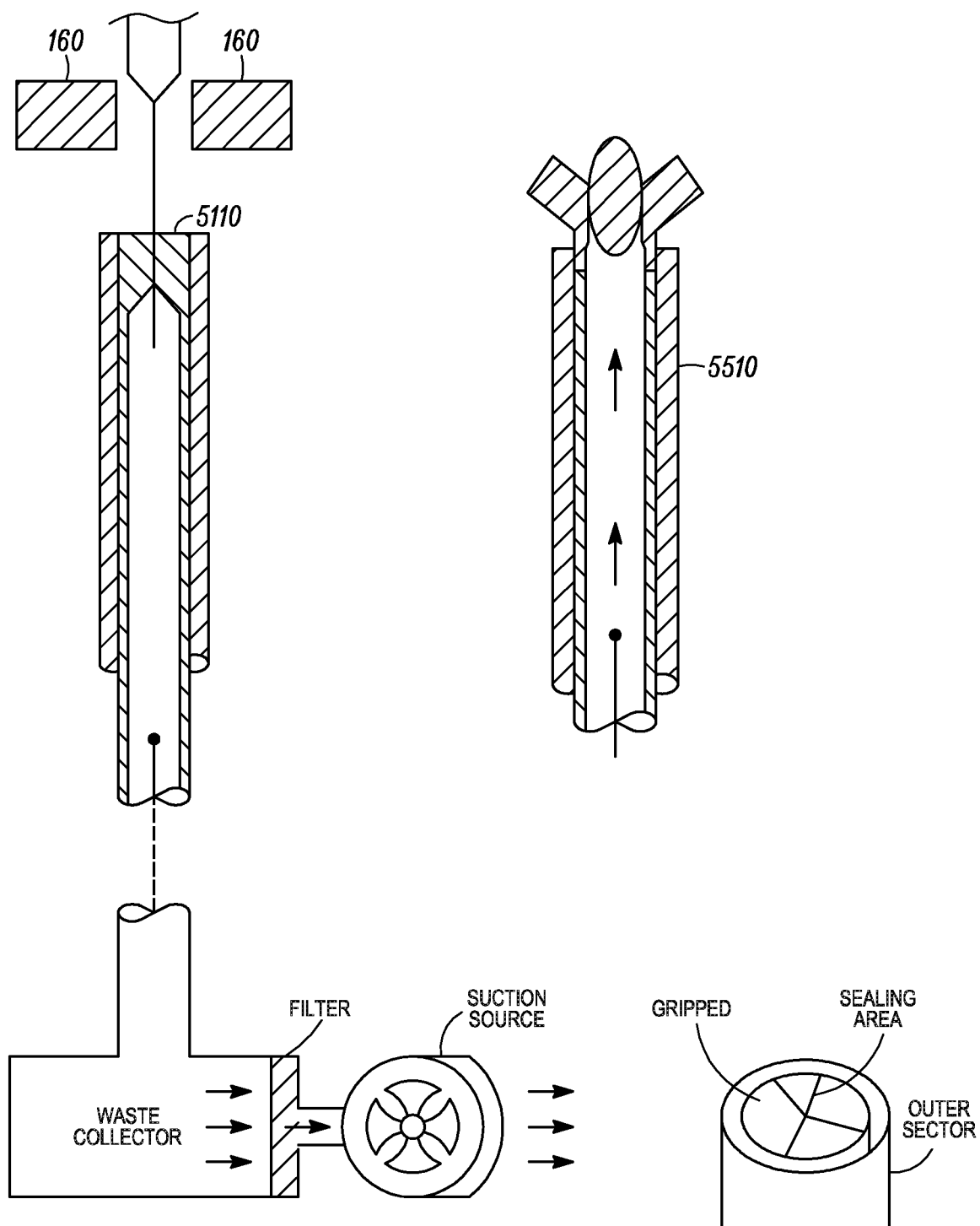
FIG. 55 illustrates exemplary embodiments of forceps control designs for initiating fiber draw from a preform for a system for manufacturing optical fiber.

Referring now to FIG. 55, exemplary embodiments of forceps control designs for initiating fiber draw from a preform for a system for manufacturing optical fiber is illustrated. In some embodiments, a device may be actuated open and closed in different configurations, wherein the configurations may allow it to apply varying or set amounts of force for the purpose of gripping, attaching, compressing, expanding itself to a material that can produce a fiber type material or a fiber itself. The device may be actuated by translation through a housing that compresses/constrains the device. The device may be energized due to this compression the housing implements when the device is translated through it. This may allow the holding action the device can give to the material. The device can consist of a single member/coil or many finger type implements or coils.

In some implementations, a tube member 5510 that has a head attachment may attach itself to the material then pull the fiber along a specified path to a spooling system. The head attachment may release the material and the material may be spooled, or the material may be grabbed by the spooling mechanism and the fiber may then release from the tube member either by actuating it or by breaking the fiber from the head of the tube member by using the spooling mechanism. This method may utilize the tube mechanism to perform maintenance work if the fiber breaks, becomes stuck, or to clear the system and reset it to pull fiber again minimizing down time, as non-limiting examples.

In some embodiments, a stored energy device may limit centralization issues with regards to locating the fiber. This method may use a device that when it releases opens to an area that encompasses the fiber and then is activated allowing the device to surround and close around the fiber. This may trap or grab the fiber and then the device can effectively pull the fiber into a commercial fiber optic quality fiber.

A flowchart illustrating a method of pulling fiber optic grade material autonomously, without manipulation that is not inherent to the manufacturing system, or without human/outside intervention may be provided. This method comprises attaching a tube member that has a head attachment to a material to be pulled. The method also comprises pulling the material along a specified path to a spooling system. The method further comprises releasing the material as it is spooled on a spooling mechanism.

The method may further comprise grabbing the material with the spooling mechanism to spool the material on the spooling system. The method may further comprise releasing the material from the tube member by at least one of actuating the tube member and breaking the fiber from the head of the tube member by using the spooling mechanism. This method can also utilize the tube mechanism to perform maintenance work if the fiber breaks, becomes stuck, etc., to clear the system and reset it to pull fiber again minimizing down time.

A method for gripping fiber utilizing a stored energy device that eliminates centralization issues with regards to locating the fiber is also possible. This method uses a device that when releases it opens to an area that encompasses the fiber and then is activated allowing the device to surround and close around the fiber. This traps/grabs the fiber and then the device can effectively pull the fiber into a commercial fiber optic quality fiber.

Another method for sealing an enclosed environment from external elements is disclosed. The method provides for a system of pressurized channels that will act as a barrier between an enclosed volume and the external environment. This system will consist of two or more sealing elements that have a void or barrier separating them. This barrier will be pressurized with an inert gas or fluid that will isolate the internal environment from the external one. This helps contain the enclosed volume as well as mitigates contamination issues the external environment may cause to the internal volume. It can be used in manufacture of materials needing ultra clean atmospheres. This may be accomplished by directing diffusion in a specified manner from the high pressure area in between the seals to both the internal and external environment. This controlled diffusion protects the clean internal environment from external contaminants as well as prolonging the time the environment can remain viable as clean.

The method may also be supplemented by an internal compressor that pressurizes the zone in between the two or more seals, creating a self-maintaining system. This method may also use a vacuum in between the sealing elements. The sealing elements themselves may have external support to help energize them, pressure applied to then via fluid or gas, squeeze due to the enclosure, spring type element to push against the seal, friction/press fit of seal in specified channel, spring imbedded to seal to self-energize it, mechanical load inputted to the seal, any method of energizing the seal really. A vacuum is then pulled in between the sealing system to limit diffusion between the external and internal environments. Any combination of the pressurized and vacuum seal concepts, with metal, mechanical, elastomeric, non-elastomeric polymer, thermoplastic, thermoset, composite, or other type of seal.

In some implementations, an enclosed environment may be sealed from external elements utilizing a system of pressurized channels that may act as a barrier between an enclosed volume and the external environment. This system may consist of two or more sealing elements that have a void or barrier separating them. This barrier may be pressurized with an inert gas or fluid that will isolate the internal environment from the external one. The barrier may help contain the enclosed volume as well as mitigates contamination issues the external environment may cause to the internal volume. The system may be used in manufacture of materials needing ultra clean atmospheres, such as by directing diffusion in a specified manner from the high pressure area in between the seals to both the internal and external environment. Controlled diffusion may protect the clean internal environment from external contaminants as well as prolonging the time the environment can remain viable as clean.

This method may also be supplemented by an internal compressor that re-pressurizes the zone in between the two or more seals, creating a self-maintaining system. This method may also use a vacuum between the sealing elements. The sealing elements themselves may have external support to help energize them, such as pressure applied to then via fluid or gas, squeeze due to the enclosure, spring type element to push against the seal, friction/press fit of seal in specified channel, spring embedded to seal to self-energize it, mechanical load inputted to the seal, or other methods of energizing the seal. A vacuum may pull between the sealing system to limit diffusion between the external and internal environments. In some aspects, the method may utilize a combination of the pressurized and vacuum seal concepts, with metal, mechanical, elastomeric, non-elastomeric polymer, thermoplastic, thermoset, composite, or other type of seal.

Figure 56:
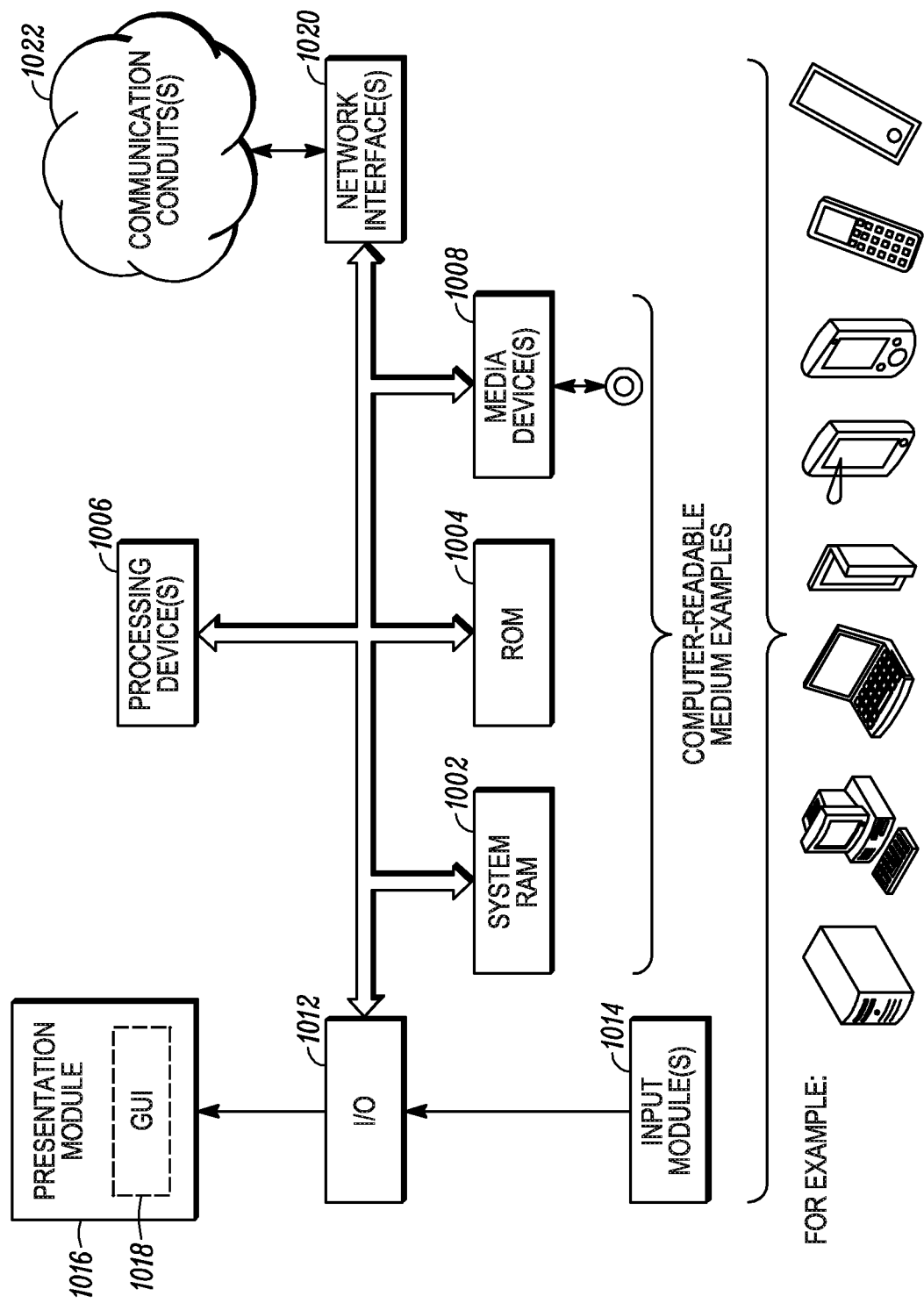
FIG. 56 shows a block diagram illustrating computing functionality of a processing system that may be used to implement an embodiment disclosed herein

FIG. 56 shows a block diagram illustrating computing functionality of a processing system that may be used to implement an embodiment disclosed herein. The methods provided in the embodiments disclosed above may be used in association with the computing functionality 1000 disclosed below to provide for real time monitoring and feedback in the deposition process. Multiple sensors may provide data that is used by correction applications provided herein with respect to the methods disclosed herein where control may be provided.

In all cases, computing functionality 1000 represents one or more physical and tangible processing mechanisms. The computing functionality 1000 may comprise volatile and non-volatile memory, such as random-access memory (RAM) 1002 and read only memory ("ROM") 1004, as well as one or more processing devices 1006 (e.g., one or more central processing units (CPUs), one or more graphical processing units (Gus), and the like). The computing functionality 1000 also optionally comprises various media devices 1008, such as a hard disk module, an optical disk module, and so forth. The computing functionality 1000 may perform various operations identified above when the processing device(s) 1006 execute(s) instructions that are maintained by memory (e.g., RAM 1002, ROM 1004, and the like).

Instructions and other information may be stored on any computer readable medium 610, including, but not limited to, static memory storage devices, magnetic storage devices, and optical storage devices. The term "computer readable medium" also encompasses plural storage devices. In all cases, computer readable medium 1010 represents some form of physical and tangible entity. By way of example, and not limitation, the computer readable medium 610 may comprise "computer storage media" and "communications media."

"Computer storage media" comprises volatile and non-volatile, removable and non-removable media implemented in any method or technology for storage of information, such as computer readable instructions, data structures, program modules, or other data. The computer storage media may be, for example, and not limitation, RAM 1002, ROM 1004, EPSOM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, FRO, infrared, and other wireless media. Combinations of any of the above are also included within the scope of computer readable medium.

The computing functionality 1000 may also comprise an input/output module 1012 for receiving various inputs (via input modules 1014), and for providing various outputs (via one or more output modules). One particular output module mechanism may be a presentation module 1016 and an associated graphic user interface ("GUI") 1018. The computing functionality 1000 may also include one or more network interfaces 1020 for exchanging data with other devices via one or more communication conduits 1022. In some embodiments, one or more communication buses 1024 communicatively couple the above-described components together.

The communication conduit(s) 1022 may be implemented in any manner (e.g., by a local area network, a wide area network (e.g., the Internet), and the like, or any combination thereof). The communication conduit(s) 1022 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (Fogs), Application-specific Integrated Circuits (Asics), Application-specific Standard Products (Asps), System-on-a-chip systems (Sacs), Complex Programmable Logic Devices (Colds), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, wearable device, an Internet-of-Things device, and the like).

Thus, as discussed above, The system is sealed to prevent any infiltration of humidity and filled with a dry environment. This environment could be maintained with a gas pump circulating air through a high efficiency particulate air (HEPA) filter, a carbon black filter, and molecular sieve, or other forms of environmental control, such as pumping in fresh nitrogen from the exterior.

As disclosed above, the system may be housed in a hermetically sealed box, which may limit access to the system components. In some aspects, the seal may comprise multiple sealing mechanisms, such as an elastomeric seal between two portions of the housing and a vacuum seal between seal materials. For example, the system may be configured to fit into an express rack of the International Space Station or may be self-sustaining in a free-flying spacecraft. The space limitations of an express rack may limit production to a single run of the preforms stored and shipped in a preform holder. For a free-flying spacecraft, the system may comprise mechanisms to reload, restock, or repair components or consumable materials. In some embodiments, the system may allow for limited or full access to the components. For example, a portion of the housing may be removed to allow manual access to repair, replace, or restock components or consumable materials. As another non-limiting example, access may be limited to restocking consumable materials, such as preforms and spooling materials; removing deliverables, such as spools of optical fiber; and removing excess waste from a waste collector.

The process may initiate by utilizing a large diameter preform, heating the preform until it is in a viscous state, then applying tension to the end of the preform. This tension may cause a section of the preform to decrease in diameter forming a "neck". From this neck, a small fiber may be pulled out and attached to a spool. By changing the spooling speed, the diameter of the fiber may be controlled. Coating systems may apply a polymer layer to the glass, allowing it to be bent without surface cracks breaking. In standard gravity conditions, gravity aids the process by automatically allowing the neck to form, as the weight of the bottom of the preform causes the heated preform to naturally draw down. In microgravity, the effect of gravity is negligible, and the drawing process may be automated.

The preform containment and feed system also holds a temperature probe containing multiple temperature sensors. This probe may be used to map the thermal environment of the furnace, as well simulate the heat up of a preform. This may be particularly significant in microgravity where a thermal environment may be different than in standard gravity conditions. In some embodiments, conductive heat profiles may be simulated in microgravity through use of fans.

The preform containment and feed system may be used to grip a preform, which may then be moved from the cooler ambient environment to the interior of the furnace. The furnace may heat the preform to the correct temperature, and the start/stop subsystem may draw fiber from the heated preform. This system may ensure that the preforms survive the launch process using several foam protective sleeves, into which the preforms are inserted during launch. Accelerometers may be attached to the preform holder to monitor the vibrations of the preform during drawing.

The furnace is used to create the heated environment for the preform. This environment will decrease the viscosity of the preform in certain sections, allowing the preform to be drawn into fiber. The furnace is cylindrical, with an opening at the top of the furnace allowing for the preform to be inserted and an opening at the bottom allowing for the generated fiber to be pulled towards the spooling system.

The furnace is used to create the heated environment for the preform. This environment will decrease the viscosity of the preform in certain sections, allowing the preform to be drawn into fiber. The furnace is cylindrical, with an opening at the top of the furnace allowing for the preform to be inserted and an opening at the bottom allowing for the generated fiber to be pulled towards the spooling system.

The start/stop subsystem is the general name for starting the pulling process, as well as ending it. The subsystem interfaces with spooling subsystems extensively. The system begins the necking process of the preform, either by poking the molten end of it, or by pulling a large section of the bottom. Once the neck is formed, the waste can be disposed of, and a subsystem used to draw the fiber through the entire system, eventually attaching the fiber to a spool. There can be several different tractors, cutting assemblies, and irises used for this process.

The current design has a grabber mechanism which inserts into an attached mount on the preform. The grabber inserts into the preform once the preform is inserted into the hot spot, applying a constant force to simulate 1G of gravity. The grabber then pulls the bottom chunk of material and mount back, then cut the residual off the main fiber strand. Irises and pinch wheels then close around the fiber strand, inserting the fiber into a waste bin until it is the proper size to go through the rest of the system. Endoscopic forceps extend from behind the spool, through a clamp and 2 redirection assemblies, and grab the end of a cut fiber that has been pulled from the preform. The forceps then draw this fiber back through the system and to the spool, where the fiber is attached. Drawing of the fiber can then commence.

In order to stop pulling, the preform feeding may stop, and the fiber may be cut or allowed to break at the neck. The spool may continue to pull this loose fiber through the system, where it may be secured to spool and stored until reentry. In some aspects, debris and discarded fiber may be drawn into or placed into a waste collector.

A diameter sensor is mounted under the furnace, and is used to measure the fiber diameter as it emerges from out of the furnace. This diameter sensor is used in an active control loop to control the draw speed. If the diameter is not correct, the draw speed is raised or lowered until the proper speed is reached to achieve nominal diameter.

The tractor, spooling, and capstan system has a large amount of design freedom. Different stepper motors and DC motors can be used to apply tension onto the preform. Once combined with heat, this tension on the preform draws it into a fiber. By changing the speed of the DC motors and accompanying spool, the diameter of the fiber can be changed. A fiber tractor can be used before the spool, in order to pull fiber without spooling it, while a large spool spun by motor can apply the main drawing force. By directly changing the rotation speed of the spool, the fiber diameter can be controlled, while by moving the spool or a turning wheel in front of the spool, the fiber can be layered in a set pattern.

A tension sensor is integrated into the redirection assembly. This sensor, by measuring tension in the line, can help to ensure that the fiber is being drawn with the correct settings to ensure a stable pull. In some embodiments, a portion of the electrical components may be external to the controlled environment. In some aspects, potted bulkhead fittings may allow for an electrical pass through with limited exposure to contaminants.

An ECU is used to maintain the environment when the pulling operation is not occurring. This utilizes filters to eliminate particles, volatiles, and humidity from the inert gas atmosphere inside the environment. The current baseline uses a fan to suck air through a HEPA filter and activated charcoal. This air is then pushed through molecular sieve, with baffles creating a long path for the flow through the sieve. Thus, the ambient environment can be completely clean and filter water. Temperature and pressure sensors located in the environment to ensure that it remains in any specified or required tolerances. A humidity sensor monitors water content inside the volume.

In some aspects, a preform holder may comprise a solid-state revolver configuration, wherein the preform holder may rotate preforms and at least one temperature probe. In some embodiments, the preform holder may comprise a magazine design, wherein a new preform moves into place once the previous preform is discarded. In some magazine configurations, a separate temperature probe mechanism may allow for the insertion of a reusable temperature probe independent of the magazine design. In some aspects, disposable temperature probes may be integrated into the magazine, wherein the temperature probe debris may be guided into the waste collector.

In some aspects, the waste collector may comprise a fan, which may draw air and debris into the waste collector or direct air to create a barrier to limit the loss of debris, as non-limiting examples. The waste collector may comprise directional bristles that may limit escape of debris, such as in microgravity conditions. In some embodiments, the waste collector may extend the length of the furnace, wherein preform waste may be collected before and after the furnace. For example, after the furnace, the collected fiber may be trimmed of portions that do not fall into the collectible fiber parameters, and before the furnace, preform stubs may be ejected from the preform holder.

In some aspects, the waste collector may collect other unsecured debris, which may result from damage to the system or breakage of the fiber during collection. The debris may be directed into the waste collector through an integrated airflow system, which may comprise a series of vents and ducting that may be embedded in the base or walls of the housing. The airflow system may allow for efficient circulation of air within the environment and for directed airflow, such as may direct floating debris into the waste collector.

The subsystem may comprise several different embodiments for holding multiple preforms. One uses a solid-state revolver to hold the preforms in a circular configuration, while others utilize different magazine designs that use springs or motors to move preforms into position.

In some aspects, the preform may comprise a starter tip that may facilitate the initial fiber draw from the preform. The tip may comprise a vacuum-sealed tip, wherein a plastic grip may be attached to the end of a preform. A grabber may engage the plastic directly or may engage a tip embedded in the plastic, such as a hook or loop. Once the draw is initiated, the tip may be detached by a cutter after the furnace. In some embodiments, the starter tip may be ground from the end of the preform. For example, the end of the preform may comprise notches that the grabber may latch onto. In some aspects, preforms may be manufactured in microgravity. For example, manufacturing preforms and the optical fiber in low Earth orbit may allow for faster delivery of additional preforms.

Further, the data from any one of the sensors disclosed above may be provided to the computing functionality 1000 to determine at least placement of the dispenser 142, 210 where the processor and a processor executable instructions are stored on the tangible storage medium to receive a measurement from the first sensor to determine a height of the deposition system from the build location.

Thus, as provided above, the system described herein is sealed to prevent any infiltration of humidity and filled with a dry environment. This environment could be maintained with a gas pump circulating air through a high efficiency particulate air (HEPA) filter, a carbon black filter, and molecular sieve, or other forms of environmental control, such as pumping in fresh nitrogen from the exterior.

An embodiment provides for coating the preform from which the fiber is drawn. This method pulls the fiber and coating as one unit as the fiber is being produced. In some embodiments, ZBLAN preforms may be wrapped in heat shrink tubing. In some implementations, different materials may be wrapped using a similar process.

In some aspects, a cooling system may be integrated below the diameter sensor to rapidly cool the fiber before it is coated. In an embodiment, use of air pumps or fans located perpendicular to fiber, which cool the fiber through passing air over it may be applied. Bladeless fans may be used to channel air along the fiber length. It may also be possible to touch the fiber with rolling pins, creating a conductive thermal pathway from the fiber.

The coating system has several approaches. For one, it may not be needed at all, as certain grades of Teflon or other polymers can be pre-applied and melted onto the preform. Using traditional coating methods such as pressurized dies could also provide the necessary coating when combined with UV curing lamps. In some aspects, using pressurized sprays of material may coat the fiber in a limited amount of space.

In some aspects, the fiber may be drawn through coating cups that may coat the fiber in one or more coating materials and then pass through curing lamps. Other methods for applying coating may include capillary action or sonic levitation. The curing lamps may be located between the coating cups, which may allow for wet or dry coating or wet on wet coating, or the curing lamps may be located after the final coating cup, which may limit the coating to wet on wet. In some aspects, coatings may be customizable, wherein the coating materials may be integrated based on the particularly demands of a project.

In some aspects, the system may comprise a diameter sensor, which may be positioned after the furnace. The diameter sensor may monitor the diameter of drawn fiber as it is drawn from the preform. In some embodiments, a plurality of diameter sensors may monitor diameter of the drawn fiber throughout the manufacturing process. For example, such as where the furnace comprises a transparent portion, a first diameter sensor may monitor the diameter of the fiber at a location proximate to the initial draw point. A second diameter sensor may monitor the diameter the fiber as it exits the furnace. A third diameter sensor may located at another point in the system, wherein the third diameter sensor may monitor the fiber for additional quality control.

Where a preform may be precoated, the diameter sensor may base the measurements from surface data. For example, a micrometer may comprise a laser that may determine concentricity and diameter. Without the coating, the fiber may be transparent, and the diameter sensor may utilize surface data and internal data, such as to monitor clarity of the fiber.

In some embodiments, the system may comprise tension sensors, which may be monitor tension of the fiber being pulled by the forceps. A sudden loss in tension may indicate a break, and a building increase in tension may precede a break. The monitored data may prompt an action by a system component. For example, a break may stop the fiber draw and prompt a change to the next preform. A break may also prompt fans to direct any floating debris to the waste collector.

In some aspects, some sensors may be active during transportation of the system, wherein the active sensors may monitor conditions for threshold levels, which may adversely affect the system. Accelerometers may be active during a launch to monitor threshold vibration levels that may cause damage to the system, such as damaging the preforms or causing the subsystem to fall out of alignment with the furnace or spool, as non-limiting examples. In some aspects, environmental sensors may be periodically activated to ensure the conditions stay within predefined parameters.

For example, temperature and humidity sensors may activate every ten days while the system is stored in an open warehouse. The data may be transmitted when the sensors are activated or the data may be accessed at logistic checkpoints. For example, the humidity data may be accessed prior to launch, wherein there may be an opportunity to retreat the system, such as flushing the environment with nitrogen. Accessing sensor data prior to installation or launch may limit installation or launch of damaged systems.

In some implementations, the system may comprise a gantry system, which may allow for more precise manipulation of components within the system. The system may comprise sensors that may monitor for damage to a component or the housing. A repair arm on the gantry system may be equipped to repair holes or cuts. For example, it may add an epoxy or monomer then apply a curing mechanism, such as exposure to UV or heat. As another example, the arm may weld small holes. In some aspects, the system may comprise a contamination sensor, and the repair arm may expose the section to UV to kill living contaminants.

In some aspects, the spooling mechanism may comprise an internal motor, wherein the spool may spin around the motor. In some embodiments, the spool portion may be removable and replaceable. For example, once full, the spool portion may be removed and transported in that spool. In some implementations, the fiber may be transferred to a secondary spool, which may be less expensive or more efficient.

Where the spool may be replaceable, the system may be shipped or launched with a batch of spools. For example, where the system is accessible, the spools may be replaced manually or through automation. In some aspects, full spools may be removed and stored for shipment within the system, such as in a free-flying spacecraft. Where spools may be stored and/or shipped separately, they may be collapsible or able to be assembled. A spool may comprise three flat pieces that connect or fit into each other to form the spool. In some aspects, the spool may be printed onsite, which may allow for local manufacturing of the spools on demand.

The spool may comprise a catching mechanism that may secure a fiber end to the spool. In some aspects, the catching mechanism may comprise a grip that may be magnetically or spring-driven. For example, the grip may be triggered once a predefined amount fiber is in contact with the spool. As another example, the grip may be triggered based on a predefined amount of pressure applied by one or both the forceps and the fiber. A still further example, the grip may be triggered by a control mechanism.

In some aspects, the surface of the spool may comprise a passive gripping material or surface. Optical fiber may be delicate, particularly during the initial spooling stage, which may wrap at the low diameter, and catching methods may account for this fragility. For example, the spool may comprise a friction lock or a v-catch that may engage the fiber as it is spooled. As another example, the surface of the spool may comprise a sticky material, such as a soft rubber, wax paper, epoxy, or tape. The sticky material may be inherent to the spool surface or may be applied when the fiber is spooled. For example, a piece of double-sided tape may be adhered to the portion of the spool that the fiber may wind around. The pieces of tape may be precut or cut from a tape-dispensing unit. Where the system may be intended for extended use with restockable materials, tape embodiments may be practical and easily and inexpensively restocked.

Temperature and pressure sensors are located in the environment to ensure that it remains in the specified tolerances as required any space launch agency or company, such as, but not limited to NASA. A humidity sensor monitors water content inside the volume. Finally, accelerometers can be attached to the preform holder to monitor the vibrations of the preform during drawing.

An alternate option is to coat the preform from which the fiber is drawn. This method pulls the fiber and coating as one unit as the fiber is being produced. In some embodiments, ZBLAN preforms may be wrapped in heat shrink tubing. In some implementations, different materials may be wrapped using a similar process.

In some aspects, a cooling system may be integrated below the diameter sensor to rapidly cool the fiber before it is coated. Current designs use air pumps or fans located perpendicular to fiber, which cool the fiber through passing air over it. Bladeless fans may be used to channel air along the fiber length. It may also be possible to touch the fiber with rolling pins, creating a conductive thermal pathway from the fiber.

The coating system has several approaches. For one, it may not be needed at all, as certain grades of Teflon or other polymers can be preapplied and melted onto the preform. Using traditional coating methods such as pressurized dies could also provide the necessary coating when combined with UV curing lamps. In some aspects, using pressurized sprays of material may coat the fiber in a limited amount of space.

In some aspects, the fiber may be drawn through coating cups that may coat the fiber in one or more coating materials and then pass through curing lamps. Other methods for applying coating may include capillary action or sonic levitation. The curing lamps may be located between the coating cups, which may allow for wet on dry coating or wet on wet coating, or the curing lamps may be located after the final coating cup, which may limit the coating to wet on wet. In some aspects, coatings may be customizable, wherein the coating materials may be integrated based on the particularly demands of a project.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system comprising:
   a vacuum chamber to hold a preform, wherein a gas is applied within the vacuum chamber with the preform from which an optical fiber is pulled;
   at least one sensor to measure a parts per million (PPM) of water moisture level within the vacuum chamber;
   an environmental control unit to provide a closed system within the vacuum chamber having at least a molecular sieve and a filter membrane to remove water moisture to maintain water moisture level at a given range;
   a coating system to apply a coating to the fiber pulled from the preform while the PPM of water moisture level remains within the given range and to apply a coating to the surface of the pulled fiber; and
   an ultra-violet lamp to illuminate an ultra-violet light to cure the coating.

2. The system according to claim 1, wherein the gas comprises a noble gas.

3. The system according to claim 1, wherein the sensor to measure PPM of water content comprises a humidity sensor.

4. The system according to claim 3, wherein the system operates at a PPM of water content being approximately 0-1.5 PPM.

5. The system according to claim 1, further comprising a cooling system, wherein the cooling system comprises at least one of a bladeless fan to direct air at the optical fiber as it is pulled from the preform along a length of the preform and at least one rolling pin that is in contact with the optical fiber to create a conductive thermal pathway from the preform.

6. The system according to claim 1, wherein the coating system comprises a plurality of coating cups to coat the optical fiber once pulled from the preform.

7. The system according to claim 6, wherein ultraviolet light is illuminated between adjacent coating cups of the plurality of coating cups to provide for at least one of wet on dry coating and wet on wet coating.

8. The system according to claim 6, wherein the ultraviolet light is illuminated after the plurality of coating cups to provide for a wet on wet coating.

9. The system according to claim 1, wherein the coating system comprises at least one of a capillary subsystem and a sonic levitation subsystem to coat the optical fiber once pulled from the preform.

10. The system according to claim 1, further comprising a grabbing mechanism to grab at least one of the preform and the pulled fiber.

11. The system according to claim 10, wherein the grabbing mechanism further comprises a heated grabber to insert into a heated preform to initiate draw of the pulled fiber.

12. The system according to claim 11, wherein the grabbing mechanism comprises an electrostatic charger to induce an electrostatic charge at a tip of the pulled fiber.

13. The system according to claim 1, further comprising forceps to pull the fiber from the preform.

14. The system according to claim 1, further comprising a furnace,
wherein during operation of the furnace, the environmental control unit is periodically active.

15. The system according to claim 1, wherein the gas is dry nitrogen and the at least molecular sieve and filter membrane filter the dry nitrogen.

16. The system according to claim 1, wherein the gas comprises an inert gas to control an oxygen level within the vacuum chamber.

17. The system according to claim 1, wherein the at least molecular sieve and filter membrane is further configured to filter any outgassed air.

* * * * *